United States Patent (10) Patent No.: US 10,262,202 B2
Katsuyama et al. (45) Date of Patent: Apr. 16, 2019

(54) FORM RECOGNITION METHOD, FORM RECOGNITION DEVICE, AND NON-TRANSITORY COMPUTER-READABLE MEDIUM

(71) Applicant: FUJITSU LIMITED, Kawasaki-shi, Kanagawa (JP)

(72) Inventors: Yutaka Katsuyama, Yokohama (JP); Eigo Segawa, Kawasaki (JP)

(73) Assignee: FUJITSU LIMITED, Kawsaki (JP)

( * ) Notice: Subject to any disclaimer, the term of this patent is extended or adjusted under 35 U.S.C. 154(b) by 27 days.

(21) Appl. No.: 15/468,235

(22) Filed: Mar. 24, 2017

(65) Prior Publication Data
US 2017/0308746 A1 Oct. 26, 2017

(30) Foreign Application Priority Data
Apr. 25, 2016 (JP) .................. 2016-087349

(51) Int. Cl.
G06K 9/00 (2006.01)
G06K 9/34 (2006.01)
G06K 9/46 (2006.01)
G06K 9/52 (2006.01)

(52) U.S. Cl.
CPC ..... G06K 9/00483 (2013.01); G06K 9/00463 (2013.01); G06K 9/346 (2013.01); G06K 9/4652 (2013.01); G06K 9/52 (2013.01)

(58) Field of Classification Search
CPC ............. G06K 2209/01; G06K 9/2054; G06K 9/00442; G06K 9/00449; G06K 9/00469; G06K 9/00483
See application file for complete search history.

(56) References Cited

U.S. PATENT DOCUMENTS

| 5,943,443 A * | 8/1999 | Itonori | G06K 9/72 |
| | | | 358/403 |
| 6,327,387 B1 * | 12/2001 | Naoi | G06K 9/2054 |
| | | | 382/173 |
| 7,277,191 B2 * | 10/2007 | Metcalfe | H04N 1/40062 |
| | | | 358/1.12 |

(Continued)

FOREIGN PATENT DOCUMENTS

JP 07-282193 10/1995
JP 2015-169978 9/2015

*Primary Examiner* — Bhavesh M Mehta
*Assistant Examiner* — Ian L Lemieux
(74) *Attorney, Agent, or Firm* — Fujitsu Patent Center

(57) ABSTRACT

A method includes: extracting a first line segment pair including a combination of line segments selected from a plurality of line segments included in an image of a form to be recognized; calculating a first feature amount which represents a relationship between the line segments in the extracted first line segment pair; extracting a candidate for a form identifier of the form to be recognized based at least on the calculated first feature amount and a second feature amount in line segments in a second line segment pair correlated with a form identifier which is registered in advance; extracting corresponding line segment pairs which include a line segment correlated with the candidate for the form identifier and a line segment of the form to be recognized; and specifying the form identifier of the form to be recognized based at least on the degree of overlapping.

18 Claims, 42 Drawing Sheets

(56) References Cited

U.S. PATENT DOCUMENTS

| | | | |
|---|---|---|---|
| 2005/0117803 A1* | 6/2005 | Ikeda | G06K 9/00449 382/190 |
| 2008/0069450 A1* | 3/2008 | Minami | G06K 9/00449 382/199 |
| 2008/0212115 A1* | 9/2008 | Konishi | G06K 9/00442 358/1.9 |
| 2014/0270536 A1* | 9/2014 | Amtrup | G06K 9/00442 382/195 |
| 2015/0254869 A1 | 9/2015 | Tanaka | |

* cited by examiner

FIG. 2

| FORM ID | LINE SEGMENT INFORMATION | 121 |
|---|---|---|
| 1 | LINE SEGMENT ID=1:{DIRECTION, POSITION, LENGTH},<br>LINE SEGMENT ID=2:{DIRECTION,POSITION,LENGTH},··· | |
| 2 | LINE SEGMENT ID=1:{DIRECTION, POSITION, LENGTH},<br>LINE SEGMENT ID=2:{DIRECTION,POSITION,LENGTH},··· | |
| ⋮ | ⋮ | |

FIG. 6

| COORDINATES OF CELL | REGISTERED INFORMATION |
|---|---|
| (U1,V1) | FORM ID=1:{(LINE SEGMENT ID,LINE SEGMENT ID)} |
| ... | ... |
| (U1,Vq) | FORM ID=1:{(LINE SEGMENT ID,LINE SEGMENT ID),...,(LINE SEGMENT ID,LINE SEGMENT ID)} |
| (U2,V1) | |
| ... | ... |
| (Un,Vm) | FORM ID=1:{(LINE SEGMENT ID,LINE SEGMENT ID),...,(LINE SEGMENT ID,LINE SEGMENT ID)}<br>FORM ID=2:{(LINE SEGMENT ID,LINE SEGMENT ID),...,(LINE SEGMENT ID,LINE SEGMENT ID)} |
| ... | ... |
| (Up,V1) | FORM ID=1:{(LINE SEGMENT ID,LINE SEGMENT ID)} |
| ... | ... |
| (Up,Vq) | FORM ID=1:{(LINE SEGMENT ID,LINE SEGMENT ID)} |

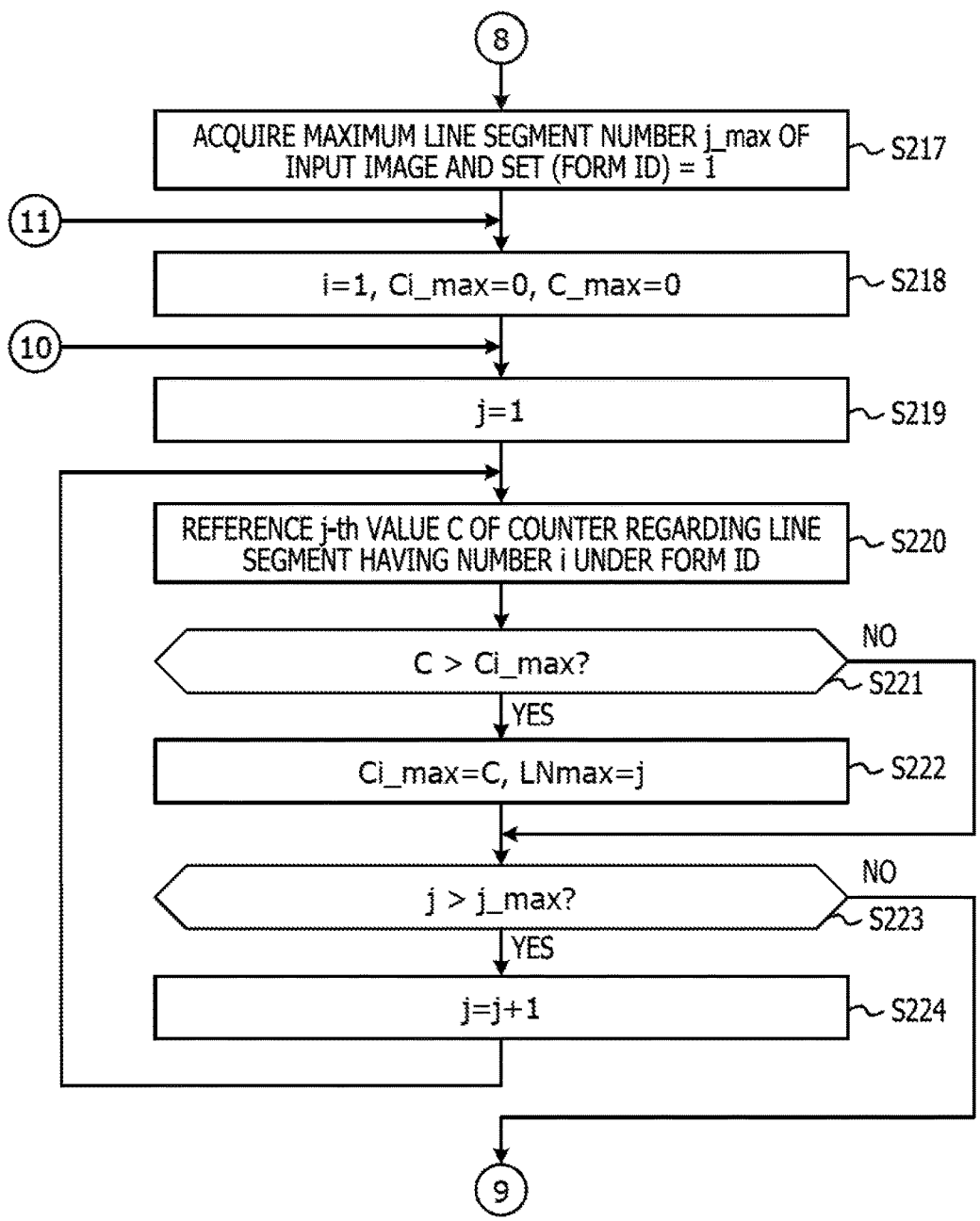

FIG. 12

| LINE SEGMENT PAIR OF INPUT IMAGE | LINE SEGMENT PAIR OF FORM REGISTERED IN COARSE CLASSIFICATION DICTIONARY | |
|---|---|---|
| (LS1, LS2) | (LSa, LSb) , (LSf, LSg) | ⎫ 131 |
| (LS6, LS7) | (LSa, LSb) , (LSf, LSg) | |
| (LS1, LS3) | (LSa, LSc) , (LSB, LSD) | |
| (LS1, LS4) | (LSa, LSd) , (LSB, LSE) | |
| (LS2, LS4) | (LSb, LSd) , (LSA, LSC) | |
| (LS2, LS5) | (LSb, LSe) , (LSA, LSD) | |
| (LS3, LS4) | (LSc, LSd) , (LSD, LSE) | |
| (LS4, LS5) | (LSd, LSe) , (LSC, LSD) | |
| (LS3, LS6) | (LSc, LSf) , (LSD, LSG) | |
| (LS4, LS6) | (LSd, LSf) , (LSE, LSG) | |
| (LS4, LS7) | (LSd, LSg) , (LSC, LSF) | |
| (LS5, LS7) | (LSe, LSg) , (LSD, LSF) | |

| LINE SEGMENT OF FORM OF FIRST FORM ID | CORRESPONDING LINE SEGMENT OF INPUT IMAGE AND NUMBER OF TIMES CORRELATED WITH LINE SEGMENT |
|---|---|
| LSa | LS1(THREE TIMES), LS6(ONCE) |
| LSb | LS2(THREE TIMES), LS7(ONCE) |
| LSc | LS3(THREE TIMES) |
| LSd | LS4(SIX TIMES) |
| LSe | LS5(THREE TIMES) |
| LSf | LS1(ONCE), LS6(THREE TIMES) |
| LSg | LS1(ONCE), LS7(THREE TIMES) |

| RANK | LINE SEGMENT PAIR |
|---|---|
| 1 | (LS4, LSd) |
| 2 | (LS1, LSa) |
|  | (LS2, LSb) |
|  | (LS3, LSc) |
|  | (LS5, LSe) |
|  | (LS6, LSf) |
|  | (LS7, LSg) |

CORRESPONDING LINE SEGMENT PAIR

| LINE SEGMENT OF FORM OF SECOND FORM ID | CORRESPONDING LINE SEGMENT OF INPUT IMAGE AND NUMBER OF TIMES CORRELATED WITH LINE SEGMENT |
|---|---|
| LSA | LS2(TWICE) |
| LSB | LS1(TWICE) |
| LSC | LS4(THREE TIMES) |
| LSD | LS3(TWICE), LS5(THREE TIMES) |
| LSE | LS4(THREE TIMES) |
| LSF | LS7(TWICE) |
| LSG | LS6(TWICE) |

| RANK | LINE SEGMENT PAIR | CORRESPONDING LINE SEGMENT PAIR |
|---|---|---|
| 1 | (LS4, LSC) | |
| | (LS5, LSD) | |
| | (LS4, LSE) | |
| 4 | (LS2, LSA) | |
| | (LS1, LSB) | |
| | (LS7, LSF) | |
| | (LS6, LSG) | |

FIG. 16A
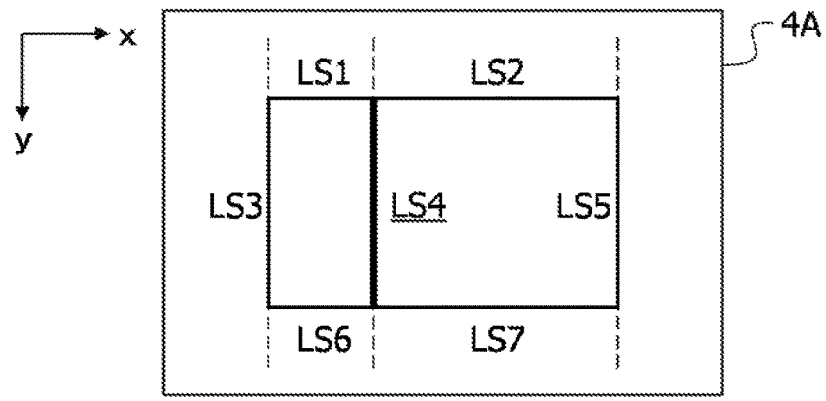
FIG. 16B
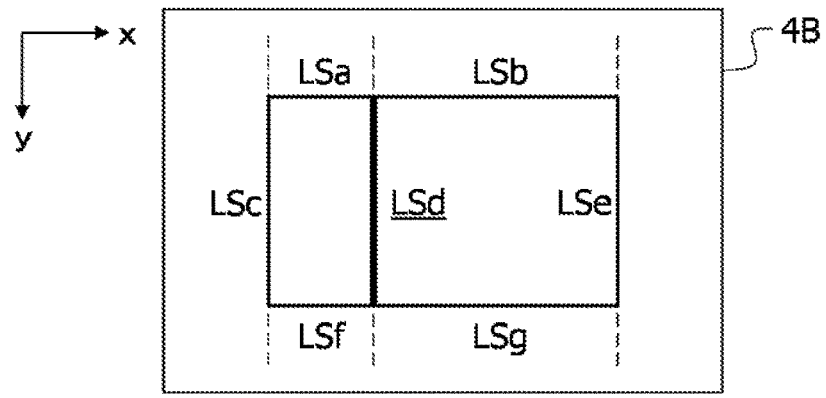
FIG. 16C
| CORRESPONDING LINE SEGMENT PAIR | 134A |
|---|---|
| (LS4, LSd) | |
| (LS1, LSa) | |
| (LS2, LSb) | |

FIG. 23

| COORDINATES OF CELL | REGISTERED INFORMATION |
|---|---|
| (U1,V1) | FORM ID=1:{(LINE SEGMENT ID[ANGLE, COLOR], LINE SEGMENT ID[ANGLE, COLOR])} |
| ... | ... |
| (U1,Vq) | FORM ID=1:{(LINE SEGMENT ID[ANGLE, COLOR], LINE SEGMENT ID[ANGLE, COLOR])} |
| (U2,V1) | ... |
| ... | ... |
| (Un,Vm) | FORM ID=1:{(LINE SEGMENT ID[ANGLE, COLOR], LINE SEGMENT ID[ANGLE, COLOR]), ..., (LINE SEGMENT ID[ANGLE, COLOR], LINE SEGMENT ID[ANGLE, COLOR])} <br> FORM ID=2:{(LINE SEGMENT ID[ANGLE, COLOR], LINE SEGMENT ID[ANGLE, COLOR]), ..., (LINE SEGMENT ID[ANGLE, COLOR], LINE SEGMENT ID[ANGLE, COLOR])} |
| ... | ... |
| (Up,V1) | FORM ID=1:{(LINE SEGMENT ID[ANGLE, COLOR], LINE SEGMENT ID[ANGLE, COLOR])} |
| ... | ... |
| (Up,Vq) | FORM ID=1:{(LINE SEGMENT ID[ANGLE, COLOR], LINE SEGMENT ID[ANGLE, COLOR])} |

112

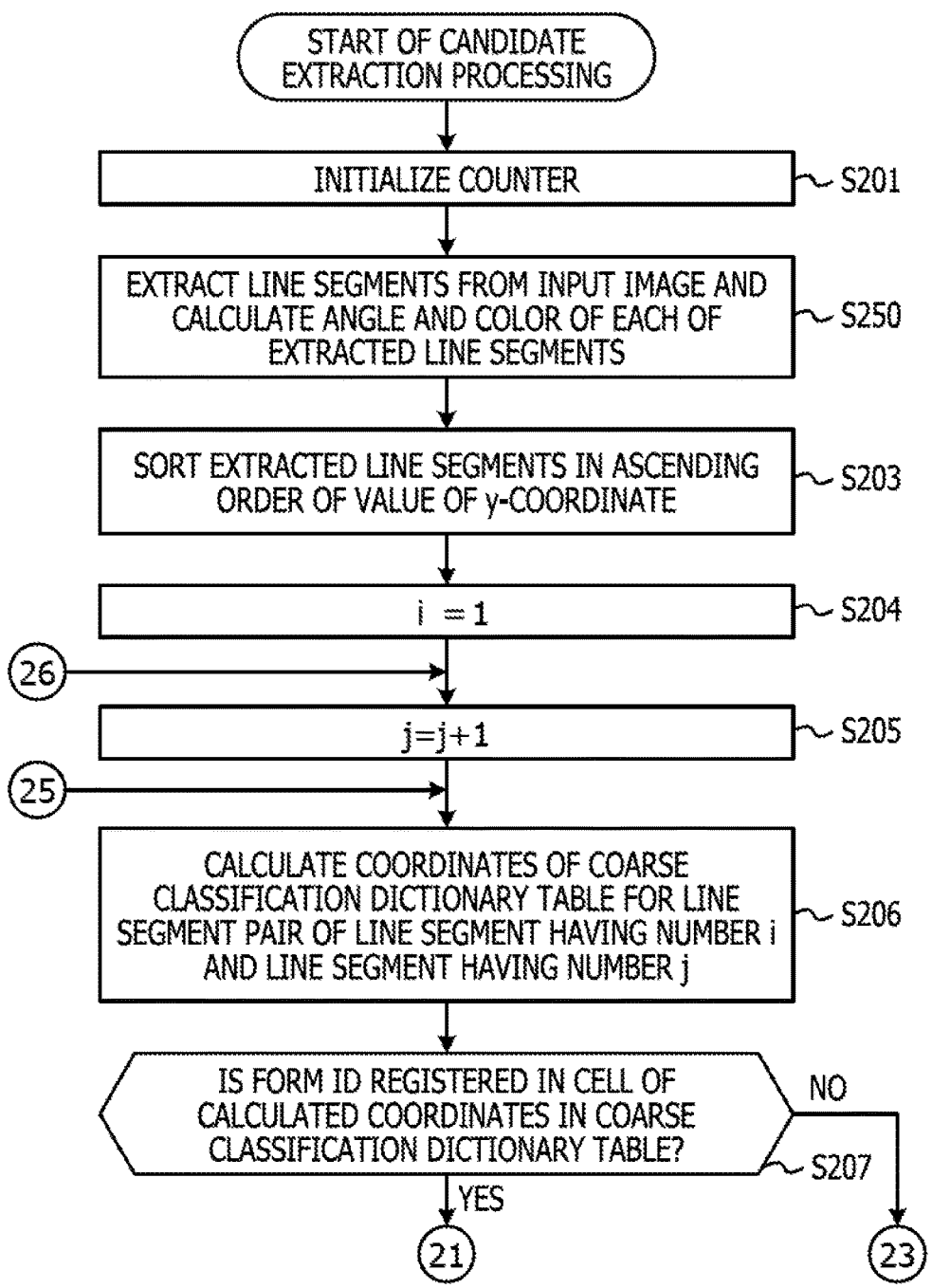

FIG. 26

| COORDINATES OF CELL | REGISTERED INFORMATION |
|---|---|
| (U1,V1) | FORM ID=1:{(LINE SEGMENT ID,LINE SEGMENT ID)}, NUMBER OF LINE SEGMENTS |
| ... | ... |
| (U1,Vm) | FORM ID=1:{(LINE SEGMENT ID,LINE SEGMENT ID)}, NUMBER OF LINE SEGMENTS |
| (U2,V1) | |
| ... | ... |
| (Un,Vm) | FORM ID=1:{(LINE SEGMENT ID,LINE SEGMENT ID)...,(LINE SEGMENT ID,LINE SEGMENT ID)}, NUMBER OF LINE SEGMENTS<br>FORM ID=2:{(LINE SEGMENT ID,LINE SEGMENT ID)...,(LINE SEGMENT ID,LINE SEGMENT ID)}, NUMBER OF LINE SEGMENTS |
| ... | ... |
| (Up,V1) | FORM ID=1:{(LINE SEGMENT ID,LINE SEGMENT ID)}, NUMBER OF LINE SEGMENTS |
| ... | ... |
| (Up,Vq) | FORM ID=1:{(LINE SEGMENT ID,LINE SEGMENT ID)}, NUMBER OF LINE SEGMENTS |

113

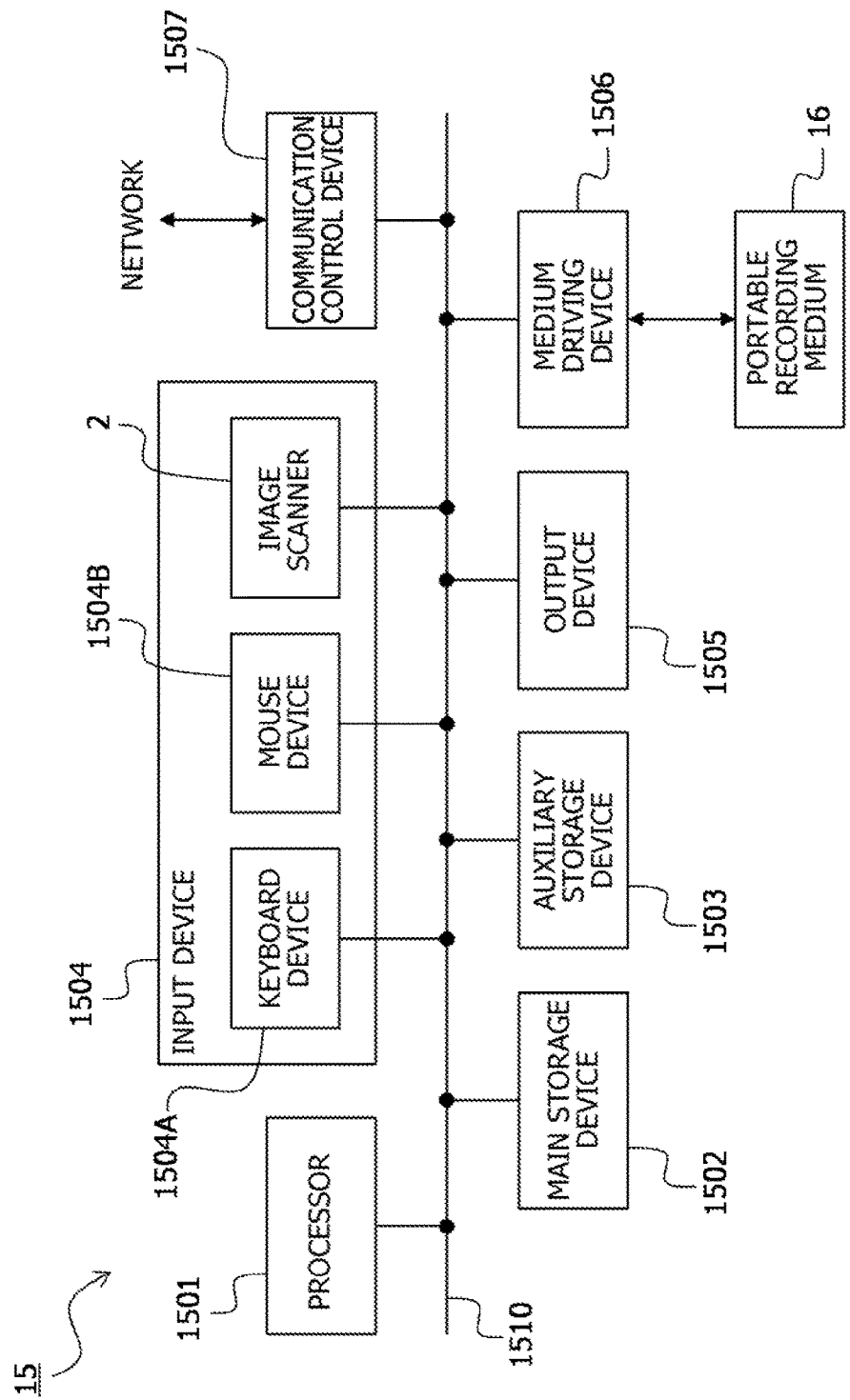

FORM RECOGNITION METHOD, FORM RECOGNITION DEVICE, AND NON-TRANSITORY COMPUTER-READABLE MEDIUM

CROSS-REFERENCE TO RELATED APPLICATION

This application is based upon and claims the benefit of priority of the prior Japanese Patent Application No. 2016-087349, filed on Apr. 25, 2016, the entire contents of which are incorporated herein by reference.

FIELD

The embodiments discussed herein are related to a form recognition method, a form recognition device, and a non-transitory computer-readable medium.

BACKGROUND

In a method of recognizing a form ID (form type) from an image of a form prepared by an image scanner or the like, in recent years, the number of types of recognizable forms is increased and the number of types of forms between which a layout of ruled lines is similar is increased. Accordingly, as one of methods for recognizing a form ID (form type) from an image of a form, for example, a method for extracting a form ID (candidate for form ID) of which the degree of similarity to an image of a form is high from among a large number of form IDs by roughly correlating line segments is known. In this type of recognition method, detailed identification processing by a candidate for the form ID extracted from among a large number of form IDs and a form to be recognized is performed. Therefore, as compared with a case where the detailed identification processing by all form IDs and the form to be recognized is performed, it becomes possible to reduce a processing load and shorten the processing time.

When the candidate for the form ID is extracted, a correlation of the form ID with the form to be recognized is performed based on a feature amount of a line segment pair in the form to which the form ID is imparted and a feature amount of a line segment pair in the form to be recognized. In the feature amount of the line segment pair, for example, a value representing a relationship between line segments and calculated based on a length of each line segment of the line segment pair and a positional relationship between the line segments is used. That is, in this type of form recognition method, in a case where the relationship between the line segments in the line segment pairs is similar, a correlation of the form ID with the form to be recognized is performed. A form ID with a large number of times in which the form ID is correlated with the form to be recognized by a correlation for each line segment pair is extracted as a candidate for the form ID of the form to be recognized.

As one of related technologies in a form recognition method, a technology for correcting distortion which occurs in a line segment in an image of a form to be recognized and performing recognition in a case where the distortion occurs is known.

Examples in technical fields of form recognition include Japanese Laid-open Patent Publication No. 7-282193 and Japanese Laid-open Patent Publication No. 2015-169978.

SUMMARY

According to an aspect of the invention, a form recognition method includes: executing, by a processor, a first line segment pair extraction processing that includes extracting a first line segment pair including a combination of line segments selected from a plurality of line segments included in an image of a form to be recognized; executing, by the processor, a first feature amount calculation processing that includes calculating a first feature amount which represents a relationship between the line segments in the extracted first line segment pair; executing, by the processor, a candidate extraction processing that includes extracting a candidate for a form identifier of the form to be recognized based at least on the calculated first feature amount of the first line segment pair and a second feature amount in line segments in a second line segment pair correlated with a form identifier which is registered in advance; executing, by the processor, a corresponding line segment pair extraction processing that includes extracting corresponding line segment pairs which include a line segment correlated with the candidate for the form identifier and a line segment of the form to be recognized based at least on correspondence between respective line segments in the first line segment pair and respective line segments in the second line segment pair correlated with the candidate for the form identifier; and executing, by the processor, a specification processing that includes specifying the form identifier of the form to be recognized based at least on the degree of overlapping between the line segment extracted from the form to be recognized in the corresponding line segment pair and the line segment correlated with the candidate for the form identifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a detailed identification dictionary;

FIG. 6 is a diagram illustrating an example of registered information of the coarse classification dictionary table used in form recognition processing according to the first embodiment;

FIG. 10D is a (fourth) flowchart for explaining contents of the candidate extraction processing according to the first embodiment;

FIG. 12 is a diagram illustrating a result of a correlation between intra-form line segment pairs;

FIGS. 13A and 13B are diagrams for explaining a corresponding line segment pair extracted from a correlation of the form to be recognized with a form to which a first form ID is imparted;

FIGS. 14A and 14B are diagrams for explaining corresponding line segment pairs extracted from a correlation of the form to be recognized with a form to which a second form ID is imparted;

FIGS. 16A to 16C are diagrams for explaining a correlation of the form to which the first form ID is imparted with a form of an input image in the detailed identification processing;

FIG. 23 is a diagram illustrating an example of registered information of a coarse classification dictionary table used in form recognition processing according to a second embodiment;

FIG. 25A is a (first) flowchart for explaining a portion of candidate extraction processing according to the second embodiment;

FIG. 26 is a diagram illustrating an example of registered information of a coarse classification dictionary table used in form recognition processing according to a third embodiment;

FIG. 29 is a diagram illustrating a hardware configuration of a computer.

DESCRIPTION OF EMBODIMENTS

In a form recognition method in which detailed identification processing by a candidate for the form ID extracted from among a large number of form IDs and an image of a form to be recognized is performed, as described above, it is possible to shorten the processing time as compared with a case where detailed identification processing by all form IDs and the form to be recognized is performed.

However, when the number of line segments (also referred as a count of line segments) in a form to which a single form ID is imparted is large, the number of line segment pairs of line segments in the candidate for the form ID and line segments in the form to be recognized, that are correlated with each other when the detailed identification processing by the candidate for the form ID and the image of the form to be recognized is performed, becomes very large. Moreover, line segment pairs of line segments which do not actually correspond to each other are included among the line segment pairs correlated when the detailed identification processing is performed. For that reason, the processing time desired for detailed identification processing by a candidate for a single form ID and an image of a form to be recognized becomes longer and processing efficiency is reduced.

As one aspect of the present embodiment, provided are solutions for being able to shorten the processing time desired for form recognition.

First Embodiment

Figure 1:
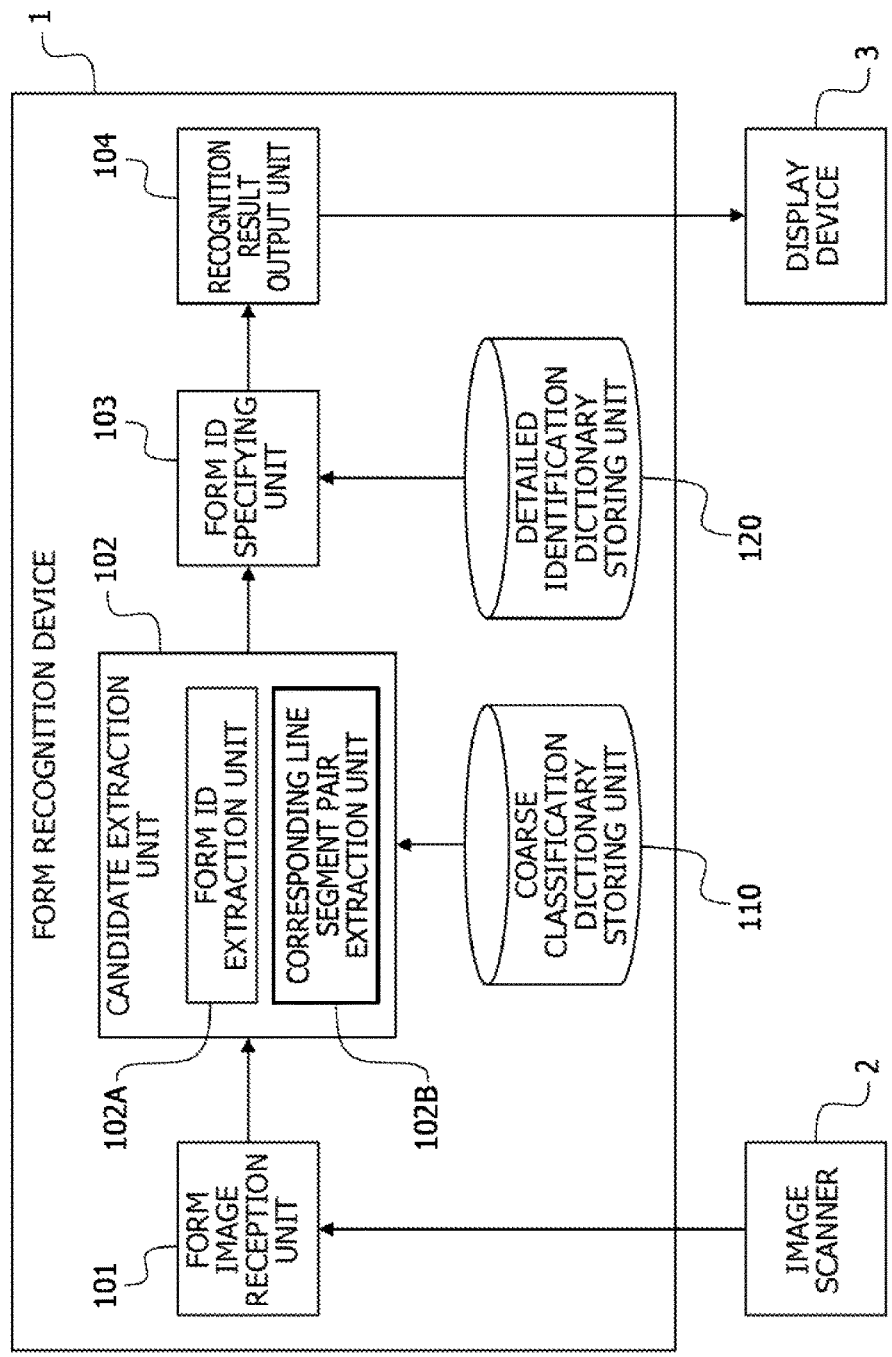
FIG. 1 is a diagram illustrating a functional configuration of a form recognition device according to a first embodiment.

FIG. 1 is a diagram illustrating a functional configuration of a form recognition device according to a first embodiment.

As illustrated in FIG. 1, a form recognition device 1 of the first embodiment includes a form image reception unit 101, a candidate extraction unit 102, a form ID specifying unit 103, and a recognition result output unit 104. The form recognition device 1 includes a coarse classification dictionary storing unit 110 and a detailed identification dictionary storing unit 120. The form image reception unit 101, the candidate extraction unit 102, the form ID specifying unit 103, and the recognition result output unit 104 may be, for example, functional configurations implemented by allowing a processor circuit included in the form recognition device 1 to read a program from a memory and execute the program. In other words, the processor circuit included in the form recognition device 1 has the aspect that the processor circuit is appropriately converted into a hardware circuit which executes a program stored in a memory so as to execute processing as the form image reception unit 101, the candidate extraction unit 102, the form ID specifying unit 103, and the recognition result output unit 104. An example of a hardware configuration of the form recognition device 1 will be described in detail later.

The form image reception unit 101 receives an input of image data of a form which is a recognition target. The image data of a form is prepared using an image scanner 2 or the like. In the following description, the image data of a form may be referred to as a "form image".

The candidate extraction unit 102 extracts a candidate for a type of form (form identifier), which is a recognition target, based on an input form image and a coarse classification dictionary stored in the coarse classification dictionary storing unit 110. The candidate extraction unit 102 extracts a corresponding line segment pair based on correspondence between a line segment (ruled line) in the input form image and a line segment in a form to which a form identifier extracted as a candidate is imparted. In the coarse classification dictionary, for each type of form, a form identifier and information of a line segment pair prepared based on layout information of a line segment are registered in correlation with each other. A corresponding line segment pair is a pair of a line segment in a form to which a form identifier is imparted and a line segment in a form image, of which the number of times correlated with the line segment is the largest. In the following description, an input form image may be referred to as an "input image". In the following description, the form identifier may be referred to as a form ID and a line segment in a form to which a form ID is imparted may be referred to as a "line segment of the form ID".

The candidate extraction unit 102 includes a form ID extraction unit 102A and a corresponding line segment pair extraction unit 102B.

The form ID extraction unit 102A prepares layout information of a line segment (ruled line) in a form which is a recognition target based on the input image. The form ID extraction unit 102A performs a correlation of a line segment pair (intra-form line segment pair) configured by a combination of selected line segments with a line segment pair (intra-form line segment pair) registered in the coarse classification dictionary based on the prepared layout information. Furthermore, the form ID extraction unit 102 extracts a candidate for the ID of a form which is a recognition target based on a correlation result between intra-form line segment pairs.

The corresponding line segment pair extraction unit 102B extracts the corresponding line segment pair based on layout information for the line segment of the form ID extracted by the form ID extraction unit 102A and layout information of the line segment in the input image. The corresponding line segment pair is a pair (inter-form line segment pair) of the line segment of the form ID and the line segment of the input image. The line segment of the input image which forms a pair together with the line segment of the form ID in the corresponding line segment pair is a line segment, of which the number of times correlated with the line segment of the form ID is the largest, among all line segments of the input image when a correlation between intra-form line segment pairs is performed in the form ID extraction unit 102A. The number of the corresponding line segment pairs extracted by the corresponding line segment pair extraction unit 102B is set as a number smaller than the total number of inter-form line segment pairs generated by the line segment of the form ID and the line segment of the input image. In particular, the number of extracted corresponding line segment pairs is preferably set as a number smaller than the total number of the line segments of the form IDs.

The form ID specifying unit 103 performs detailed identification processing based on a candidate for the form ID and the corresponding line segment pair extracted by the candidate extraction unit 102 and the detailed identification dictionary stored in the detailed identification dictionary storing unit 120 and specifies the form ID of the form which is a recognition target. In the detailed identification dictionary, for each type of form, the form ID and layout information of the line segment are registered in correlation with each other. A form ID imparted to a single form type in the coarse classification dictionary and a form ID imparted in the detailed identification dictionary are the same value (identifier).

The form ID specifying unit 103 specifies the form ID of the form to be recognized based on the degree of overlapping between the line segment of the form ID and the line segment of the form which is a recognition target in the corresponding line segment pair. The form ID specifying unit 103 compares a layout of the line segment of the form ID with a layout of the line segment of the input image when the line segments of the corresponding line segment pair are coincided with each other, counts the number of correlated line segments (coincident line segments), and sets the counted number as the degree of overlapping. The form ID specifying unit 103 calculates, for each candidate for the form ID, the maximum value of the number of corrected line segments when the line segments in the corresponding line segment pair are coincided with each other. Thereafter, the form ID specifying unit 103 specifies a candidate, of which the maximum value of the number of the correlated line segments is the largest, as a form ID representing the type of form of the input image (form to be recognized), among the candidates for the form ID.

The recognition result output unit 104 outputs the input image and a recognition result including the form ID specified by the form ID specifying unit 103 to the display device 3 and the like.

Figure 3:
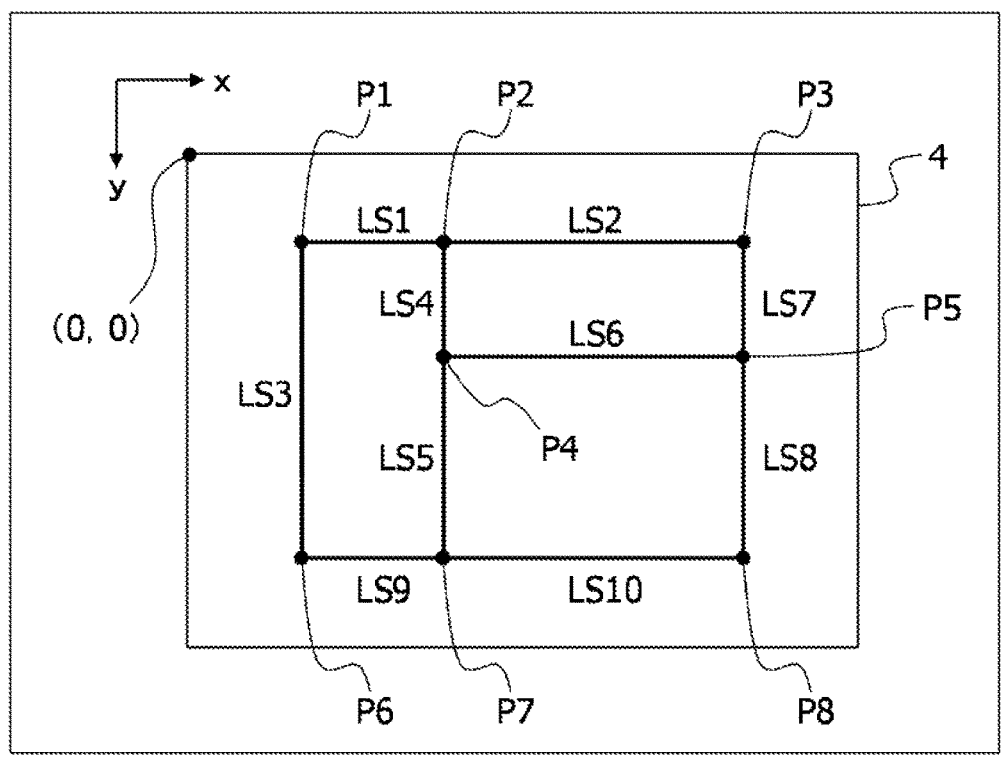
FIG. 3 is a diagram for explaining layout information of a line segment.

FIG. 2 is a diagram illustrating an example of a detailed identification dictionary. FIG. 3 is a diagram for explaining layout information of a line segment.

As illustrated in FIG. 2, the detailed identification dictionary 121 includes a form ID and line segment information. The form ID is a value identifying a type of form and a different value is imparted to each type of form. In FIG. 2, positive integers starting with 1 is used as the form ID. The line segment information is information representing a layout of a line segment (ruled line) printed in a form and includes a line segment ID identifying the line segment and a direction, position, and length of the line segment registered under the line segment ID. In FIG. 2, positive integers starting with 1 is used as the line segment ID. The direction of the line segment is a value represented by one of the horizontal line and the vertical line. The position of the line segment is a coordinate representing a position of the left end in the horizontal line or a position of the upper end in the vertical line.

For example, the ruled line in a form 4 illustrated in FIG. 3 is divided into 10 line segments LS1 to LS10 by contact points P1 to P8 between the horizontal line (straight line extending in x-direction) and the vertical line (straight line extending in y-direction). A position of the line segment LS1 connecting the contact point P1 and the contact point P2 among 10 line segments LS1 to LS10 represents, for example, a position of the contact point P1 when the left upper corner portion of the form 4 is set as a reference (origin (0,0)). The length of the line segment LS1 represents, for example, a distance from the contact point P1 to the contact point P2. For that reason, a value representing that the line segment LS1 is the horizontal line, a position of the contact point P1, and a length (distance from contact point P1 to contact point P2) are registered under the line segment ID imparted to the line segment LS1 in the line segment information correlated with the form ID of the form 4 in the detailed identification dictionary 121. A value representing that the line segment LS1 is the horizontal line or the vertical line, a position of a contact point of one side of each line segment, and a length (distance between contact points) are registered under each line segment ID imparted to each of other line segments LS2 to LS10 in the line segment information correlated with the form ID of the form 4 in the detailed identification dictionary 121.

Figure 4:
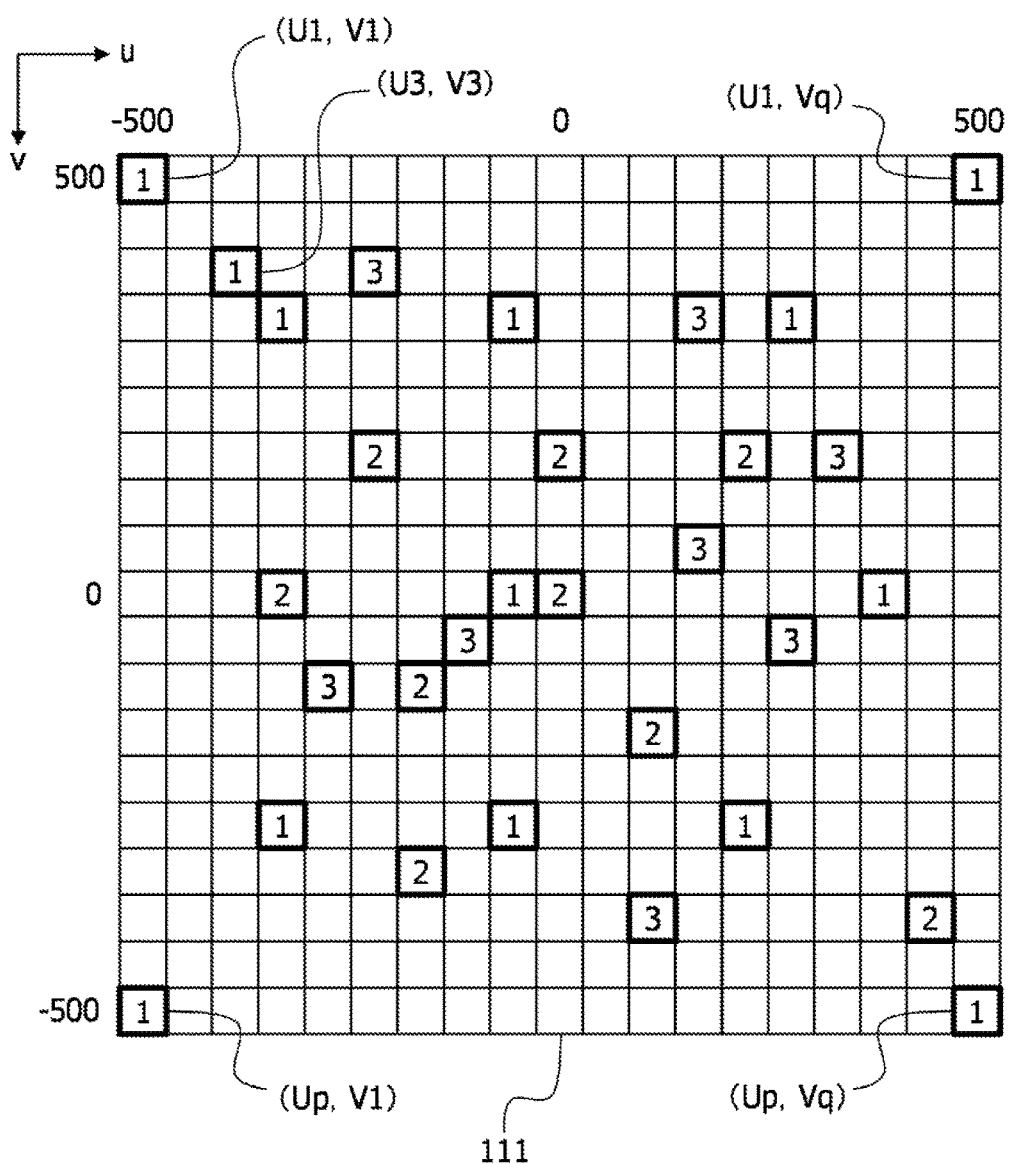
FIG. 4 is a diagram illustrating an example of a coarse classification dictionary table.
Figure 5:
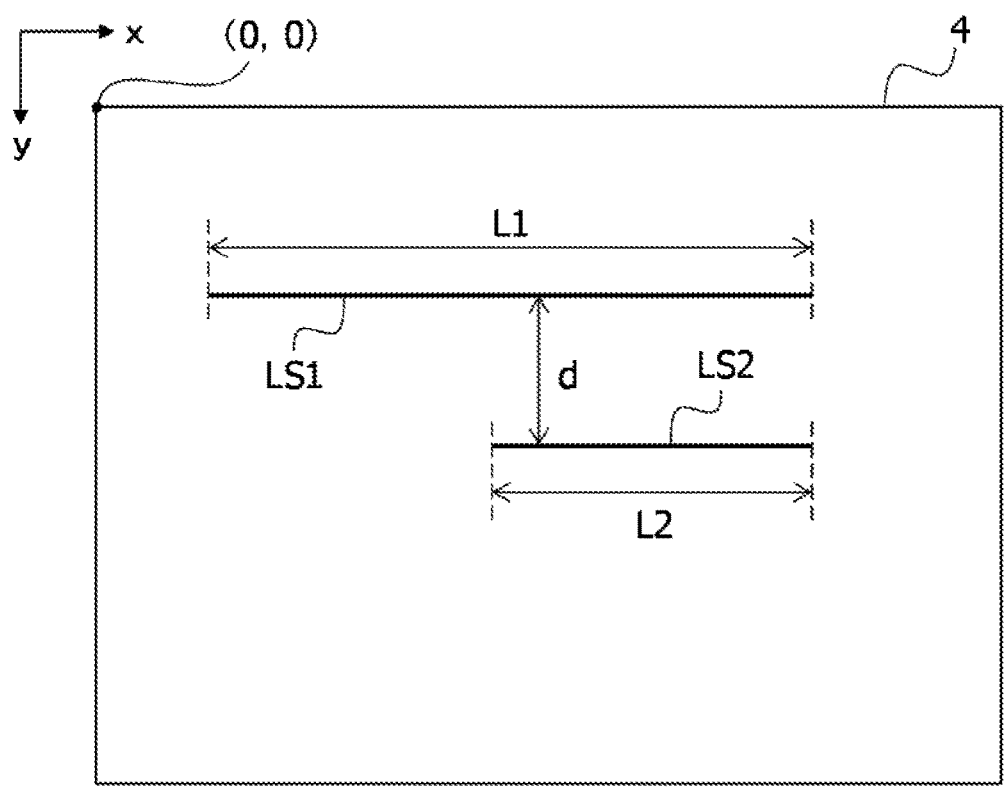
FIG. 5 is a diagram for explaining a calculation method of coordinates of the coarse classification dictionary table for a line segment pair.

FIG. 4 is a diagram illustrating an example of a coarse classification dictionary table. FIG. 5 is a diagram for explaining a calculation method of coordinates of the coarse classification dictionary table for a line segment pair.

The coarse classification dictionary is, for example, given in a form of a table (coarse classification dictionary table 111) in which a plurality of cells are two-dimensionally arranged as illustrated in FIG. 4. The form ID is registered in each cell of the coarse classification dictionary table 111. For example, in FIG. 4, "1" described in cells (U1, V1), (U1, Vq), (Up, V1), and (Up, Vq) of four corners means that the form ID having the number 1 is registered in the cells.

In the coarse classification dictionary table 111, each cell is correlated with the coordinates (u, v) representing a relationship between two line segments within a single form. The coordinates (u, v) representing the relationship between two line segments is calculated based on the lengths of two line segments and a positional relationship therebetween. Correlating of each cell with the coordinates (u, v) in the coarse classification dictionary table 111 may be performed by a method similar to correlating in the coarse classification dictionary table used in known form recognition processing.

For example, both of the first line segment LS1 and the second line segment LS2 are the horizontal lines in the form 4 illustrated in FIG. 5. The coordinates (u, v) representing the relationship between the two horizontal lines are calculated by, for example, the following equation (1-1) and equation (1-2) based on the length L1 of the first line segment LS1, the length L2 of the second line segment LS2, and the spacing d between two line segments LS1 and LS2.

$$u = 500 \times \log 10(L2/L1) \quad (1\text{-}1)$$

$$v = 500 \times \log 10(d/L1) \quad (1\text{-}2)$$

In the coarse classification dictionary table 111 illustrated in FIG. 4, for example, a range of $-500 \leq u \leq 500$ is divided into 19 equal sub-ranges and respective sub-ranges are allocated to 19 cells arranged in the horizontal direction. Similarly, in the coarse classification dictionary table 111 illustrated in FIG. 4, for example, a range of $-500 \leq v \leq 500$ is divided into 19 equal sub-ranges and respective sub-ranges are allocated to 19 cells arranged in the vertical direction. For that reason, a pair of two line segments (intra-form line segment pair) within a single form is correlated with any one of 19×19 cells by the coordinates (u, v). In a case where a value of u calculated by the equation (1-1) is less than −500, u is set as −500 and in a case where the value of u is greater than 500, u is set as 500. Similarly, in a case where a value of v calculated by the equation (1-2) is less than −500, v is set as −500 and in a case where the value of v is greater than 500, v is set as 500.

The ID of the form including the line segments of the line segment pair is stored in the cell correlated with the coordinates (u, v) representing the relationship between the line segments of the intra-form line segment pair among the cells of the coarse classification dictionary table 111. In the coarse classification dictionary table 111 used in the first embodiment, information representing the line segment pair is registered under the form ID stored in the cell correlated with the coordinates (u, v) representing the relationship between the line segments of the line segment pair. That is, in the coarse classification dictionary table 111, the ID of the form is correlated with information representing the line segment pair of two line segments LS1 and LS2 in the cell correlated with the coordinates (u, v) calculated from two line segments LS1 and LS2 illustrated in FIG. 5. In the information representing the line segment pair, for example, the line segment IDs of two line segments LS1 and LS2 are used. In this case, pieces of information, for example, illustrated in FIG. 6 are registered in the coarse classification dictionary table 111. FIG. 6 is a diagram illustrating an example of registered information of the coarse classification dictionary table used in form recognition processing according to the first embodiment.

In the coarse classification dictionary table 111 of FIG. 6, the coordinates of a cell is correlated with registered information. The registered information correlated with the coordinates of a cell includes the form ID and information of the line segment pair registered under the form ID. The information of the line segment pair registered under the form ID includes a line segment ID of each line segment of the line segment pair. In a single cell, pieces of information of a plurality of line segment pairs in a single form ID are able to be registered and the line segment pairs of a plurality of form IDs are able to be registered. For example, in the cell of coordinates (U1, Vq), pieces of information of two sets of line segment pairs are registered under the form ID in a form of which the form ID is 1. For example, in the cell of coordinates (Un, Vm), information of the line segment pair is registered under the form ID in the form of which the form ID is 1. Furthermore, information of the line segment pair is registered under the form ID in the form of which the form ID is 2.

As such, in each cell of the coarse classification dictionary table 111 according to the first embodiment, the form ID as well as information of the line segment pair of the form ID are registered.

The coarse classification dictionary table 111 of FIG. 4 is only one example and the number of cells, the range of coordinates (u, v), or the like may be appropriately changed. The calculation method of the coordinates (u, v) is not limited to the equation (1-1) and equation (1-2) and may be may be appropriately changed.

The coarse classification dictionary table 111 and the detailed identification dictionary 121 described above are prepared by, for example, an information processing device different from the form recognition device 1.

Figure 7:
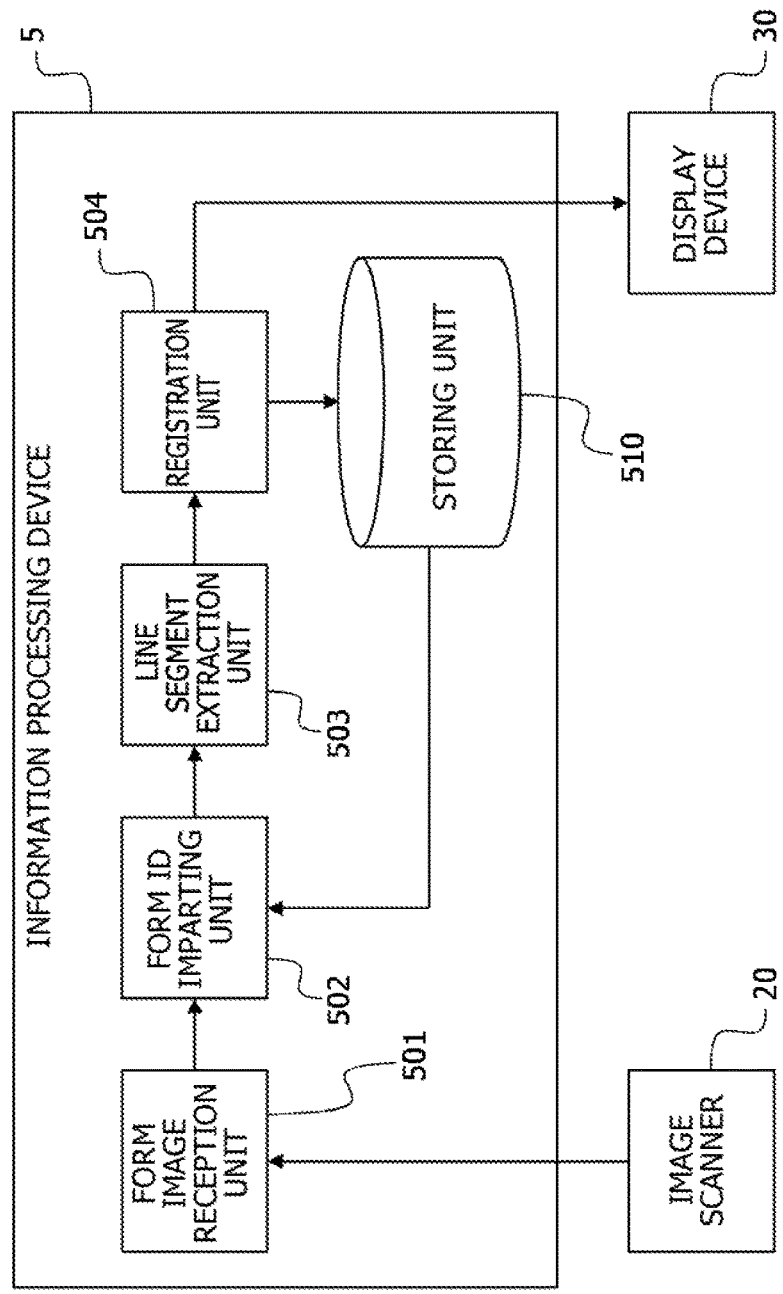
FIG. 7 is a diagram illustrating a functional configuration of an information processing device which prepares the coarse classification dictionary.

FIG. 7 is a diagram illustrating a functional configuration of an information processing device which prepares the coarse classification dictionary.

As illustrated in FIG. 7, the information processing device 5 preparing the coarse classification dictionary includes a form image reception unit 501, a form ID imparting unit 502, a line segment extraction unit 503, a registration unit 504, and a storing unit 510.

The form image reception unit 501 receives an input of image data of a form (form image) to be registered in the coarse classification dictionary. The image is prepared using an image scanner 20 or the like.

The form ID imparting unit 502 imparts a form ID to a form to be registered. The form ID is a value (identifier) for identifying a plurality of forms registered in the coarse classification dictionary. In the form ID, for example, positive integers starting with 1 are used.

The line segment extraction unit 503 extracts the line segment (ruled line) included in the input form image and imparts the line segment ID to the extracted line segment. The line segment extraction unit 503 extracts the line segment from the form image according to, for example, any one of known line segment extraction methods. The line segment ID is a value (identifier) for identifying a plurality of line segments extracted from the form image. As the line segment ID, for example, positive integers starting with 1 are used.

The registration unit 504 calculates the coordinates (u, v) and registers the form ID and the line segment pair in the cell of the calculated coordinates in the coarse classification dictionary table 111 and for each line segment pair regarding a plurality of line segment pairs generated based on the line segment extracted from the form image. The coarse classification dictionary table 111 is stored in the storing unit 510. The registration unit 504 registers the form ID in the cell of the coarse classification dictionary table 111 stored in the storing unit 510 and registers the line segment ID of each line segment of the line segment pair under the form ID. The registration unit 504 outputs, for example, the form image of the form newly registered in the coarse classification dictionary table 111, the imparted form ID, or the like to the display device 30. The registration unit 504 may prepare a detailed identification dictionary 121 including the form ID and a plurality of extracted line segments and store the detailed identification dictionary 121 in the storing unit 510, in addition to perform processing of registering the form ID and information of the line segment pair in the coarse classification dictionary table 111.

The coarse classification dictionary table 111 prepared by the information processing device 5 is stored in the coarse classification dictionary storing unit 110 of the form recognition device 1 through the communication network, for example, the Internet, or through a portable recording medium, for example, an optical disc. In a case where the detailed identification dictionary 121 is also prepared by the information processing device 5, the prepared detailed identification dictionary 121 is stored in the detailed identification dictionary storing unit 120 of the form recognition device 1 through the communication network, for example, the Internet, or through a portable recording medium, for example, an optical disc.

Figure 8A:
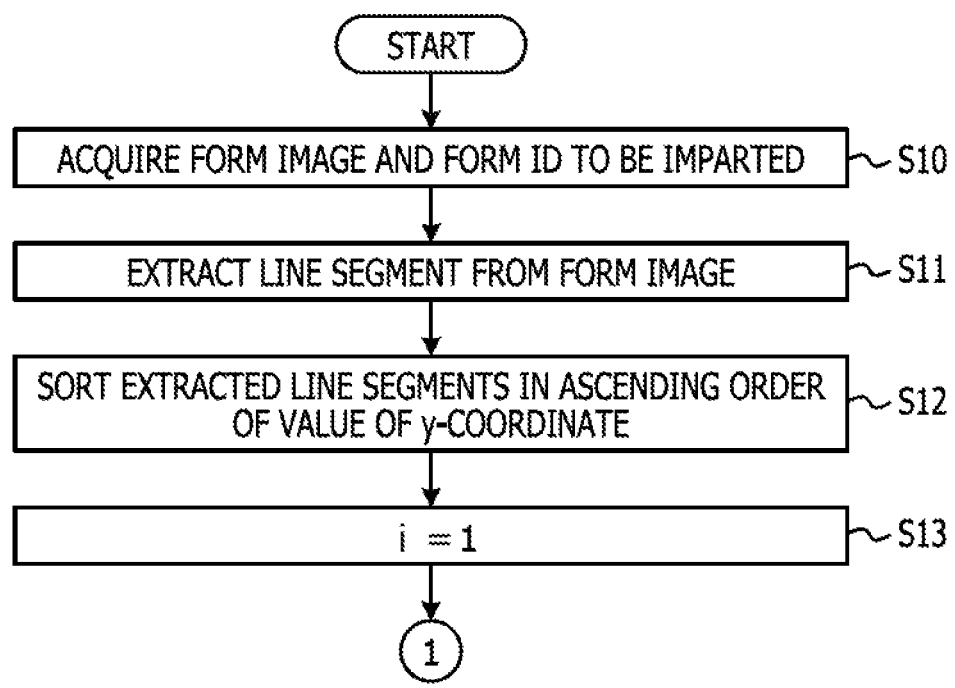
FIG. 8A is a (first) flowchart for explaining preparation processing of the coarse classification dictionary according to the first embodiment.
Figure 8B:
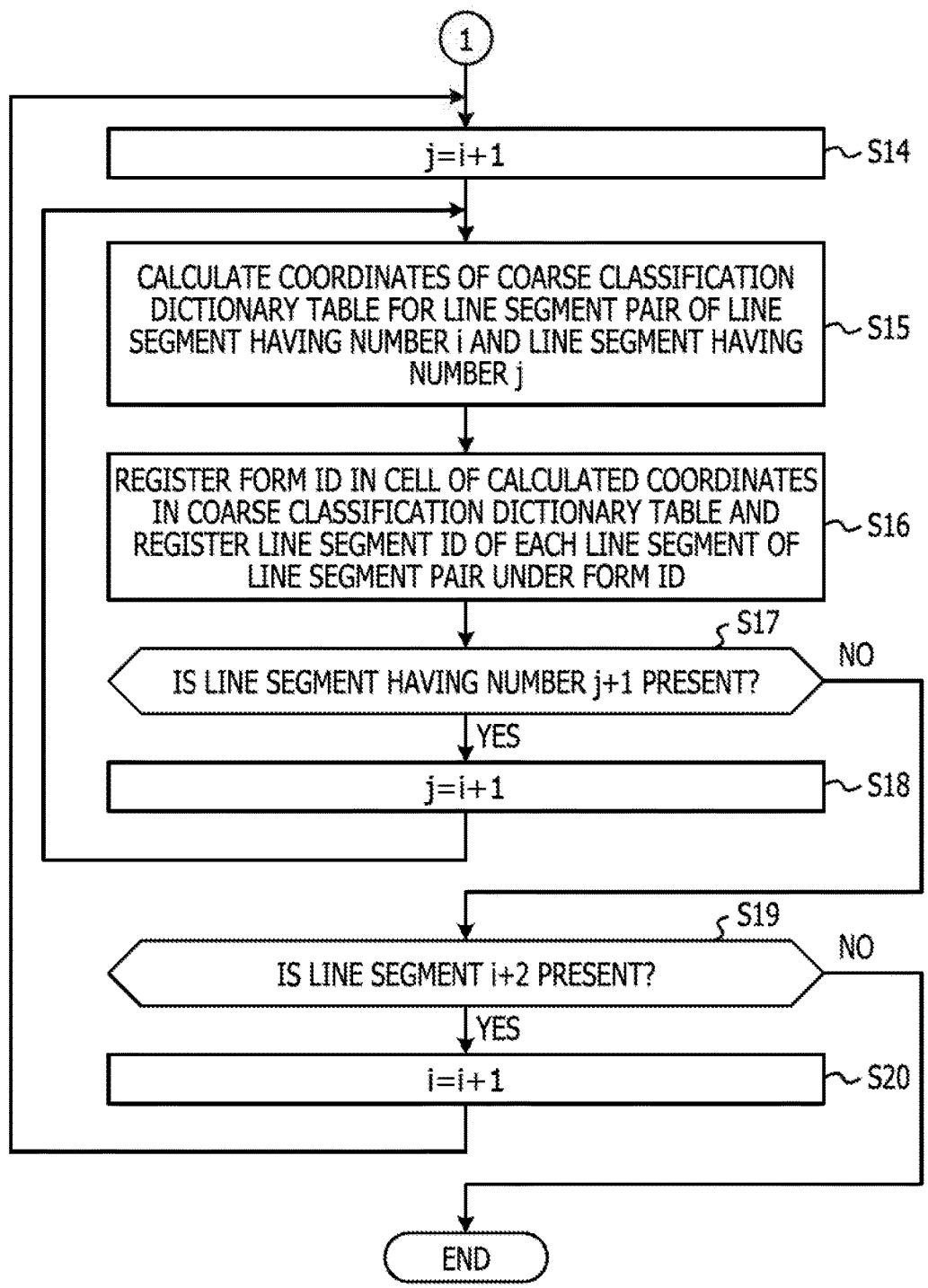
FIG. 8B is a (second) flowchart for explaining the preparation processing of the coarse classification dictionary according to the first embodiment.

FIG. 8A is a (first) flowchart for explaining preparation processing of the coarse classification dictionary according to the first embodiment. FIG. 8B is a (second) flowchart for explaining preparation processing of the coarse classification dictionary according to the first embodiment.

The information processing device 5 preparing the coarse classification dictionary table, as illustrated in FIG. 8A, first, acquires a form image and a form ID to be imparted (Step S10). Processing of Step S10 is performed by the form image reception unit 501 and the form ID imparting unit 502. The form image reception unit 501, for example, receives an input of the form image prepared by and output from the image scanner 20 and transmits the form image to the form ID imparting unit 502. The form ID imparting unit 502, for example, references imparted information of the form ID stored in the storing unit 510, determines a form ID to be imparted to the form to be registered, and imparts the form ID. In a case where the form ID is positive integers starting with 1, the form ID imparting unit 502 determines a number, which is obtained by adding 1 to the maximum value among the imparted form IDs, as the form ID to be imparted to the form to be registered.

The form image acquired in Step S10 is not limited to the image data of a form prepared using the image scanner 2, but may include electronic data of an original plate prepared using, for example, an application or software which runs on the information processing device 5.

Next, the information processing device 5 extracts the line segment representing a ruled line from the form image (Step S11). Processing of Step S11 is performed by the line segment extraction unit 503. The line segment extraction unit 503 extracts the line segment included in the form image according to any one of known ruled line extraction methods and calculates information representing the position and the length. A line segment ID unique to each line segment is imparted to the extracted line segment. The line segment ID is set as, for example, positive integers starting with 1.

Next, the information processing device 5 sorts the extracted line segments in ascending order of a value of the y-coordinate (Step S12). Processing in and after Step S12 is performed by the registration unit 504. In Step S12, in a case where a plurality of line segments having the same value of the y-coordinate are present, the registration unit 504 sorts the line segments, for example, in ascending order of a line segment ID or ascending order of a value of the x-coordinate.

Next, the registration unit 504 sets a variable i, which represents a sorting rank of one of the line segments in the line segment pair, as 1 (Step S13). The information processing device 5 sets a variable j, which represents a sorting rank of the other one of the line segments in the line segment pair, as i+1 (Step S14).

Next, the registration unit 504 calculates coordinates (u, v) of the coarse classification dictionary table for the line segment pair of the line segment having the sorting rank of i and the line segment having the sorting rank of j (Step S15). In Step S15, the registration unit 504 calculates the coordinates (u, v) representing the relationship (feature amount) between the line segment having the number i and the line segment having the number j using, for example, the equation (1-1) and the equation (1-2).

Next, the registration unit 504 registers the form ID in the cell of the calculated coordinates in the coarse classification dictionary table and registers the line segment ID of each line segment of the line segment pair under the form ID (Step S16).

Next, the registration unit 504 determines whether a line segment having the sorting rank of j+1 is present (Step S17). In a case where the line segment having the number j+1 is present (YES in Step S17), the registration unit 504 updates the variable j with j+1 (Step S18) and repeats processing of Step S15 to S17.

On the other hand, in a case where the line segment having the number j+1 is not present (NO in Step S17), the registration unit 504 determines whether a line segment having the number i+2 is present (Step S19). In a case where the line segment having the number i+2 is present (YES in Step S19), the registration unit 504 updates the variable i with i+1 (Step S20) and repeats processing of Steps S14 to S19. When the line segment having the number i+2 is not present (NO in Step S19), the registration unit 504 (information processing device 5) ends the processing for preparing the coarse classification dictionary.

In a case where a plurality of types of forms are to be registered in the coarse classification dictionary table 111, an operator of the information processing device 5 causes the information processing device 5 to perform the processing for preparing the coarse classification dictionary illustrated in FIG. 8A and FIG. 8B for each type of form.

The processing for preparing the coarse classification dictionary illustrated in FIG. 8A and FIG. 8B may be performed together with processing for preparing the detailed identification dictionary 121. That is, after Step S11 in the processing for preparing the coarse classification dictionary illustrated in FIG. 8A, the layout information including pieces of information representing the direction of line segment, the position of line segment, and the length regarding each line segment extracted in Step S11 may be registered in the detailed identification dictionary of the storing unit 510 in correlation with the form ID. Processing for registering the layout information of the extracted line segment in the detailed identification dictionary may be performed in parallel with processing in and after Step S12 and otherwise, performed after the processing for preparing the coarse classification dictionary is ended. The processing for preparing coarse classification dictionary may be performed by reading the layout information of the line segment of the form previously registered in the detailed identification dictionary instead of, for example, Step S10 and Step S11.

Figure 9:
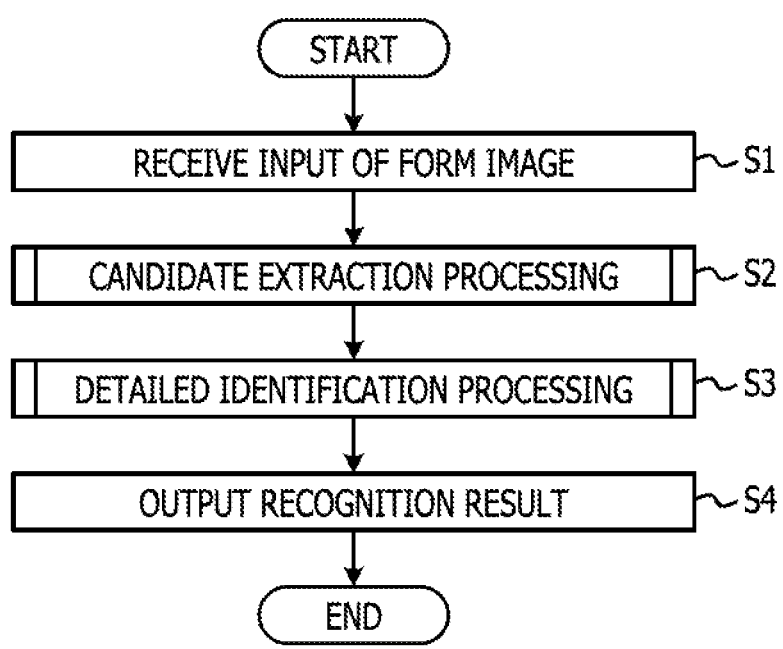
FIG. 9 is a flowchart for explaining form recognition processing according to the first embodiment.

FIG. 9 is a flowchart for explaining form recognition processing according to the first embodiment.

As illustrated in FIG. 9, in form recognition processing performed by the form recognition device 1 of the first embodiment, first, an input of the image of a form (form image) which is a recognition target is received (Step S1). Step S1 is performed by the form image reception unit 101. In processing of Step S1, the form image reception unit 101, for example, receives an input of the form image prepared by and output from the image scanner 2. The form image reception unit 101 transmits the input form image (input image) to the candidate extraction unit 102.

In Step S1, the form image reception unit 101, for example, may acquire a form image designated by the operator from among the form images stored in a storing unit (not illustrated).

Next, the candidate extraction unit 102 performs candidate extraction processing (Step S2) for extracting a candidate for the form ID of the form which is a recognition target based on the input image and the coarse classification dictionary table 111 stored in the coarse classification dictionary storing unit 110. The processing performed by the candidate extraction unit 102 in Step S2 includes the following three processing. The first processing is processing for extracting layout information of the line segment (ruled line) from the input image. The second processing is processing for extracting the candidate for the form ID of the form which is a recognition target based on the line segment pair within the input image and the line segment pair of the form ID registered in the coarse classification dictionary table 111. The third processing is processing for extracting a pair (corresponding line segment pair) of the line segment of the input image and the line segment of the form ID extracted as a candidate, based on the result of the processing for extracting the candidate for the form ID. The line segment of the form ID, as described above, is a line segment of a form to which a form ID is imparted. When the candidate extraction processing is ended, the candidate extraction unit 102 transmits pieces of information of the layout information of the line segment of the input image, the form ID extracted as a candidate, and the extracted corresponding line segment pair to the form ID specifying unit 103.

Next, the form ID specifying unit 103 performs the detailed identification processing (Step S3) for specifying the form ID of the input image (form to be recognized) from among the candidates for the form ID. In Step S3, the form ID specifying unit 103 specifies the form ID of the form to be recognized based on the degree of overlapping between the line segment of the form to be recognized in the corresponding line segment pair and the line segment correlated with the candidate for the form ID. More specifically, the form ID specifying unit 103 performs the correlation of the line segment of the input image with the line segment of the form ID for each form ID, which becomes a candidate, based on information of the line segment of the input image, the detailed identification dictionary 121, information of the corresponding line segment pair. Thereafter, the form ID specifying unit 103 specifies the form ID, of which the number of the line segments correlated with the line segment of the input image is the largest, among the candidates for the form IDs as the form ID of the form which is a recognition target and transmits the specified form ID to the recognition result output unit 104.

Next, the recognition result output unit 104 outputs the form ID specified in the detailed identification processing as a recognition result of the input form image to the display device 3 and the like (Step S4). In Step S4, the recognition result output unit 104 may output the input form image together with, for example, the recognition result (form ID), to the display device 3 and the like and display the form image and the form ID on a display device 3. In Step S4, the recognition result output unit 104 may perform optical character recognition (OCR) processing on the input form image based on, for example, the result of the detailed identification processing, and output the result of the OCR processing together with the form ID of the form to be recognized.

Figure 10A:
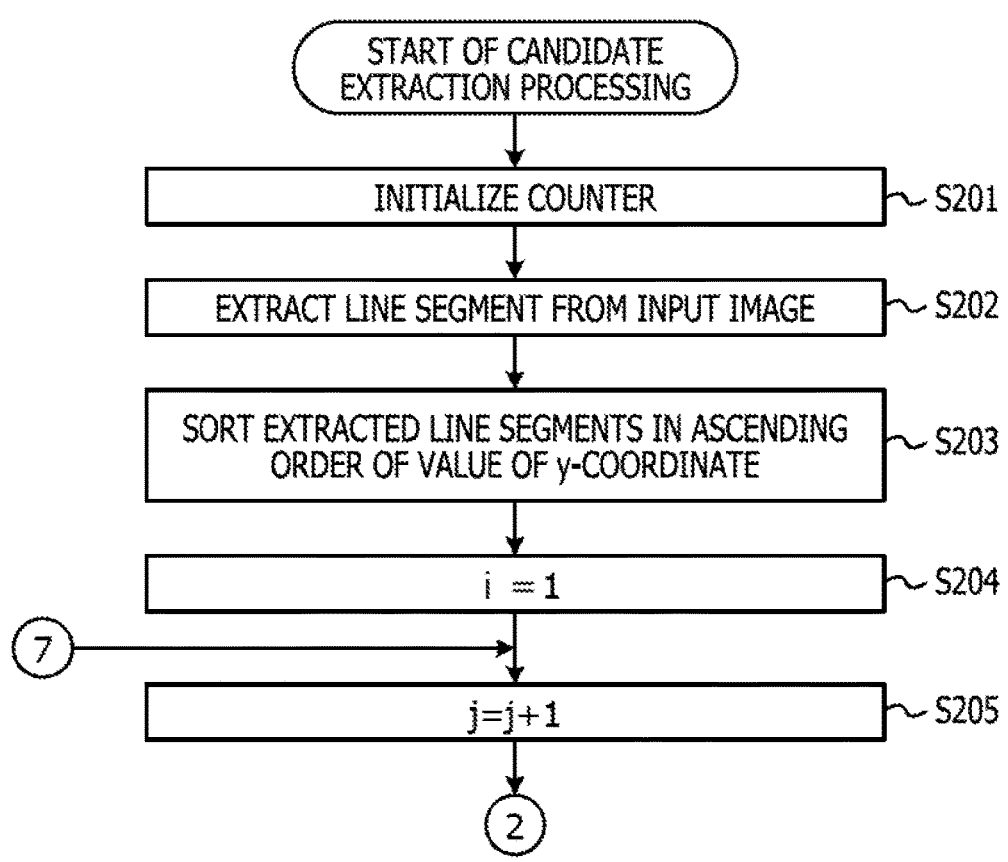
FIG. 10A is a (first) flowchart for explaining contents of candidate extraction processing according to the first embodiment.
Figure 10B:
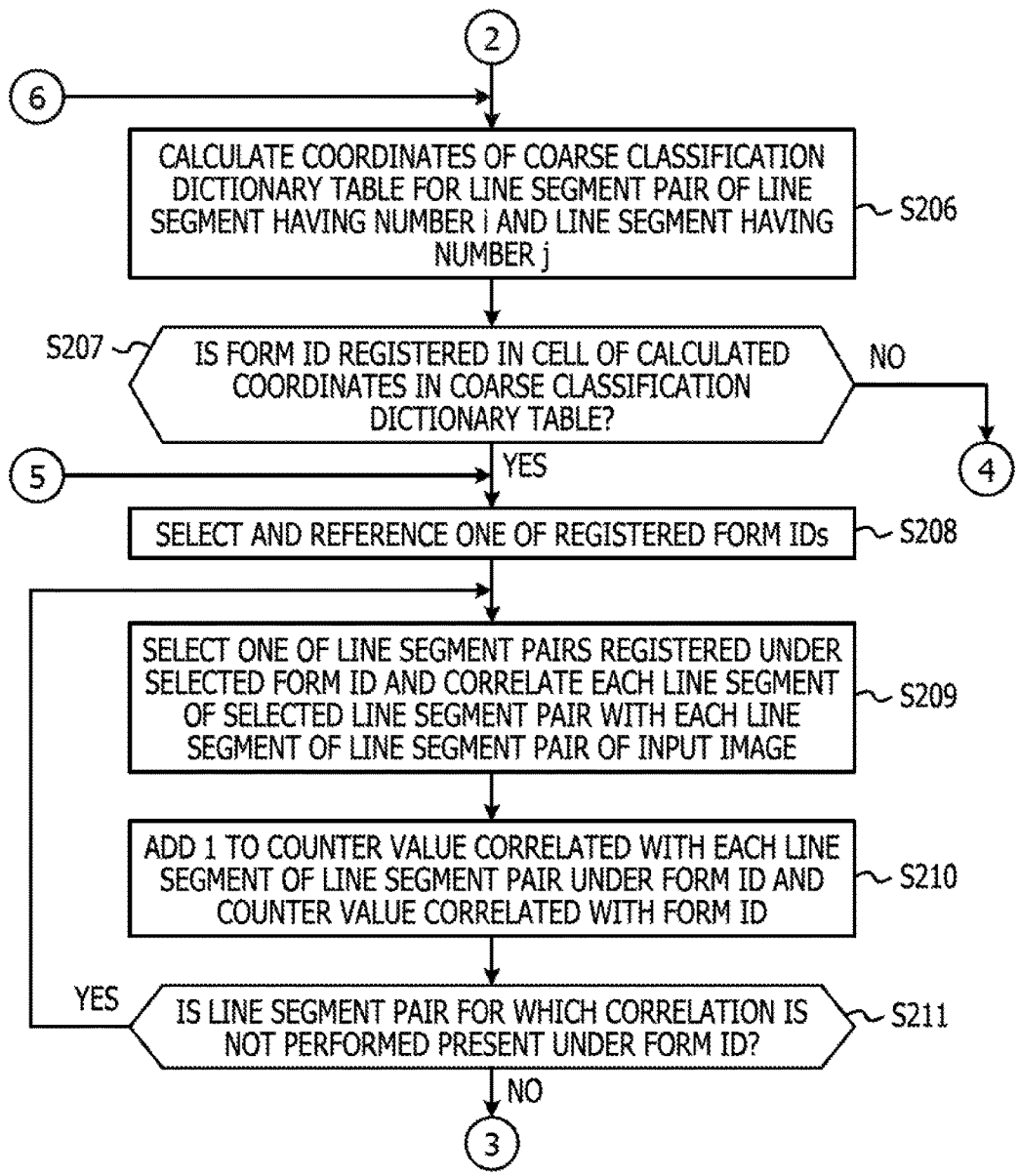
FIG. 10B is a (second) flowchart for explaining contents of the candidate extraction processing according to the first embodiment.
Figure 10C:
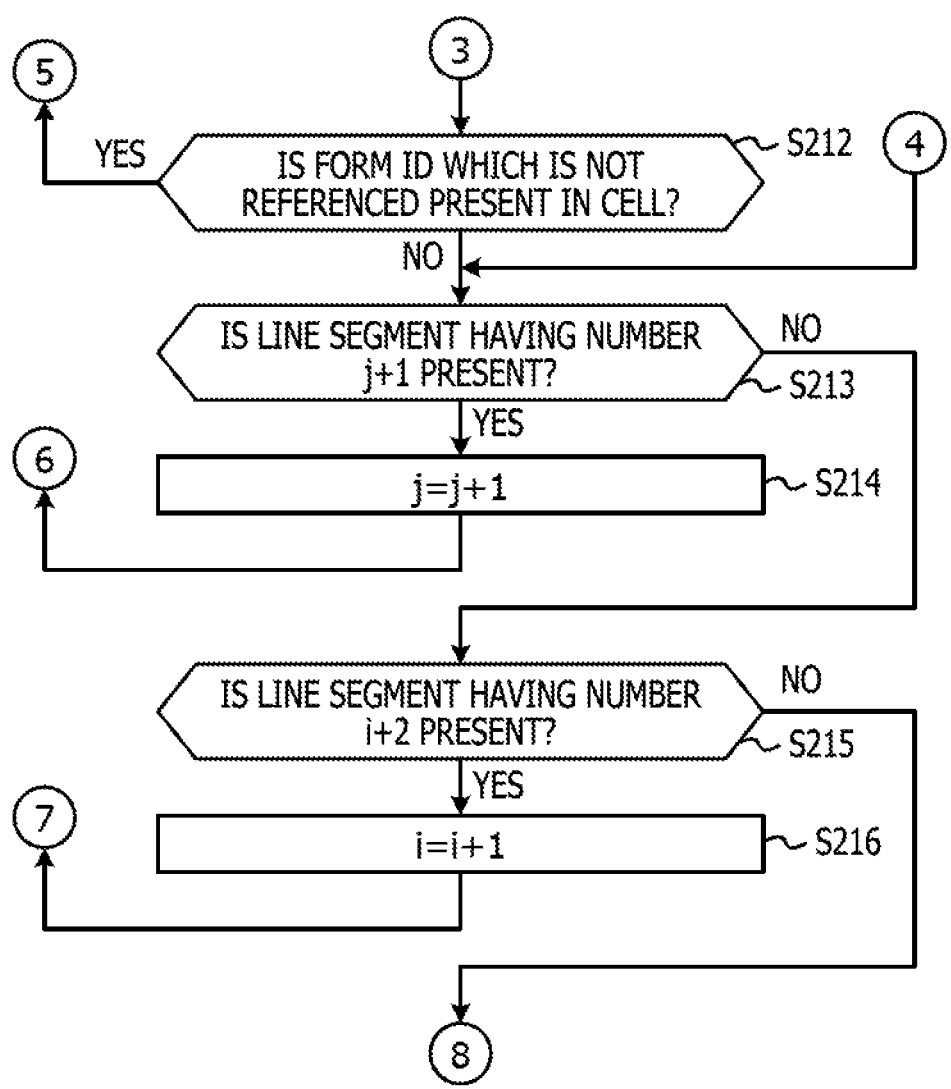
FIG. 10C is a (third) flowchart for explaining contents of the candidate extraction processing according to the first embodiment.
Figure 10E:
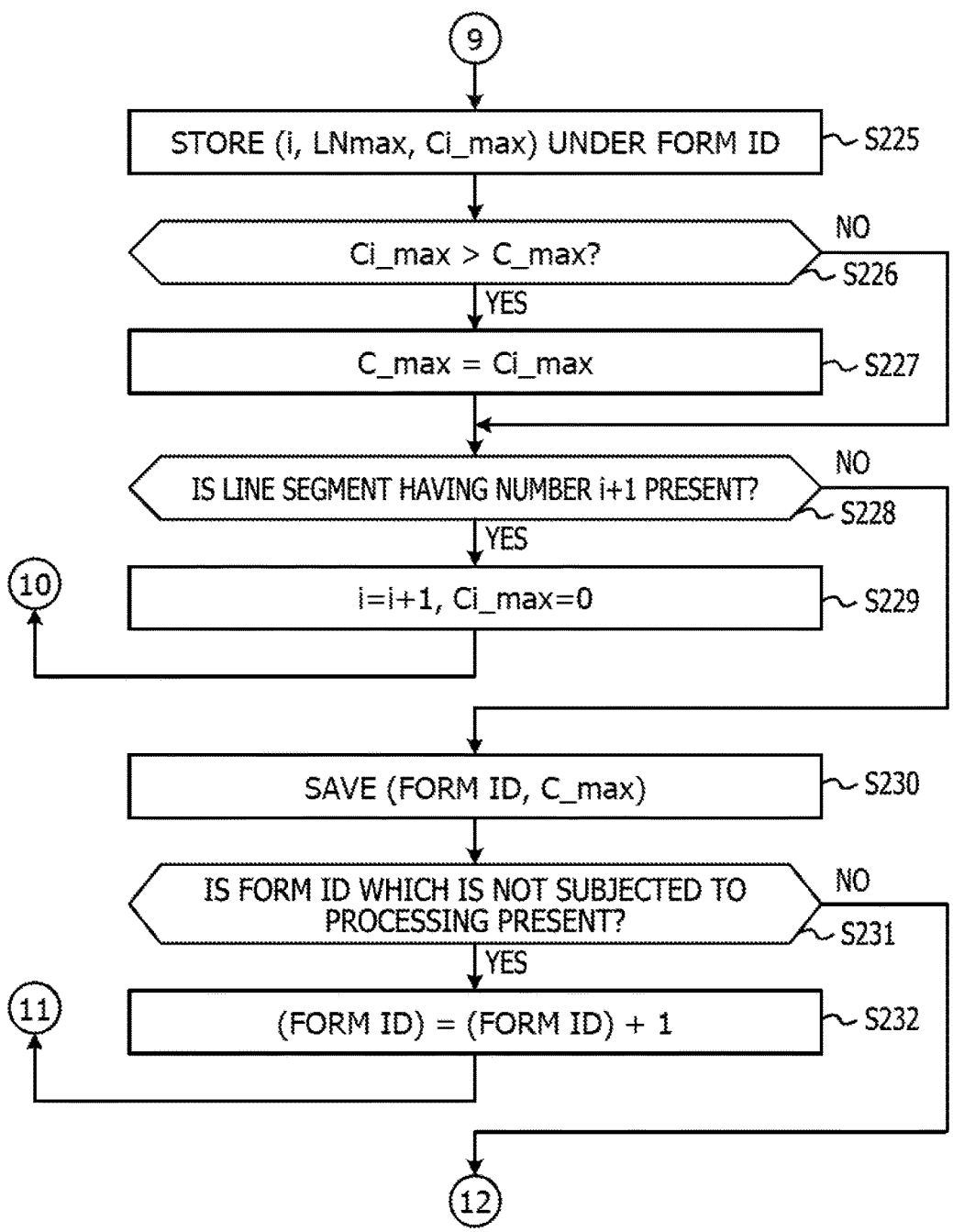
FIG. 10E is a (fifth) flowchart for explaining contents of the candidate extraction processing according to the first embodiment.
Figure 10F:
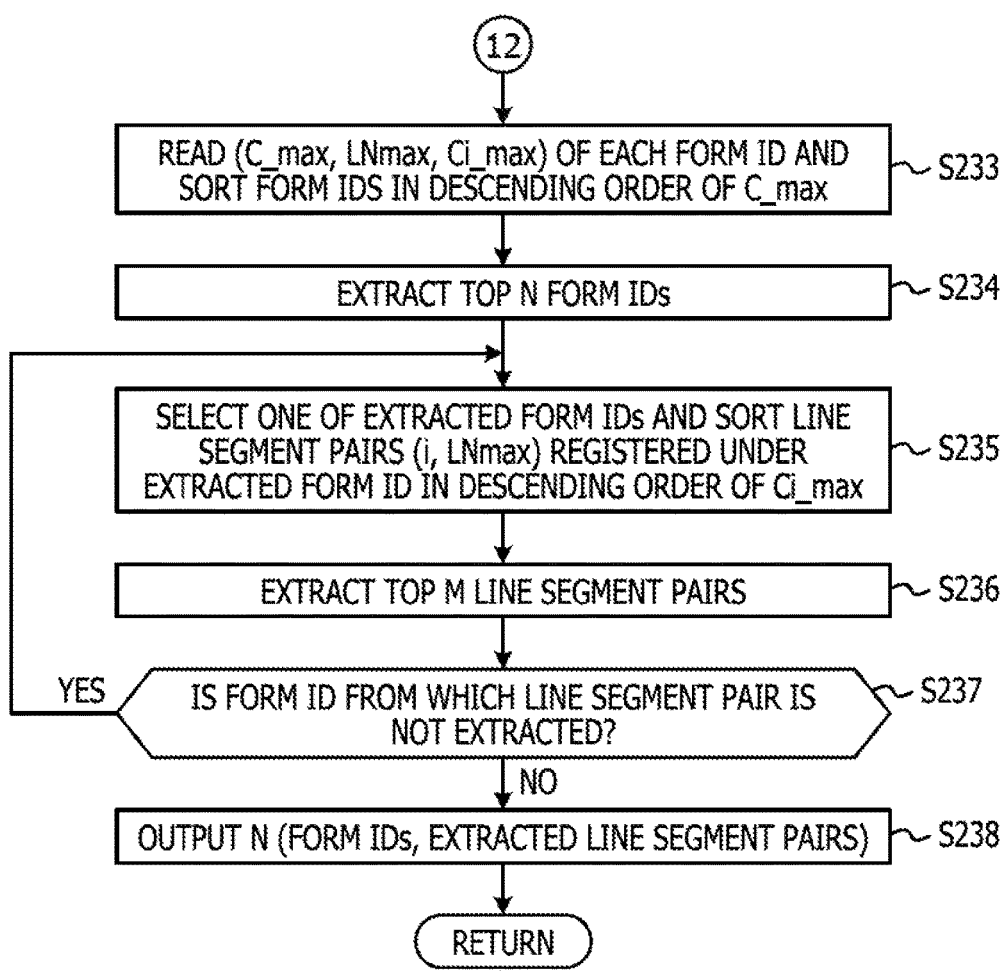
FIG. 10F is a (sixth) flowchart for explaining contents of the candidate extraction processing according to the first embodiment.

FIG. 10A is a (first) flowchart for explaining contents of candidate extraction processing according to the first embodiment. FIG. 10B is a (second) flowchart for explaining contents of the candidate extraction processing according to the first embodiment. FIG. 10C is a (third) flowchart for explaining contents of the candidate extraction processing according to the first embodiment. FIG. 10D is a (fourth) flowchart for explaining contents of the candidate extraction processing according to the first embodiment. FIG. 10E is a (fifth) flowchart for explaining contents of the candidate extraction processing according to the first embodiment. FIG. 10F is a (sixth) flowchart for explaining contents of the candidate extraction processing according to the first embodiment.

The candidate extraction processing in the form recognition processing of the first embodiment, as described above, is performed by the candidate extraction unit 102 of the form recognition device 1. When the form image to be recognized (input image) is received from the form image reception unit 101, the candidate extraction unit 102 performs processing illustrated in FIG. 10A to FIG. 10F as the candidate extraction processing of Step S2.

The candidate extraction unit 102, first, initializes a value of a counter, as illustrated in FIG. 10A (Step S201). Step S201 is performed by the form ID extraction unit 102A. In Step S201, the form ID extraction unit 102A sets, for example, values of the counter described in the following to 0, respectively.

(1) A value of the counter which counts a total number of correlations of the line segment pairs (inter-form line segment pairs) of the line segments of the form ID and the line segments of the input image, regarding each of all form IDs registered in the coarse classification dictionary.

(2) A value of the counter which counts the number of times in which the line segment of the input image is correlated with each line segment in the line segment pair (intra-form line segment pair) registered under the form ID.

Next, the form ID extraction unit 102A extracts the line segment from the input image (Step S202) and sorts the extracted line segments line in ascending order of a value of the y-coordinate (Step S203). Processing of Step S202 is performed according to, for example, any one of known ruled line extraction processing. The line segment ID is imparted to the line segment extracted from the input image. The line segment ID is a value identifying a plurality of line segments within a single input image and for example, positive integers starting with 1 are used as the line segment ID. In processing of Step S203, in a case where a plurality of line segments having the same value of the y-coordinate are present, an arrangement order of the line segments is determined according to a predetermined rule (for example, sorting of line segments in ascending order of a value of the x-coordinate).

Next, the form ID extraction unit 102A sets the variable i, which represents a sorting rank of one line segment in the line segment pair of the input image, as 1 (Step S204). The form ID extraction unit 102A sets the variable j, which represents a sorting rank of the other one line segment in the line segment pair of the input image, as i+1 (Step S205).

Next, the form ID extraction unit 102A, as illustrated in FIG. 10B, calculates the coordinates of the coarse classification dictionary table for the line segment pair of the line segment having the sorting rank of i and the line segment having the sorting rank of j (Step S206). In Step S206, the form ID extraction unit 102A calculates the coordinates (u, v) regarding the line segment pair using, for example, the equation (1-1) and equation (1-2).

Next, the form ID extraction unit 102A references the cell of the coordinates calculated in Step S206 in the coarse classification dictionary table and confirms whether the form ID is registered in the cell (Step S207). In a case where the form ID is not registered (NO in Step S207), the form ID extraction unit 102A, as illustrated in FIG. 10C, determines whether the line segment having the number j+1 is present (Step S213).

On the other hand, in a case where the form ID is registered in the referenced cell (YES in Step S207), the form ID extraction unit 102A selects and references one of form IDs registered in the cell (Step S208). In a case where a single form ID is registered in the cell, the form ID extraction unit 102A selects and references the single form ID in Step S208. In a case where a plurality of form IDs are registered in the cell, the form ID extraction unit 102A selects and references one of the form IDs, which is not subjected to processing of Steps S209 and S210, according to a predetermined selection rule in Step S208. The selection rule is a rule that a form ID, of which the value of the form ID is the smallest is selected, among the form IDs which is not subjected to, for example, processing of Steps S209 and S210.

Next, the form ID extraction unit 102A selects one of the line segment pairs registered under the selected form ID and correlates each line segment of the selected line segment pair with each line segment of the line segment pair of the input image (Step S209). In a case where a single line segment pair is registered under the selected form ID, the form ID extraction unit 102A selects the single line segment pair in Step S209. In a case where a plurality of line segment pairs are registered under the referenced form ID, the form ID extraction unit 102A selects one of the line segment pairs, which is not subjected to the correlation of Step S209, according to the predetermined selection rule in Step S209. The selection rule is a rule that a line segment pair, of which a registering rank is the highest is selected, among the line segment pairs for which the correlation of, for example, Step S209, is not performed.

Next, the form ID extraction unit 102A adds 1 to a counter value correlated with each line segment in the line segment pair under the form ID and a counter value correlated with the form ID (Step S210). The counter value correlated with each line segment in the line segment pair under the form ID is the value of the counter described in (2), that is, the value of the counter which counts the number of times in which the line segment of the input image is correlated with each line segment in the line segment pair registered under the form ID. The counter value correlated with each form ID is the value of the counter described in (1), that is, the value of the counter which counts a total number of correlations of the line segment pairs (inter-form segment pair) of the line segments of the form ID with the line segments of the input image.

Next, the form ID extraction unit 102A determines whether a line segment pair for which the correlation with the line segment pair, which is represented by variables i and j of the input image, is not performed is present among the line segment pairs registered under the form ID referenced in Step S208 (Step S211). In a case where the line segment pair for which the correlation is not performed is present (YES in Step S211), the form ID extraction unit 102A repeats processing in and after Step S209. In a case where the correlation is performed for all line segment pairs (NO in Step S211), the form ID extraction unit 102A, as illustrated in FIG. 10C, determines whether the form ID which is not referenced in Step S208 is present in the cell (Step S212). In a case where the form ID which is not referenced is present in the cell (YES in Step S212), the form ID extraction unit 102A repeats processing in and after Step S208.

In a case where all form IDs within the cell are referenced and processing in and after Step S209 is performed (NO in Step S212), the form ID extraction unit 102A determines whether the line segment having the number j+1 is present in the line segments extracted from the input image (Step S213). In a case where the line segment having the number j+1 is present (YES in Step S213), the form ID extraction unit 102A updates the variable j with j+1 (Step S214), and repeats processing in and after Step S206. On the other hand, in a case where the line segment having the number j+1 is not present (NO in Step S213), the form ID extraction unit 102A determines whether the line segment having the number i+2 is present in the line segments extracted from the input image (Step S215). In a case where the line segment having the number i+2 is present (YES in Step S215), the form ID extraction unit 102A updates the variable i with i+1 (Step S216), and repeats processing in and after Step S205.

In a case where the line segment having the number i+2 is not present (NO in Step S215), the form ID extraction unit 102A, as illustrated in FIG. 10D, acquires the maximum line segment number j_max in the input image and sets the value designating the form ID as 1 (Step S217). The value designating the form ID to be set in Step S217 is set as a value of the minimum form ID among all form IDs. In the first embodiment, positive integers starting with 1 are used as the form ID and thus, the form ID extraction unit 102A sets the value designating the form ID as 1 in Step S217.

Next, the form ID extraction unit 102A initializes the variable i representing the line segment of the form ID, the maximum value Ci_max of the number of times in which the line segment having the number i is correlated with a single line segment in the input image, and the maximum value C_max among the maximum values Ci_max for each line segment of the form ID (Step S218). In the following description, the maximum value Ci_max of the number of times in which the line segment having the number i is correlated with a single line segment in the input image is referred to as a first maximum value and the maximum value C_max among the maximum values Ci_max for each line segment is referred to as a second maximum value. In a case where the line segment IDs of the line segments in the form ID are positive integers starting with 1, the form ID extraction unit 102A sets the variable i as 1 in Step S218. The form ID extraction unit 102A sets the first maximum value Ci_max and the second maximum value C_max as 0, respectively, in Step S218.

Next, the form ID extraction unit 102A initializes the variable j representing the line segment of the input image (Step S219). In a case where the line segment IDs of the line segments in the input image are positive integers starting with 1, the form ID extraction unit 102A sets the variable j as 1 in Step S219.

Next, the form ID extraction unit 102A references the j-th value C of the counter for the line segment having the number i of the form ID currently designated (Step S220). In Step S220, the form ID extraction unit 102A references a counter arrangement regarding the line segments of the input image correlated with the i-th line segment of the form ID counted in Step S210. That is, the value C referenced by the form ID extraction unit 102A in Step S220 is the number of times in which the line segment having the number i of the form ID is correlated with the line segment having the number j of the input image.

Next, the form ID extraction unit 102A determines whether the referenced value C is greater than the first maximum value Ci_max at the current time point regarding the line segment having the number i (Step S221). In a case of C>Ci_max (YES in Step S221), the form ID extraction unit 102A updates the first maximum value Ci_max with the value C and updates a most correlated line segment LNmax with j (Step S222). Here, the most correlated line segment LNmax is a line segment ID of a line segment having the largest number of times in which the line segment is correlated with the line segment having the number i of the form ID, at the current time point, among the line segments of the input image.

After Step S222, the form ID extraction unit 102A determines whether the variable j representing the line segment of the input image is less than the maximum line segment number j_max (Step S223). In a case where the value C satisfies C≤Ci_max (NO in Step S221), the form ID extraction unit 102A omits Step S222 and performs a determination in Step S223.

In a case of j<j_max (YES in Step S223), the form ID extraction unit 102A updates the variable j with j+1 (Step S224) and performs processing in and after Step S220. On the other hand, in a case of j≥j_max (NO in Step S223), the form ID extraction unit 102A, as illustrated in FIG. 10E, stores the variable i, the most correlated line segment LNmax, and the first maximum value Ci_max under the form ID (Step S225).

Next, the form ID extraction unit 102A determines whether the first maximum value Ci_max is greater than the second maximum value C_max (Step S226). In a case of Ci_max>C_max (YES in Step S226), the form ID extraction unit 102A updates the second maximum value C_max with the first maximum value Ci_max (Step S227).

After Step S227, the form ID extraction unit 102A determines whether the line segment having the number i+1 is present under the form ID (Step S228). In a case of Ci_max≤C_max (NO in Step S226), the form ID extraction unit 102A omits Step S227 and performs a determination in Step S228.

In a case where the line segment having the number i+1 is present under the form ID (YES in Step S228), the form ID extraction unit 102A updates the variable i with i+1, initializes the first maximum value Ci_max (Step S229), and repeats processing in and after Step S219.

In a case where the line segment having the number i+1 is not present (NO in Step S228), the form ID extraction unit 102A saves the form ID currently designated and the second maximum value C_max (Step S230). In Step S230, the form ID extraction unit 102A saves a set of the form ID and the second maximum value C_max in, for example, a buffer which is not illustrated in FIG. 1.

After Step S230, the form ID extraction unit 102A determines whether the form ID which is not subjected to processing in and after Step S218 is present (Step S231). In a case where am unprocessed form ID is present (YES in Step S231), the form ID extraction unit 102A updates the value designating the form ID (Step S232) and repeats processing in and after Step S218.

On the other hand, in a case where processing in and after Step S218 is performed for all form IDs (No in Step S231), the form ID extraction unit 102A performs processing of Step S233 illustrated in FIG. 10F. That is, the form ID extraction unit 102A reads a set of the second maximum value C_max, the most correlated line segment LNmax, and the first maximum value Ci_max of each form ID and sorts the form IDs in descending order of the second maximum value C_max. In a case where a plurality of form IDs having the same second maximum value C_max are present, the form ID extraction unit 102A determines an arrangement order of the plurality of form IDs of which the second maximum values C_max are the same according to a predetermined sorting rule. The sorting rule is assumed as a rule that, for example, the form IDs are arranged in order of a form ID having the small value which represents the form ID.

Next, the form ID extraction unit 102A extracts the top N form IDs in the arrangement order of form IDs after sorting as the candidates for the form ID to be recognized (Step S234). After Step S234, the form ID extraction unit 102A transmits a set of the form ID regarding the extracted N form IDs, the second maximum value C_max, the most correlated line segment LNmax, and the first maximum value Ci_max to the corresponding line segment pair extraction unit 102B of the candidate extraction unit 102.

When information about the N form IDs is received from the form ID extraction unit 102A, the corresponding line segment pair extraction unit 102B performs processing of Steps S235 to S238 illustrated in FIG. 10F. That is, the corresponding line segment pair extraction unit 102B, first, selects one of the N form IDs and sorts the line segment pairs (i, LNmax) stored under the form ID in descending order of the first maximum value Ci_max (Step S235). In a case where a plurality of line segments of which the first maximum values Ci_max are the same are present, the corresponding line segment pair extraction unit 102B determines an arrangement order of the plurality of line segment of which the first maximum values Ci_max are the same according to a predetermined sorting rule. The sorting rule is assumed as a rule that, for example, the line segments in order of a line segment having the small value which represents the line segment ID are arranged (in other words, arranges line segments in order of a line segment of which the rank is the highest in the arrangement order before sorting).

Next, the corresponding line segment pair extraction unit 102B extracts the top M line segment pairs as the corresponding line segment pair in the arrangement order of the line segment pairs (i, LNmax) after sorting (Step S236).

Next, the corresponding line segment pair extraction unit 102B determines whether the form ID from which the corresponding line segment pair is not extracted, that is, the form ID from which the top M line segment pairs (i, LNmax) are not extracted is present (Step S237). In a case where the form ID from which the corresponding line segment pair is not extracted is present (YES in Step S237), the corresponding line segment pair extraction unit 102B repeats processing in and after Step S235. On the other hand, in a case where the corresponding line segment pair is extracted from all form IDs (NO in Step S237), the corresponding line segment pair extraction unit 102B outputs pieces of information of the form ID and the corresponding line segment pair regarding the extracted N form IDs to the form ID specifying unit 103 (Step S238). When Step S238 is ended, the candidate extraction unit 102 ends the candidate extraction processing regarding a single input image (form which is a recognition target) (return).

Figure 11A:
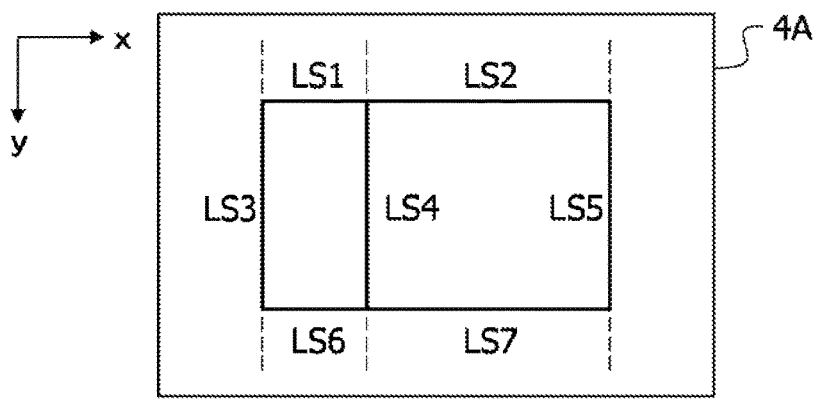
FIGS. 11A to 11C are diagrams illustrating examples of a form to be recognized and a form registered in the coarse classification dictionary.
Figure 11B:
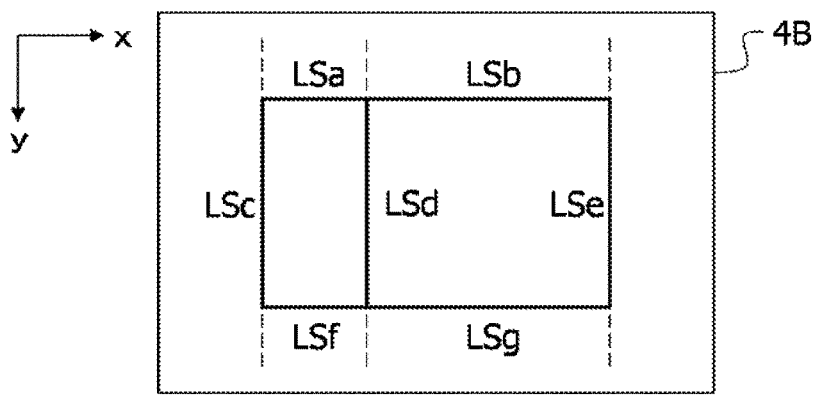
Figure 11C:
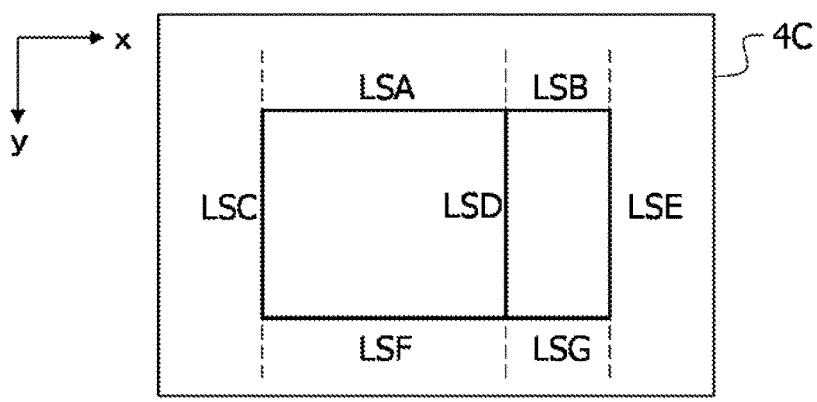

FIGS. 11A to 11C are diagrams illustrating examples of the form to be recognized and a form registered in the coarse classification dictionary. FIG. 12 is a diagram illustrating a result of correlation between intra-form line segment pairs.

In FIG. 11A, an example of a form 4A to be recognized is illustrated. Seven line segments LS1 to LS7 are printed in the form to be recognized 4A. In the form to be recognized 4A, the line segments LS1 to LS7 are extracted by performing predetermined ruled line extraction processing on an image of the form to be recognized 4A.

In FIG. 11B, an example of a first form 4B registered in the coarse classification dictionary is illustrated. Seven line segments LSa to LSg are printed in the first form 4B. In the first form 4B, the line segments LSa to LSg are extracted by performing predetermined ruled line extraction processing on an image of the first form 4B. In the coarse classification dictionary and the detailed identification dictionary, a first form ID is imparted to the first form 4B.

A layout of the line segment of the form 4A to be recognized is similar to that of the first form 4B. In the form to be recognized 4A, a first rectangle formed by four line segments LS1, LS3, LS4, and LS6 and a second rectangle formed by four line segments LS2, LS4, LS5, and LS7 are adjacent to each other in the horizontal direction (x-direction). Similarly, in the first form 4B, a first rectangle formed by four line segments LSa, LSc, LSd, and LSf and a second rectangle formed by four line segments LSb, LSd, LSe, and LSg are adjacent to each other in the horizontal direction. In both the form 4A to be recognized and the first form 4B, the first rectangle is a vertically long rectangle and the second rectangle is a horizontally long rectangle.

In FIG. 11C, an example of a second form 4C registered in the coarse classification dictionary. Seven line segments LSA to LSG are printed in the second form 4C. In the second form 4C, the line segments LSA to LSG are extracted by performing predetermined ruled line extraction processing on an image of the second form 4C. In the coarse classification dictionary and the detailed identification dictionary, a second form ID different from the first form ID is imparted to the second form 4C.

A layout of the line segment of the form 4A to be recognized is similar to that of the second form 4C. In the form to be recognized 4A, the first rectangle formed by four line segments LS1, LS3, LS4, and LS6 and the second rectangle formed by four line segments LS2, LS4, LS5, and LS7 are adjacent to each other in the horizontal direction (x-direction). Similarly, in the second form 4C, a first rectangle formed by four line segments LSA, LSC, LSD, and LSF and a second rectangle formed by four line segments LSB, LSD, LSE, and LSG are adjacent to each other in the horizontal direction. However, in the second form 4C, the first rectangle is a horizontally long rectangle and the second rectangle is a vertically long rectangle while in the form to be recognized 4A, the first rectangle is a vertically long rectangle and the second rectangle is a horizontally long rectangle.

As described above, the form ID is registered in the cell of the coarse classification dictionary table 111 and the line segment pair is registered under the form ID. For that reason, when an image (input image) of the form 4A to be recognized is acquired so as to perform the candidate extraction processing described above, the form ID extraction unit 102A performs a correlation of the line segment pair of the input image with the line segment pair of the form ID registered in the coarse classification dictionary table 111 (Step S209). When a correlation of the line segment pairs of the form 4A to be recognized with the line segment pairs of the first form 4B and a correlation of the line segment pairs of the form 4A to be recognized with and the line segment pairs of the second form 4C are performed, the result like a table 131 illustrated in FIG. 12 is obtained.

For example, the line segment pair (LS1, LS2) in the form 4A to be recognized is a pair of the line segment LS1 extending in the horizontal direction and the line segment LS2 extending from the right end of the line segment LS1 to the right side and the spacing d between the line segment LS1 and the line segment LS2 in the y-direction is 0. In the line segment pair (LS1, LS2), a relationship between a length L1 of the line segment LS1 and a length L2 of the line segment LS2 is L1<L2.

In the first form 4B, the line segment pairs having the spacing d between the line segments in the y-direction of 0 are (LSa, LSb) and (LSf, LSg). In the line segment pair (LSa, LSb), a relationship between a length La of the line segment LSa and a length Lb of the line segment LSb is La<Lb and in the line segment pair (LSf, LSg), a relationship between a length Lf of the line segment LSf and a length Lg of the line segment LSg is Lf<Lg. In the examples illustrated in FIGS. 11A and 11B, both Lb/La and Lg/Lf become substantially the same value as L2/L1. For that reason, the coordinates of a cell regarding the line segment pair (LS1, LS2) calculated by the equation (1-1) and equation (1-2) substantially coincide with the coordinates of a cell in which the form ID of the first form 4B under which the (LSa, LSb) and (LSf, LSg) are included are registered. Accordingly, among the line segment pairs of the first form 4B, the line segment pairs being correlated with the line segment pair (LS1, LS2) of the form 4A to be recognized are the (LSa, LSb) and (LSf, LSg).

In contrast, in the second form 4C, a relationship between a length LA of the line segment LSA and a length LB of the line segment LSB is LA>LB in the line segment pair (LSA, LSB) having the spacing d between the line segments in the y-direction of 0. Similarly, in the second form 4C, a relationship between a length LF of the line segment LSF and a length LG of the line segment LSG is LF>LG in the line segment pair (LSF, LSG). Accordingly, none of the line segment pairs in the second form 4C is correlated with the line segment pair (LS1, LS2) of the form to be recognized 4A.

For example, in the form to be recognized 4A, the line segment pair (LS1, LS3) is a pair of the line segment LS1 extending in the horizontal direction and the line segment LS3 extending downward from the left end of the line segment LS1. A relationship between the length L1 of the line segment LS1 and a length L3 of the line segment LS3 is L1<L3 in the line segment pair (LS1, LS3).

In the first form 4B, the pairs of the line segments extending in the horizontal direction and the line segments extending downward from the left end of the line segment are the (LSa, LSc) and the (LSb, LSd). In the line segment pair (LSa, LSc), a relationship between the length La of the line segment LSa and a length Lc of the line segment LSc is La<Lc, and a value of Lc/La is substantially the same as that of L3/L1. On the other hand, in the line segment pair (LSb, LSd), a relationship between the length Lb of the line segment LSb and a length Ld of the line segment LSd is Lb>Ld. For that reason, the size of Ld/Lb significantly differs from that of L3/L1. Accordingly, among the line segment pairs of the first form 4B, the line segment pair being correlated with the line segment pair (LS1, LS3) of the form 4A to be recognized is only the (LSa, LSc).

Accordingly, among the line segment pairs of the second form 4C, the line segment pair being correlated with the line segment pair (LS1, LS3) of the form 4A to be recognized is the (LSB,LSD).

After performing a correlation of the line segment pair of the form 4A to be recognized with the line segment pair of the first form 4B and performing a correlation of the line segment pair of the form 4A to be recognized with the line segment pair of the second form 4C, the form ID extraction unit 102A performs processing in and after Step S217 of FIG. 10D.

FIGS. 13A and 13B are diagrams for explaining a corresponding line segment pair extracted from a correlation of the form to be recognized with a form to which a first form ID is imparted. FIGS. 14A and 14B are diagrams for explaining corresponding line segment pairs extracted from a correlation of the form to be recognized with a form to which a second form ID is imparted.

In the candidate extraction processing according to the first embodiment, after the correlation of the line segment pair of the input image with the line segment pair of the corresponding form ID, the number of times in which each line segment in the line segment pair of the form ID is correlated with the line segment of the input image is counted. For example, in a case where the correlation result as illustrated in FIG. 12 is obtained, the counted result of the number of times in which each of the line segments LSa to LSg in the first form ID (first form 4B) is correlated with the line segments LS1 to LS7 of the input image (form to be recognized 4A) becomes a table 132A illustrated in FIG. 13A. In the result of the correlation of FIG. 12, in the line segment pairs including the line segment LSa of the first form ID are three line segment pairs of (LSa, LSb), (LSa, LSc), and (LSa, LSd). Among these line segment pairs, the line segment pair (LSa, LSb) is correlated with the line segment pairs (LS1, LS2) and (LS6, LS7) of the input image. The line segment pair (LSa, LSc) is correlated with the line segment pair (LS1, LS3) and the line segment pair (LSa, LSd) is correlated with the line segment pair (LS1, LS4). That is, as illustrated in the table 132A of FIG. 13A, the line segment LSa of the first form ID is correlated with the line segment LS1 of the input image three times and correlated with the line segment LS6 once. When the correlation between the line segment pairs is performed, the result like the table 132A illustrated in FIG. 13A regarding each of line segments LSa to LSg is obtained by counting how many times the each of the line segments LSa to LSg of the first form ID is correlated with which line segment of the input image.

In the candidate extraction processing described above, a line segment pair (inter-form line segment pair) of each of the line segments LSa to LSg of the first form ID and a line segments of the input image having the largest number of times in which each of the line segments LSa to LSg is correlated with) is generated based on the result (table 132A) illustrated in FIG. 13A. For example, among the line segments LS1 to LS7 of the input image, the line segments correlated with the line segment LSa of the first form ID are the line segment LS1 and the line segment LS6. The number of times in which the line segment LS1 is correlated with the line segment LSa is three times and the number of times in which the line segment LS6 is correlated with the line segment LSa is once. For that reason, the inter-form line segment pair regarding the line segment LSa of the first form ID becomes the line segment pair (LS1, LSa) of the line segment LSa and the line segment LS1 of which the number of times of the correlation with the line segment LSa is greater than another line segment. Among the line segments of the input image, a line segment having the largest number of times of the correlation with the line segment LSb of the first form ID is the line segment LS2 and thus, the inter-form line segment pair regarding the line segment LSb is the (LS2, LSb). Similarly, also regarding the line segments LSc to LSg, when line segments of the input image having the largest number of times of the correlation with each line segment of the first form ID are obtained and the corresponding line segment pairs are prepared, a table 133A illustrated in FIG. 13B is obtained.

Furthermore, in the candidate extraction processing described above, the corresponding line segment pair extraction unit 102B extracts M corresponding line segment pairs from among the inter-form line segment pairs regarding the form ID extracted as a candidate in Step S234. When the corresponding line segment pair is extracted, the corresponding line segment pair extraction unit 102B, in Step S235, sorts the inter-form line segment pairs in the form ID of the candidate in descending order of the number of times of the correlation with the line segment of the form image in the line segment pair. As illustrated in FIG. 13A, a line segment having the largest number of times of the correlation with the line segment of the input image in the inter-form line segment pair is the line segment LSd, which is correlated with the line segment LS4 six times, among the line segments LSa to LSg of the first form ID. Accordingly, the (LS4, LSd) becomes the first rank of the inter-form line segment pair in the sorting rank. The other line segments LSa, LSc to LSg of the first form ID has three times of correlation with the line segment of the input image in the inter-form line segment pair, respectively. Accordingly, the (LS1, LSa), (LS3, LSc), (LS4, LSd), (LS5, LSe), (LS6, LSf), and (LS7, LSg) become the second rank of the inter-form line segment pair. As such, in a case where the inter-form line segment pairs of which the number of times of correlation is the same are present, the line segment pairs are arranged in, for example, descending order from a line segment having the highest registering rank in the first form ID. For that reason, in a case where the order of the registering rank of the line segments LSa to LSg in the first form ID is LSa, LSb, LSc, LSd, LSe, LSf, and LSg, the arrangement order of the inter-form line segment pairs becomes an arrangement order as illustrated in the table 133A. After sorting the inter-form line segment pair, the corresponding line segment pair extraction unit 102B extracts the top M inter-form line segment pairs and regards the extracted inter-form line segment pairs as the corresponding line segment pairs. In FIG. 13B, an extraction example of the corresponding line segment pairs, in a case where M is 3, is illustrated. The extracted corresponding line segment pairs are used in detailed identification processing (Step S3).

In a case where the correlation result as illustrated in FIG. 12 is obtained, the counted result of the number of times in which each of the line segments LSA to LSG in the second form ID (second form 4C) is correlated with the line segments LS1 to LS7 of the input image (form to be recognized 4A) becomes a table 132B illustrated in FIG. 14A. In the result of the correlation of FIG. 12, the line segment pairs including the line segment LSA of the second form ID are two line segment pairs of (LSA, LSC) and (LSA, LSD). In the two line segment pairs, both the line segments LSA are correlated with the line segment LS2. For that reason, as illustrated in the table 132B of FIG. 14A, the line segment LS2 is correlated with the line segment LSA two times. When similar processing is performed on the other line segments LSB to LSG of the second form ID, respective results illustrated in the table 132B of FIG. 14A are obtained.

When the inter-form line segment pairs of the line segments LSA to LSG of the second form ID and the line segments LS1 to LS7 of the input image having the largest number of the correlation with the line segments LSA to LSG is generated based on the result illustrated in FIG. 14A, the following seven inter-form line segment pairs are generated. That is, seven inter-form line segment pairs of (LS2, LSA), (LS1, LSB), (LS4, SC), (LS5, LSD), (LS4, LSE), (LS7, LSF), and (LS6, LSG) are generated.

When the inter-form line segment pairs are sorted in descending order of the number of times in which the inter-form line segment pair is correlated with the line segments of the input image in order to extract the corresponding line segment pairs from among the inter-form line segment pairs, an arrangement order like the table 133B illustrated in FIG. 14B is obtained. For that reason, in a case where the top M (M is three) inter-form line segment pairs are extracted and regards the extracted inter-form line segment pairs as the corresponding line segment pairs, three inter-form line segment pairs of (LS4, LSC), (LS5, LSD), and (LS4, LSE) become the corresponding line segment pair in the second form ID.

As such, in the form recognition processing according to the first embodiment, when the form ID (a candidate for the form ID) of which the degree of similarity with the form (input image), which is a recognition target, is high is extracted based on the coarse classification dictionary table, the corresponding line segment pair used in the detailed identification between the input image and the extracted form ID is also extracted. In the form recognition processing according to the first embodiment, the inter-form line segment pairs used when detailed identification processing is performed are limited to only the extracted corresponding line segment pairs.

The line segment of the input image in the inter-form line segment pair extracted as the corresponding line segment pair is a line segment of which the number of times of correlation with the line segment of the form ID in the inter-form line segment pair is the greater than another line segment. For that reason, when the detailed identification processing is performed, in a case (in a case of overlapping) where a line segment of the form image is made coincident with a line segment of the form ID in the corresponding line segment pair, the possibility that a pattern coincidence degree between line segments of both the form image and the form ID becomes higher is high. The number of the corresponding line segment pairs is less than the total number of the line segments of the form ID. Accordingly, in a case where detailed identification processing is performed based on the corresponding line segment pair, it becomes possible to reduce a processing load and shorten the time desired for processing as compared to a case where the detailed identification processing is performed using all inter-form line segment pairs.

Figure 15A:
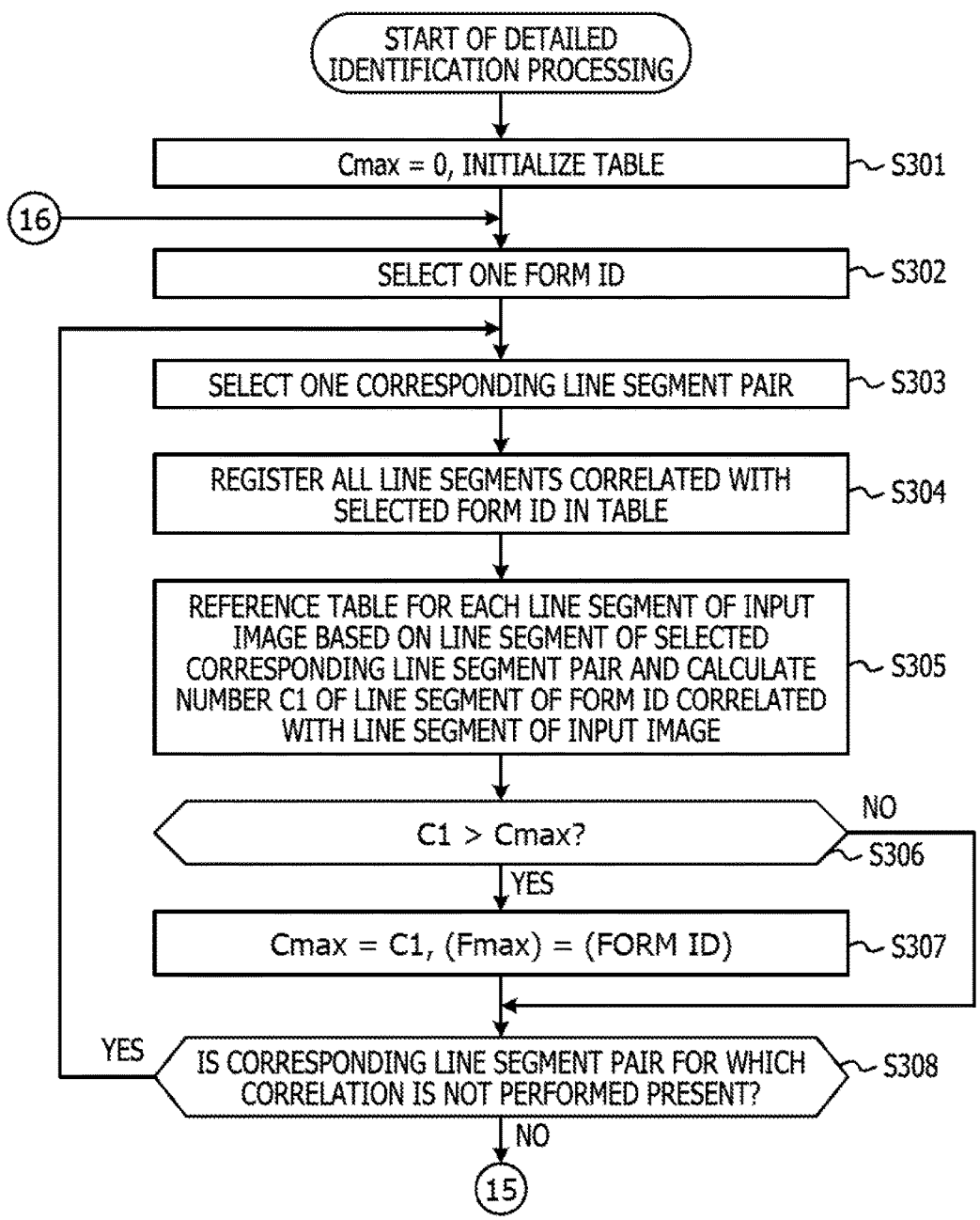
FIG. 15A is a (first) flowchart for explaining contents of detailed identification processing according to the first embodiment.
Figure 15B:
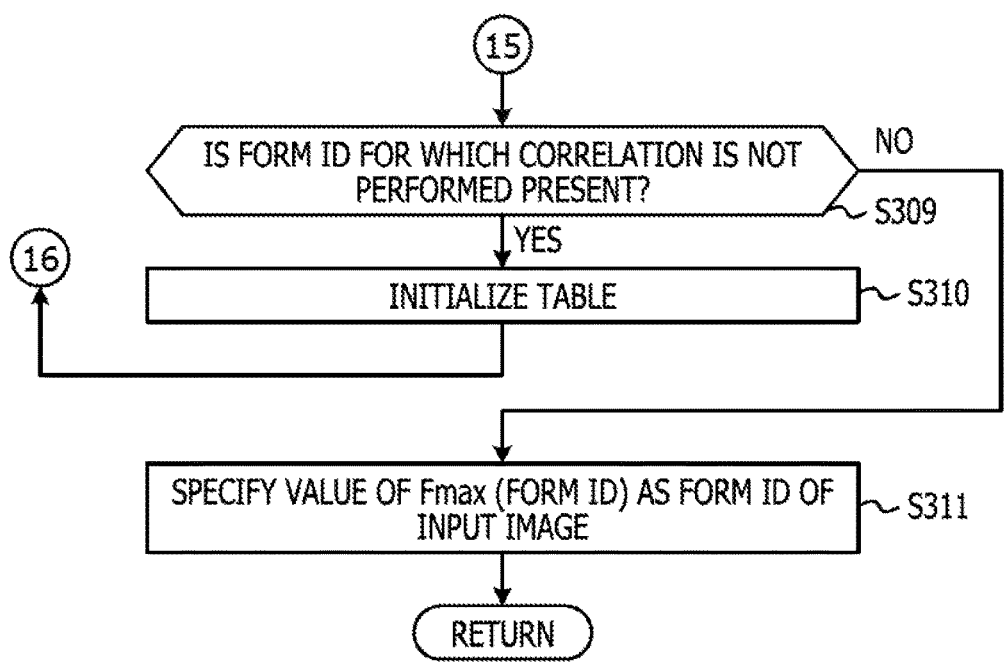
FIG. 15B is a (second) flowchart for explaining contents of the detailed identification processing according to the first embodiment.

FIG. 15A is a (first) flowchart for explaining contents of detailed identification processing according to the first embodiment. FIG. 15B is a (second) flowchart for explaining contents of detailed identification processing according to the first embodiment.

The detailed identification processing in the form recognition processing of the first embodiment is performed by the form ID specifying unit 103 of the form recognition device 1 as described above. When an input image, a form ID used in the identification processing, and information regarding the corresponding line segment pair are received from the candidate extraction unit 102, the form ID specifying unit 103 performs processing illustrated in FIG. 15A and FIG. 15B as the detailed identification processing (Step S3). The detailed identification processing illustrated in FIG. 15A and FIG. 15B is an example of detailed identification processing in known form recognition processing.

The form ID specifying unit 103, first, initializes the maximum value Cmax of the number of line segments correlated with the line segment of the input image among the line segments of the form ID and initializes a table used in a correlation (Step S301). In Step S301, the form ID specifying unit 103 sets the maximum value Cmax to 0. As the table used in a correlation, for example, a table in which cells are arranged in a two-dimensional manner and pieces of information of the position and length of the line segment are allocated to each cell is used.

Next, the form ID specifying unit 103 selects one of the form IDs received from the candidate extraction unit 102 (Step S302). In a case where a plurality of form IDs are present, the form ID specifying unit 103 selects one of form ID among the plurality of form IDs according to a predetermined selection rule in Step S302. The selection rule is, for example, a rule that selects a form ID, of which a number representing the form ID is the smallest, among the form IDs for which a detailed correlation with the input image is not performed.

Next, the form ID specifying unit 103 selects one corresponding line segment pairs correlated with the selected form ID (Step S303). In Step S303, the form ID specifying unit 103 selects one corresponding line segment pair among a plurality of corresponding line segment pairs according to a predetermined selection rule. The selection rule is, for example, a rule that selects the form ID of which a number representing the line segment ID is the smallest among the corresponding line segment pairs which are not used in the detailed correlation with the input image.

Next, all line segments of the selected form ID are registered in the table used in a correlation (Step S304). In Step S304, the form ID specifying unit 103 registers each line segment of the form ID in a corresponding cell of the table based on the position and the length of each line segment.

Next, the form ID specifying unit 103 references the table for a correlation for each line segment of the input image by using the line segment of the input image as a reference in the selected corresponding line segment pair and calculates the number C1 of the line segments of the form ID correlated with the line segment of the input image (Step S305). In Step S305, the form ID specifying unit 103, for example, in a table, makes a cell of the line segment of the corresponding line segment pair among the line segments of the input image coincident with a cell of the line segments of the form ID in the corresponding line segment pair. Thereafter, the form ID specifying unit 103 calculates a corresponding cell based on the position and the length of each line segment for each line segment of the input image by using the cell of the corresponding line segment pair as a reference and confirms whether the line segment of the form ID is registered by referencing the calculated cell. In a case where the line segment of the form is registered in the referenced cell, the form ID specifying unit 103 updates the number C1 with C1+1.

Next, the form ID specifying unit 103 determines whether the number C1 of the calculated line segment is greater than the maximum value Cmax (Step S306). In a case of C1>Cmax (YES in Step S306), the form ID specifying unit 103 updates Cmax with C1, maintains the result of a correlation of line segments, and updates the value Fmax representing a discrimination result with a value representing the selected form ID (Step S307).

After Step S307, the form ID specifying unit 103 determines whether a correlation is performed for all corresponding line segment pairs correlated with the selected form ID (Step S308). In a case of C1≤Cmax (NO in Step S306), the form ID specifying unit 103 omits Step S307 and performs a determination of Step S308.

In a case where the corresponding line segment pair which is not subjected to a correlation is present (YES in Step S308), the form ID specifying unit 103 repeats processing in and after Step S303. In a case where a correlation is performed for all corresponding line segment pairs (NO in Step S308), the form ID specifying unit 103, as illustrated in FIG. 15B, determines whether the form ID which is not subjected to a correlation is present among the form IDs received from the candidate extraction unit 102 (Step S309). In a case where the form ID which is not subjected to a correlation is present (YES in Step S309), the form ID specifying unit 103 initializes the table used in the correlation (Step S310), and repeats processing in and after Step S302. In a case where the correlation is performed for all form IDs (NO in Step S309), the form ID specifying unit 103 outputs the value Fmax representing the determination) result as the form ID of the input image (Step S311) and ends the detailed identification processing (return). The value Fmax which is output in Step S311 is updated to a value representing the form ID which is a processing target in processing of Step S307 performed last. Processing of Step S307 is performed in a case where the number of the line segments of the form ID correlated with the line segment of the input image is greater than the maximum value Cmax at that time point based on the corresponding line segment pair. That is, the value Fmax which is output in Step S311 represents the form ID, of which the number of line segments correlated with the line segment of the input image is the largest, among a plurality of form IDs extracted by the candidate extraction unit 102.

Figure 17:
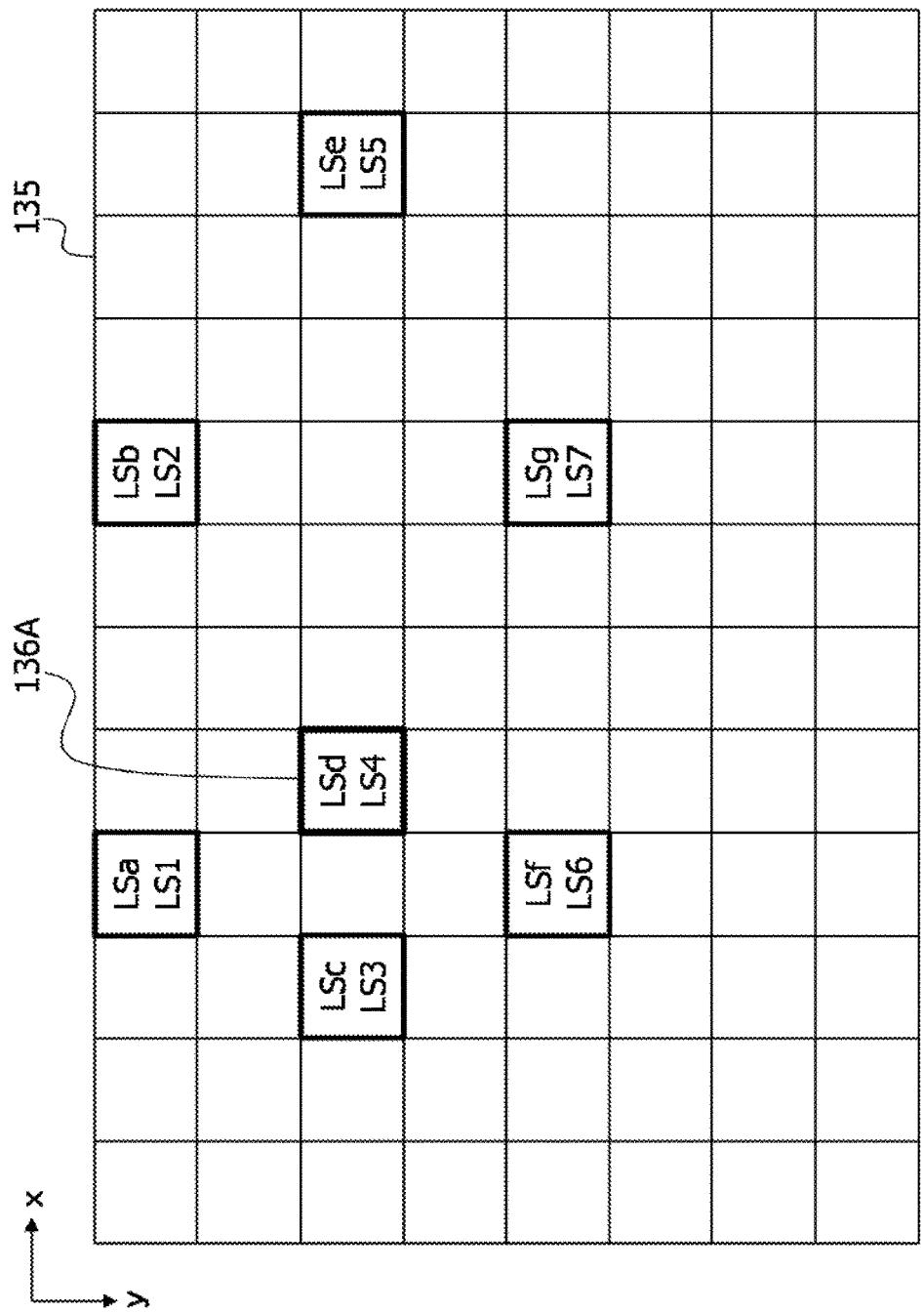
FIG. 17 is a diagram illustrating a result of a correlation of line segments of the form to which the first form ID is imparted with line segments of the input image, the correlation being performed based on the corresponding line segment pairs.

FIGS. 16A to 16C are diagrams for explaining a correlation of the form to which the first form ID is imparted with a form of an input image in the detailed identification processing. FIG. 17 is a diagram illustrating a result of a correlation of line segments of the form to which the first form ID is imparted with line segments of the input image, the correlation being performed based on the corresponding line segment pairs.

In FIG. 16A, the same form as that of FIG. 11A is illustrated, as an example of the form 4A which is a recognition target. In FIG. 16B, the first form 4B to which the first form ID, which is the same as that of FIG. 11B, is imparted is illustrated, as an example of the form of the ID extracted by the candidate extraction unit 102 (form ID extraction unit 102A).

The candidate extraction unit 102, first, extracts seven line segment LS1 to LS7 from an image (input image) of the form 4A which is a recognition target. Next, the candidate extraction unit 102 extracts the first form ID (first form 4B) as one of the candidates for the form ID of the form 4A which is a recognition target based on the line segment pair (intra-form line segment pair) of the input image and the line segment pair (intra-form line segment pair) of each form ID registered in the coarse classification dictionary table.

Thereafter, the candidate extraction unit 102 extracts, for example, three inter-form line segment pairs of (LS4, LSd), (LS1, LSa), and (LS2, LSb) illustrated in the table 134A of FIG. 16C as the corresponding line segment pairs regarding the first form ID. In the detailed identification processing performed after the candidate extraction processing, the form ID specifying unit 103 performs the detailed correlation of the input image with the first form ID based on the corresponding line segment pairs (LS4, LSd), (LS1, LSa), and (LS2, LSb).

In the detailed correlations of the input image with the first form ID, first, one of the corresponding line segment pairs is selected and all line segments of the first form ID are registered in a table for a correlation by using the line segment of the first form ID in the line segment pair as a reference. For example, in a case where the corresponding line segment pair (LS4, LSd) is selected, the form ID specifying unit 103, as illustrated in FIG. 17, registers all line segments LSa to LSg of the first form ID in corresponding cells of a table 135 for a correlation by using the line segment LSd of the first form ID as a reference.

Next, the form ID specifying unit 103 references the cells corresponding to respective line segments S1 to S7 of the input image in the table 135 for a correlation by using the line segment LS4 of the input image in the selected corresponding line segment pair (LS4, LSd) as a reference. In this case, the form ID specifying unit 103 sets a cell corresponding to the line segment LS4 of the input image in the table 135 as a cell 136A in which the line segment LSd of the first form ID is registered to determine the cells corresponding to the respective line segments LS1 to LS7 of the input image.

As illustrated in FIGS. 16A and 16B, the layouts of the line segments LS1 to LS7 of the input image (form 4A to be recognized) are substantially the same as those of the line segments LSa to LSg of the first form ID (first form 4B). For that reason, in a case where the cell 136A in which the line segment LSd of the first form ID is registered is set as the cell corresponding to the line segment LS4 of the input image in the table 135, the cells corresponding to respective line segments LS1 to LS7 of the input image in the table 135 become as illustrated in FIG. 17. That is, the cells corresponding to respective line segments LS1 to LS7 of the input image become the cells in which the line segments LSa to LSg of the first form ID are registered, respectively.

Accordingly, in a case where a correlation of the line segment of the input image with the line segment of the first form ID is performed by using the corresponding line segment pair (LS4, LSd) as a reference, the number C1 of the line segments subjected to the correlation becomes "7". Even in a case where a correlation of the line segment of the input image with the line segment of the first form ID is performed by using the corresponding line segment pair (LS1, LSa) as a reference, the number C1 of the line segments subjected to the correlation becomes "7". Even in a case where a correlation of the line segment of the input image with the line segment of the first form ID is performed by using the corresponding line segment pair (LS2, LSb) as a reference, the number C1 of the line segments subjected to the correlation becomes "7". That is, in a case where the correlation of the line segment of the input image with the line segment of the first form ID is performed based on the corresponding line segment pair, the maximum value Cmax of the number of the line segments subjected to the correlation becomes "7" which is the same as the total number of the line segments in the first form ID.

Figure 18A:
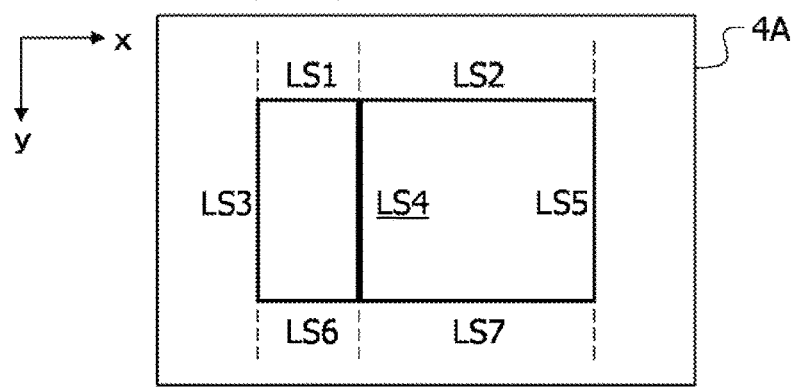
FIGS. 18A to 18C are diagrams for explaining a correlation of the form to which the second form ID is imparted with the form of the input image in the detailed identification processing.
Figure 18B:
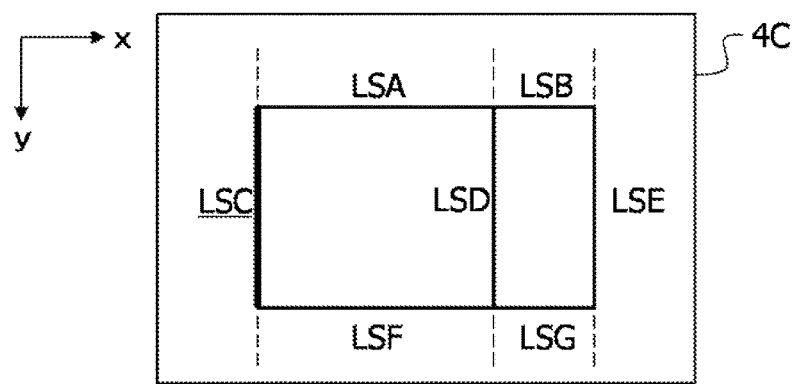
Figure 18C:
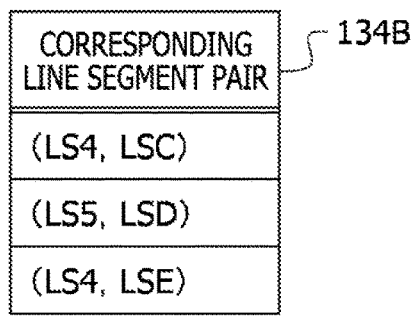
Figure 19:
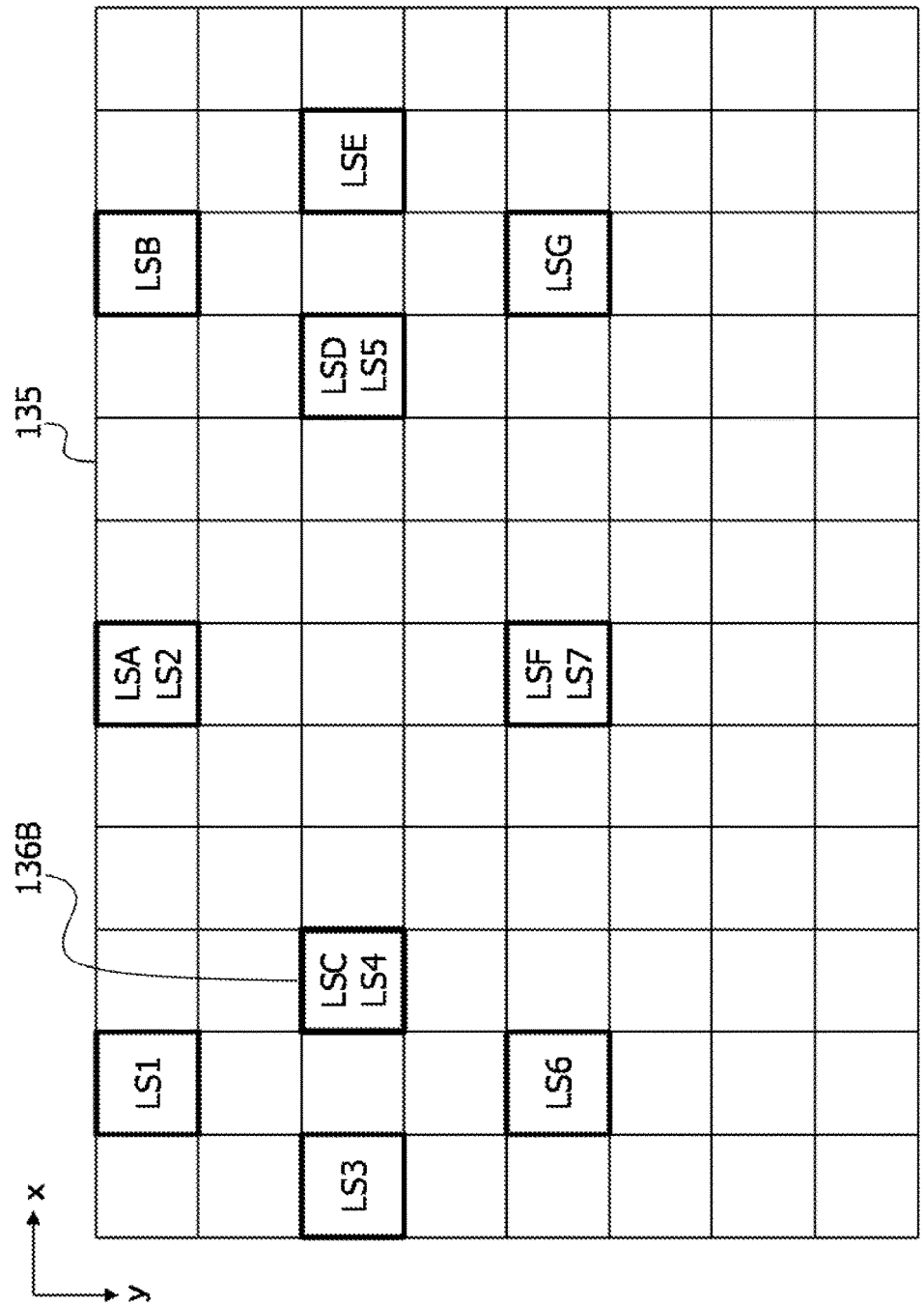
FIG. 19 is a diagram illustrating a result of a correlation of line segments of the form to which the second form ID is imparted with line segments of the input image, the correlation being performed based on the corresponding line segment pairs.

FIGS. 18A to 18C are diagrams for explaining a correlation of the form to which the second form ID is imparted with the form of the input image in the detailed identification processing. FIG. 19 is a diagram illustrating a result of a correlation of the line segment of the form to which the second form ID is imparted with the line segment of the input image, the correlation being performed based on the corresponding line segment pair.

In FIG. 18A, the same form as that of FIG. 11A is illustrated, as an example of the form 4A which is a recognition target. In FIG. 18B, the second form 4C to which the second form ID, which is the same as that FIG. 11C, is imparted is illustrated, as an example of the form of the ID extracted by the candidate extraction unit 102 (form ID extraction unit 102A).

For example, it is assumed that the form ID extraction unit 102A extracts the second form ID (second form 4C) as a candidate for the form 4A which is a recognition target based on the line segment pairs of the line segments LS1 to LS7 of the input image and respective line segment pairs of the form ID registered in the coarse classification dictionary table. In this case, the candidate extraction unit 102 extracts, for example, three inter-form line segment pairs of (LS4, LSC), (LS5, LSD), and (LS4, LSE) illustrated in a table 134B of FIG. 18C as the corresponding line segment pairs regarding the second form ID. Then, in the detailed identification processing performed after the candidate extraction processing, the form ID specifying unit 103 performs the detailed correlation of the input image with the second form ID based on the corresponding line segment pairs (LS4, LSC), (LS5, LSD), and (LS4, LSE).

In the detailed correlation of the input image with the second form ID, first, one of the corresponding line segment pairs is selected and all line segments of the second form ID are registered in a table 135 for a correlation by using the line segment of the second form ID in the line segment pair as a reference. For example, in a case where the corresponding line segment pair (LS4, LSC) is selected, the form ID specifying unit 103, as illustrated in FIG. 19, registers all line segments LSA to LSG of the second form ID in corresponding cells of the table 135 by using the line segment LSC of the second form ID as a reference.

Next, the form ID specifying unit 103 references the cells corresponding to respective line segments LS1 to LS7 of the input image in the table 135 for a correlation by using the line segment LS4 of the input image in the selected corresponding line segment pair (LS4, LSC) as a reference. In this case, the form ID specifying unit 103 sets a cell corresponding to the line segment LS4 of the input image in the table 135 as a cell 136B in which the line segment LSC of the second form ID is registered to determine the cells corresponding to the respective line segments LS1 to LS7 of the input image.

As illustrated in FIGS. 18A and 18B, a positional relationship between a vertically long rectangle and a horizontally long rectangle in the layouts of the line segments LS1 to LS7 of the input image (form 4A to be recognized) is opposite to that of the layouts of the line segments LSA to LSG of the second form ID (second form 4B). Furthermore, the number of line segment being contacted with the line segment LS4 in the input image differs from that of the line segment LSC in the second form ID.

For that reason, in a case where the cell corresponding to the line segment LS4 of the input image in the table 135 for a correlation is set as a cell in which the line segment LSC of the second form ID is registered, the cells corresponding to respective line segments S1 to S7 of the input image in the table 135 becomes those as illustrated in FIG. 19. That is, in a case where a correlation of the line segment of the input image with the line segment of the second form ID is performed by using the corresponding line segment pair (LS4, LSC) as a reference, the number C1 of the line segments subjected to the correlation becomes "4". Even in a case where a correlation of the line segment of the input image with the line segment of the second form ID is performed by using the corresponding line segment pair (LS5, LSD) as a reference, the number C1 of the line segments subjected to the correlation becomes "4". Furthermore, in a case where a correlation of the line segment of the input image with the line segment of the second form ID is performed by using the corresponding line segment pair (LS4, LSE) as a reference, the number C1 of the line segments subjected to the correlation becomes "4". That is, in a case where the correlation of the line segment of the input image (form 4A to be recognized) with the line segment of the second form ID (second form 4C) is performed based on the corresponding line segment pair, the maximum value Cmax of the number of the line segments subjected to the correlation becomes "4".

Accordingly, in a case where the form IDs extracted by the candidate extraction unit 102 are two form IDs of the first form ID and the second form ID, the form ID specifying unit 103 outputs the first form ID as the result (value Fmax) of the detailed identification processing. As such, in the detailed identification processing according to the first embodiment, a candidate for the form ID of which the degree of overlapping is the highest is specified as the form ID of the form to be recognized based on the degree of overlapping between the line segment of the form ID and the line segment of the form to be recognized in the corresponding line segment pair.

In a case where another ID of the form of which the degree of similarity with the first form 4B illustrated in FIG. 16B is registered in the coarse classification dictionary, the form ID may be extracted as a candidate. However, there is a difference in the layout of the line segment between the form 4B to which the first form ID is imparted and a form to which another form ID is imparted. For that reason, in a case where the layouts of the line segments of the form 4A to be recognized and the first form ID (first form 4B) are substantially the same, the maximum value Cmax of the number of the line segments which correspond to each other in the input image and another form ID becomes less than or equal to "6". Accordingly, in the form recognition processing according to the first embodiment, even in a case where three or more form IDs are registered in the coarse classification dictionary, the form 4A to be recognized may be correctly recognized.

Figure 20:
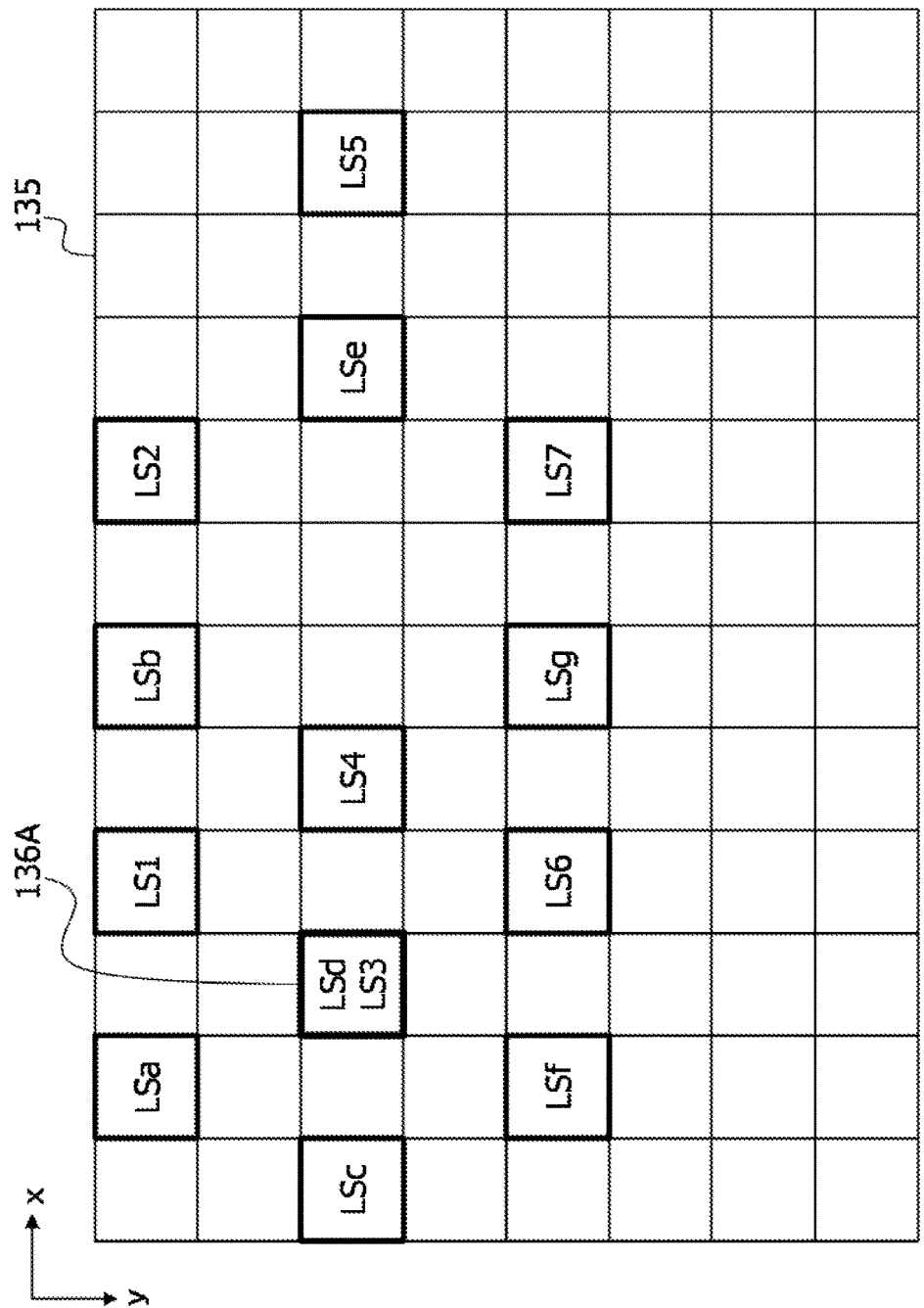
FIG. 20 is a diagram illustrating a result of a correlation of a line segment of the form to which the first form ID is imparted with a line segment of the input image, the correlation being performed based on a line segment pair other than the corresponding line segment pairs.

FIG. 20 is a diagram illustrating a result of a correlation of the line segment of the form to which the first form ID is imparted with the line segment of the input image, the correlation being performed based on a line segment pair other than the corresponding line segment pair.

In a case where a correlation of the line segments LS1 to LS7 of the form 4A to be recognized with the line segments LSa to LSg of the first form 4B illustrated in FIGS. 16A and 16B is performed, as described above, the correlation is performed based only on the corresponding line segment pair in the form recognition processing according to the first embodiment. In contrast, in the form recognition processing disclosed in Japanese Laid-open Patent Publication No. 7-282193 and the like, a correlation using line segment pairs (for example, (LS3, LSd)) which are not included in the corresponding line segment pairs as a reference is also performed and the form ID of the form 4A to be recognized including also a result of a correlation between the line segment pairs is specified.

For example, in a case where a correlation is performed by using the line segment pair (LS3, LSd) which is not included in the corresponding line segment pairs as a reference, first, as illustrated in FIG. 20, respective line segments LSa to LSg of the first form ID are registered in the corresponding cells in the table 135 by using the line segment LSd of the first form ID as a reference. Thereafter, the cells corresponding to the line segments LS1 to LS7 of the input image in the table 135 are referenced by using the line segment LS3 of the input image as a reference. In this case, the form ID specifying unit 103 sets a cell corresponding to the line segment LS3 of the input image in the table 135 as the cell 136A in which the line segment LSd of the first form ID is registered to determine the cells corresponding to the respective line segments LS1 to LS7 of the input image.

As will be understood from FIGS. 16A and 16B, the layouts of the line segments LS1 to LS7 of the input image (form 4A to be recognized) are substantially the same as those of the line segments LSa to LSg of the first form ID (first form 4B). However, a line segment corresponding to the line segment LSd of the first form ID in the line segments LS1 to LS7 of the input image is the line segment LS4. That is, in the table 135 for a correlation, setting the cell corresponding to the line segment LS3 of the input image as the cell 136A, in which the line segment LSd of the first form ID is registered, is erroneous. As such, in a case where the correlation of the cell to be set as a reference is erroneously performed, as illustrated in FIG. 20, the line segment of the first form ID is not registered in the cells corresponding to respective line segment LS1, LS2, and LS4 to LS7 of the input image. Accordingly, in a case where a correlation of the line segments of the input image with the line segments of the first form ID is performed by using the line segment pair (LS3, LSd) as a reference, the number C1 of the line segments subjected to the correlation becomes "1". Even in a case where the correlation is performed by using another line segment pair which is not included in the corresponding line segment pairs, the number C1 of the line segments subjected to the correlation becomes less than or equal to "6", except for the line segment pairs (LS3, LSc), (LS5, LSe), (LS6, LSf), and (LS5, LSg) illustrated in FIG. 13B. That is, even in a case where the correlation of the line segments of the input image with the line segments of the first form ID is performed, including also the line segment pair which is not included in the corresponding line segment pair, the maximum value Cmax of the number C1 of the line segments subjected to the correlation becomes "7". Accordingly, in the form recognition processing according to the first embodiment, even when the number of inter-form line segment pairs to be subjected to a correlation in the detailed identification processing is made smaller, it is possible to correctly recognize the form ID of the form which is a recognition target based on the input image. Accordingly, it is possible to reduce a processing load of the form recognition device 1.

In the first embodiment, the coarse classification dictionary and the detailed identification dictionary prepared by an information processing device other than the form recognition device 1 are stored in the coarse classification dictionary storing unit 110 and the detailed identification dictionary storing unit 120, respectively. However, the coarse classification dictionary and the detailed identification dictionary may be prepared by using the form recognition device 1.

Figure 21:
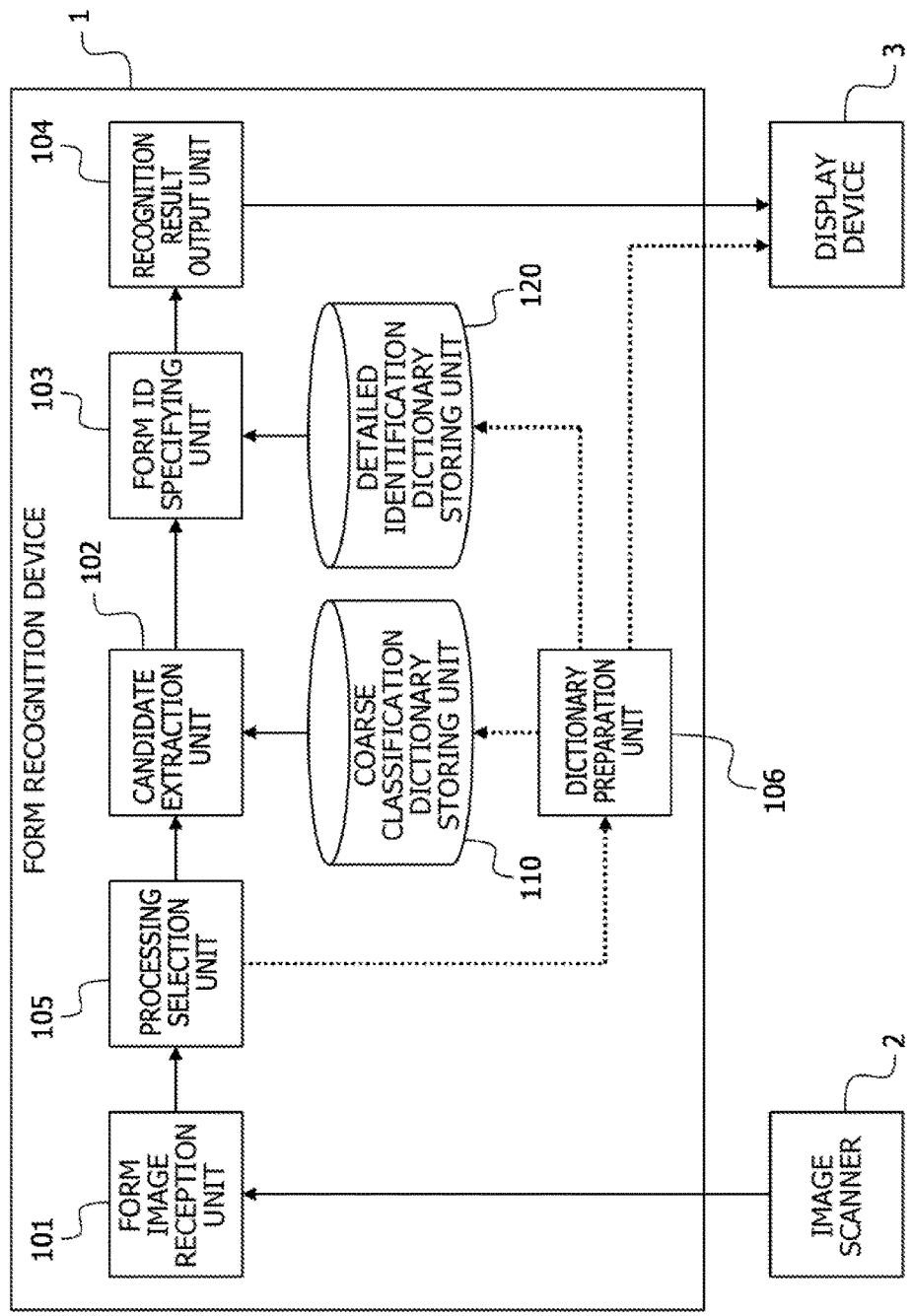
FIG. 21 is a diagram illustrating a modification example of the functional configuration of the form recognition device according to the first embodiment.

FIG. 21 is a diagram illustrating a modification example of the functional configuration of the form recognition device according to the first embodiment.

The form recognition device 1 according to the first embodiment, as illustrated in FIG. 21, may be a device including a processing selection unit 105 and a dictionary preparation unit 106, in addition to the form image reception unit 101, the candidate extraction unit 102, the form ID specifying unit 103, and the recognition result output unit 104. In the form recognition device 1 of FIG. 21, the function of each of the form image reception unit 101, the candidate extraction unit 102, the form ID specifying unit 103, and the recognition result output unit 104 is the same as described above.

In the form recognition device 1 of FIG. 21, the processing selection unit 105 selects any one of processing for recognizing a form or processing for preparing a dictionary to perform based on, for example, information input through an operation of an input device (not illustrated) by a user (operator) of the form recognition device 1. In a case where information correlated with the processing for recognizing a form is input, the processing selection unit 105 causes the candidate extraction unit 102 to perform the candidate extraction processing illustrated in FIG. 10A to FIG. 10F. On the other hand, in a case where information correlated with the processing for preparing a dictionary is input, the processing selection unit 105 causes the dictionary preparation unit 106 to perform processing for preparing the coarse classification dictionary table illustrated in FIG. 8A and FIG. 8B and processing for preparing detailed identification dictionary (not illustrated).

As such, the dictionary preparation unit 106 is provided in the form recognition device 1 such that it becomes possible to prepare the coarse classification dictionary table 111 and the detailed identification dictionary 121 in the form recognition device 1 and appropriately update a piece of dictionary data. For that reason, for example, it becomes possible to individually prepare and add the piece of dictionary data regarding the form obtained by changing a portion of the layout of the line segment in the existing form.

The coarse classification dictionary storing unit 110 and the detailed identification dictionary storing unit 120 in the form recognition device 1 illustrated in FIG. 1 may be provided in a dictionary server other than the form recognition device 1.

Figure 22:
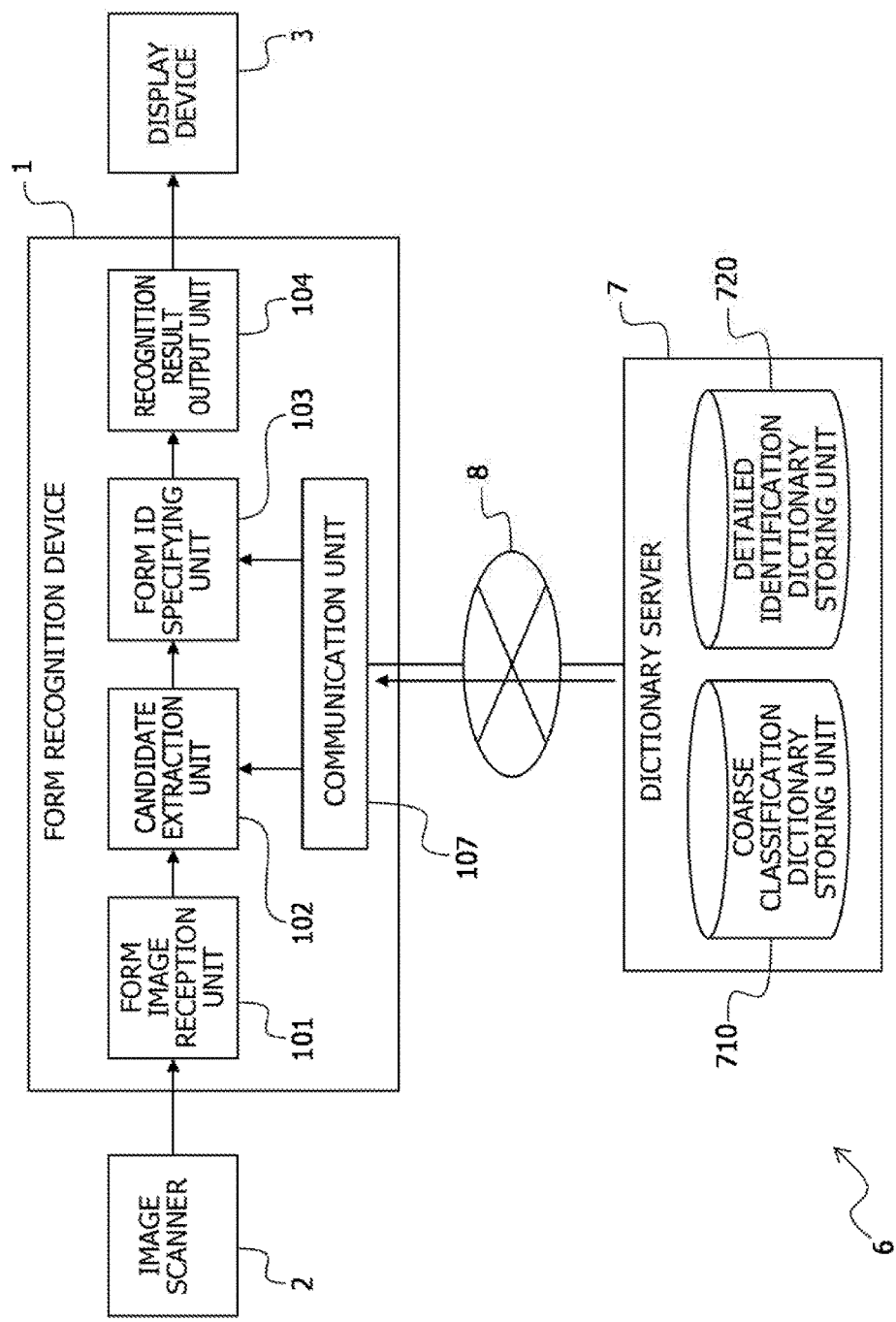
FIG. 22 is a diagram illustrating a configuration example of a form recognition system.

FIG. 22 is a diagram illustrating a configuration example of a form recognition system.

As illustrated in FIG. 22, the form recognition system 6 includes the form recognition device 1, the image scanner 2, the display device 3, and a dictionary server 7. The dictionary server 7 includes a coarse classification dictionary storing unit 710 and a detailed identification dictionary storing unit 720.

The form recognition device 1 includes the form image reception unit 101, the candidate extraction unit 102, the form ID specifying unit 103, the recognition result output unit 104, and a communication unit 107. In the form recognition device 1 of FIG. 22, the function of each of the form image reception unit 101, the candidate extraction unit 102, the form ID specifying unit 103, and the recognition result output unit 104 is the same as described above. After acquiring the form image prepared by the image scanner 2, the form recognition device 1 performs the candidate extraction processing illustrated in FIG. 10A to FIG. 10F and the detailed identification processing illustrated in FIG. 15A and FIG. 15B, and outputs a result of the detailed identification processing to the display device 3. The form recognition device 1 is communicably coupled with the communication network 8 such as the local area network (LAN) or the Internet by the communication unit 107. The communication unit 107 of the form recognition device 1 accesses the dictionary server 7 through the communication network 8, acquires the coarse classification dictionary table from the coarse classification dictionary storing unit 710 of the dictionary server 7, and acquires the detailed identification dictionary from the detailed identification dictionary storing unit 720.

As such, the coarse classification dictionary table and the detailed identification dictionary are maintained in the dictionary server 7 to thereby make it possible for a plurality of form recognition devices 1 to share the coarse classification dictionary table and the detailed identification dictionary. For that reason, it becomes possible to efficiently register, for example, line segment information about a new form in the piece of dictionary data. The coarse classification dictionary storing unit 110 and detailed identification dictionary storing unit 120 may be provided in each form recognition device 1 and thus, it becomes possible to reduce pressure to a capacity of a the storing unit of the form recognition device 1 caused by an increase of the piece of dictionary data.

The flowcharts of FIG. 8A and FIG. 8B are just examples of the coarse classification dictionary preparation processing according to the first embodiment. The coarse classification dictionary according to the first embodiment may be prepared according to a procedure obtained by changing some of processing steps illustrated in FIG. 8A and FIG. 8B and also be prepared according to a known procedure different from that of FIG. 8A and FIG. 8B, without being limited to a procedure illustrated in FIG. 8A and FIG. 8B.

The flowcharts of FIG. 10A to FIG. 10F are just examples of the candidate extraction processing according to the first embodiment. The candidate extraction processing according to the first embodiment may be performed according to a procedure obtained by changing some of processing steps illustrated in FIG. 10A to FIG. 10F without being limited to a procedure illustrated in FIG. 10A to FIG. 10F.

The flowcharts of FIG. 15A and FIG. 15B are just examples of the detailed identification processing according to the first embodiment.

The detailed identification processing according to the first embodiment may be performed according to a procedure obtained by changing some of processing steps illustrated in FIG. 15A and FIG. 15B and also be performed according to a known procedure different from that of FIG. 15A and FIG. 15B, without being limited to a procedure illustrated in FIG. 15A and FIG. 15B.

When the corresponding line segment pairs are extracted from the inter-form line segment pairs of the line segments of the input image and the line segments of the candidate for the form ID, the inter-form line segment pair of which the number of times of the correlation is greater than or equal to a predetermined number may also be extracted instead of extracting a predetermined number of line segment pairs in descending order from a line segment pair having the largest number of times of the correlation.

Second Embodiment

FIG. 23 is a diagram illustrating an example of registered information of a coarse classification dictionary table used in form recognition processing according to a second embodiment.

In the form recognition processing of the second embodiment, as illustrated in FIG. 23, an angle of the line segment and a color of the line segment, together with a line segment ID of each line segment of the line segment pair, are registered under the form ID to be registered in a cell of a coarse classification dictionary table 112. The angle of the line segment is calculated by setting the horizontal direction as 0 degree and setting a counter-clockwise direction from the horizontal direction as positive in, for example, pieces of data such as a form image used at the time of registration. That is, it is assumed that an angle of the line segment increasing toward the right is a positive value and an angle of the line segment decreasing toward the right is a negative value. It is assumed that an angle of the line segment extending in the vertical direction is +90 degrees. On the other hand, it is assumed that a color of the line segment is an average value of RGB values of a plurality of pixels representing a single line segment in, for example, pieces of data such as a form image used at the time of registration.

Figure 24A:
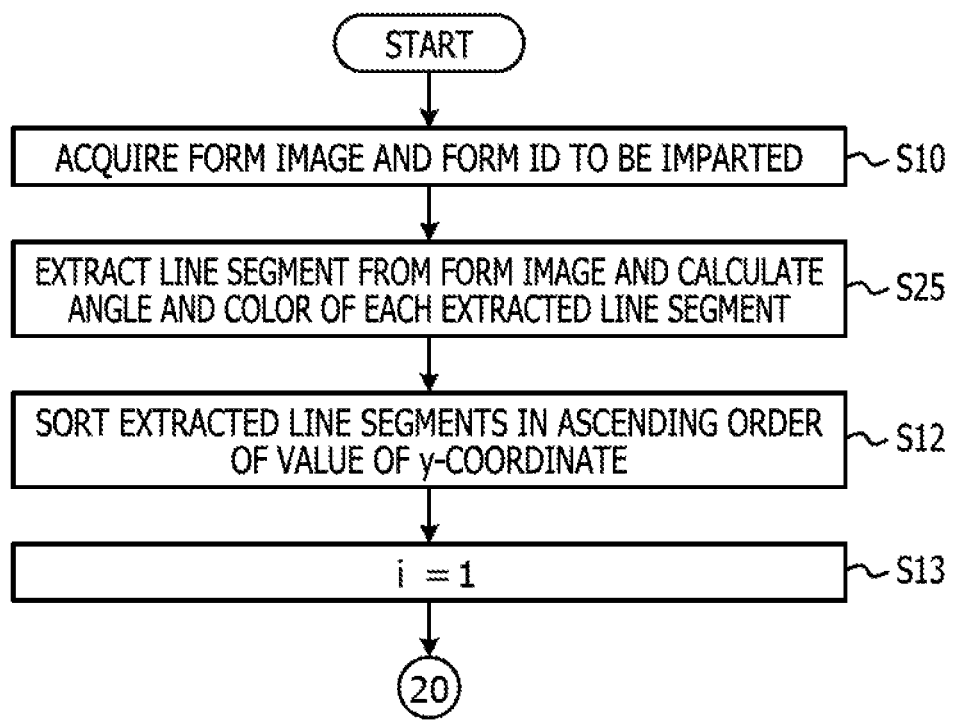
FIG. 24A is a (first) flowchart for explaining preparation processing of a coarse classification dictionary according to the second embodiment.
Figure 24B:
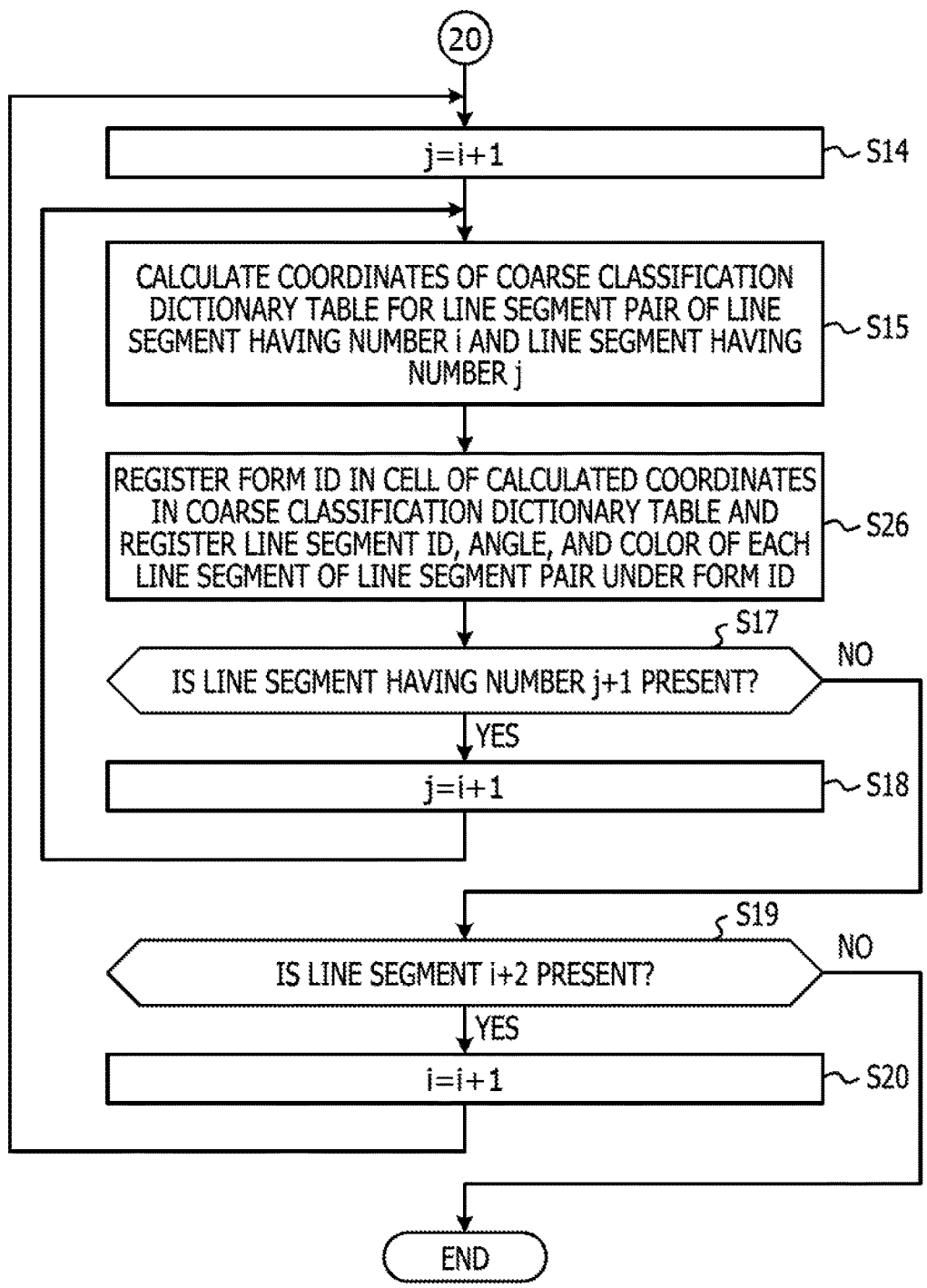
FIG. 24B is a (second) flowchart for explaining the preparation processing of the coarse classification dictionary according to the second embodiment.

FIG. 24A is a (first) flowchart for explaining preparation processing of the coarse classification dictionary according to the second embodiment. FIG. 24B is a (second) flowchart for explaining the preparation processing of the coarse classification dictionary according to the second embodiment. In FIG. 24A and FIG. 24B, the same step numbers (for example, S10) are assigned to the same processing steps as those in the coarse classification dictionary preparation processing (see FIG. 8A and FIG. 8B) according to the first embodiment.

The coarse classification dictionary table 112 according to the second embodiment is prepared using, for example, the information processing device 5 (see FIG. 7) other than the form recognition device 1. When processing for preparing the coarse classification dictionary table 112 is started, the information processing device 5, as illustrated in FIG. 24A, first, acquires a form image and a form ID to be imparted (Step S10). The form image is not limited to the image data of a form prepared by the image scanner, but may include electronic data of an original plate prepared using, for example, an application or software which runs on the information processing device 5.

Next, the information processing device 5 extracts the line segment representing the ruled line from the form image and calculates the degree and color of the extracted each line segment (Step S25). In Step S25, the information processing device 5 extracts the line segment included in the form image according to any one of known ruled line extraction methods and calculates information representing the position and the length. The line segment ID which is unique to each line segment is imparted to the extracted line segment. The information processing device 5 calculates an angle representing an extending direction of the line segment by setting the horizontal direction as 0 degree and setting a counter-clockwise direction from the horizontal direction as positive in the form image. Furthermore, the information processing device 5 calculates, for example, an average value of RGB values in each of a plurality of pixels representing a single line segment, as the color of the line segment.

Next, the information processing device 5 sorts the extracted line segments in ascending order of a value of the y-coordinate (Step S12). In Step S12, in a case where a plurality of line segments having the same value of the y-coordinate are present, the information processing device 5 sorts the line segments, for example, in ascending order of a line segment ID or ascending order of a value of the x-coordinate.

Next, the information processing device 5 sets a variable i, which represents a sorting rank of one of the line segments in the line segment pair, as i=1 (Step S13). The information processing device 5, as illustrated in FIG. 24B, sets a variable j, which represents a sorting rank of the other one of the line segments in the line segment pair, as i+1 (Step S14).

Next, the information processing device 5 calculates the coordinates in the coarse classification dictionary table 112 for the line segment pair of the line segment having the sorting rank of i and the line segment having the sorting rank of j (Step S15). In step S15, the information processing device 5 calculates the coordinates (u, v) representing the relationship (feature amount) between the line segment having the number i and the line segment having the number j using, for example, the equation (1-1), the equation (1-2).

Next, the information processing device 5 registers the form ID in the cell of the calculated coordinates in the coarse classification dictionary table and registers the line segment ID, angle, and color of each line segment of line segment pair under the form ID (Step S26). In a case where, the same form ID is already registered in the corresponding cell, the information processing device 5 performs processing for adding the line segment ID, angle, and color of each line segment of the line segment pair under the registered form ID in Step S26.

Next, the information processing device 5 determines whether the line segment having the sorting rank of j+1 is present in the line segments of the input image (Step S17). In a case where the line segment having the number j+1 is present (YES in Step S17), the information processing device 5 updates the variable j with j+1 (Step S18), and repeats processing in and after Step S15.

On the other hand, in a case where the line segment having the number j+1 is not present (NO in Step S17), the information processing device 5 determines whether the line segment having the sorting rank of i+2 is present in the line segments of the input image (Step S19). In a case where the line segment having the number i+2 is present (YES in Step S19), the information processing device 5 updates the variable i with i+1 (Step S20), and repeats processing in and after Step S14. In a case where the line segment having the number i+2 is not present (NO in Step S19), the information processing device 5 ends the processing for preparing the coarse classification dictionary.

In a case where a plurality of types of forms are to be registered in the coarse classification dictionary table 112, an operator of the information processing device 5 causes the information processing device 5 to perform the processing for preparing the coarse classification dictionary illustrated in FIG. 24A and FIG. 24B for each type of form.

The processing for preparing the coarse classification dictionary illustrated in FIG. 24A and FIG. 24B may be performed together with the processing for preparing the detailed identification dictionary. That is, after Step S25, a piece of layout information including pieces of information representing the direction of the line segment and the position of the line segment in the processing for preparing the coarse classification dictionary illustrated in FIG. 24A, and the length of the line segment calculated in Step S25 may be prepared and the piece of layout information may be registered in the detailed identification dictionary in correlation with the form ID. The piece of layout information to be registered in the detailed identification dictionary may be a piece of information including the angle and color of each line segment.

A functional configuration of the form recognition device according to the second embodiment is similar to that of the form recognition device 1 illustrated in FIG. 1. The form recognition device of the second embodiment performs processing of Steps S1 to S4 illustrated in FIG. 9 as form recognition processing. In the candidate extraction processing (Step S2) in the form recognition processing of the second embodiment, processing illustrated in FIG. 25A to FIG. 25C is performed as processing (see FIG. 10A to FIG. 10C) corresponding to Steps S201 to S216 in the candidate extraction processing according to the first embodiment.

Figure 25B:
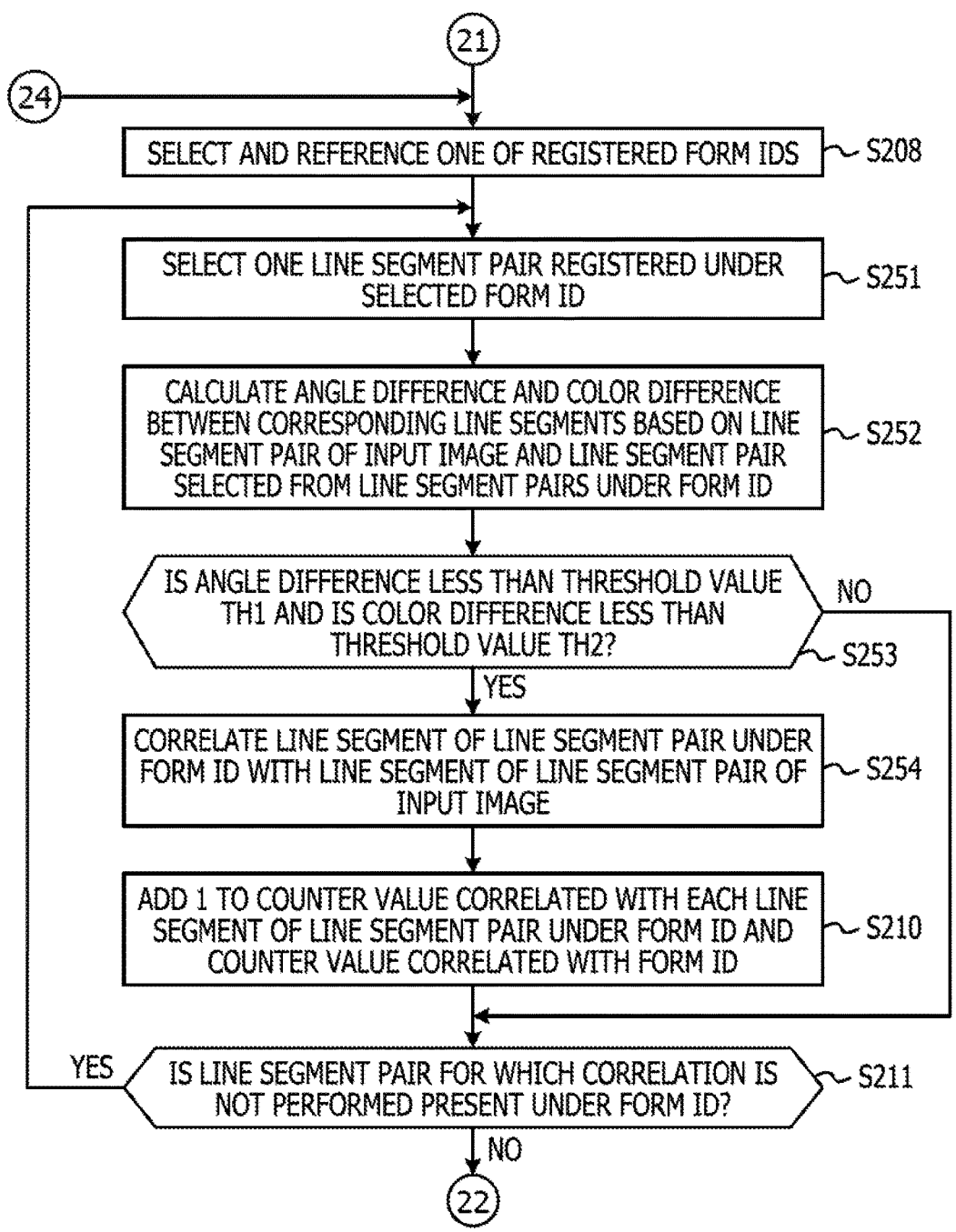
FIG. 25B is a (second) flowchart for explaining a portion of the candidate extraction processing according to the second embodiment.
Figure 25C:
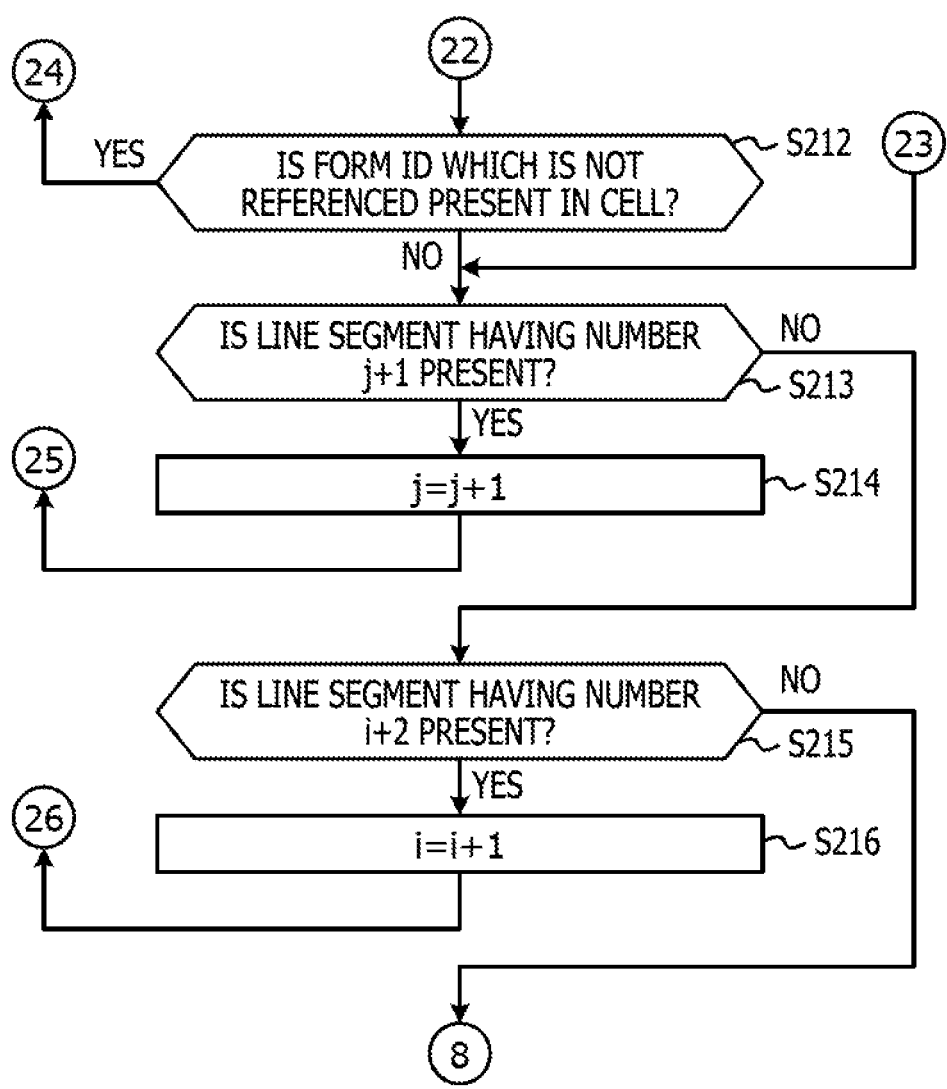
FIG. 25C is a (third) flowchart for explaining a portion of the candidate extraction processing according to the second embodiment.

FIG. 25A is a (first) flowchart for explaining a portion of candidate extraction processing according to the second embodiment. FIG. 25B is a (second) flowchart for explaining a portion of the candidate extraction processing according to the second embodiment. FIG. 25C is a (third) flowchart for explaining a portion of the candidate extraction processing according to the second embodiment. In FIG. 25A to FIG. 25C, the same step numbers (for example, Step S201) are assigned to the same processing steps as those in the candidate extraction processing (see FIG. 10A to FIG. 10C) according to the first embodiment.

The candidate extraction processing in the form recognition processing of the second embodiment is performed by the candidate extraction unit 102 of the form recognition device 1. When an image (input image) of the form to be recognized is received from the form image reception unit 101, the candidate extraction unit 102, first, performs processing illustrated in FIG. 25A.

The candidate extraction unit 102, first, initializes the value of the counter (Step S201). Step S201 is performed by the form ID extraction unit 102A. In Step S201, the form ID extraction unit 102A sets, for example, values of the counter described in the following to 0, respectively.

(1) A value of the counter which counts a total number of correlations of the line segment pairs (inter-form line segment pairs) of the line segments of the form ID and the line segments of the input image, regarding each of all form IDs registered in the coarse classification dictionary.

(2) A value of the counter which counts the number of times in which the line segment of the input image is correlated with each line segment in the line segment pair (intra-form line segment pair) registered under the form ID.

Next, the form ID extraction unit 102A extracts the line segments from the input image and calculates an angle and a color of each of extracted line segments (Step S250). In Step S250, the form ID extraction unit 102A extracts the line segments from the input image and imparts the line segment ID to each line segment according to, for example, any one of known ruled line extraction processing. In the line segment ID, for example, positive integers starting with 1 are used. The form ID extraction unit 102A calculates an angle θ of the line segment and a color of the line segment for each of extracted line segments, and correlates the line segment ID, the angle θ, and the color with each other.

Next, the form ID extraction unit 102A sorts the line segments extracted from the input image in ascending order of a value of the y-coordinate (Step S203). In processing of Step S203, in a case where a plurality of line segments having the same value of the y-coordinate are present, an arrangement order of the line segments is determined according to a predetermined rule (for example, sorting of line segments in ascending order of a value of the x-coordinate).

Next, the form ID extraction unit 102A sets the variable i, which represents a sorting rank of one line segment in the line segment pair of the input image, as i=1 (Step S204). The form ID extraction unit 102A sets the variable j, which represents a sorting rank of the other one of the line segments in the line segment pair of the input image, as i+1 (Step S205).

Next, the form ID extraction unit 102A calculates the coordinates the coarse classification dictionary table for the line segment pair of the line segment having the sorting rank of number i and the line segment having the sorting rank of number j in the input image (Step S206). In Step S206, the form ID extraction unit 102A calculates the coordinates (u, v) regarding the line segment pair using, for example, the equation (1-1) and equation (1-2).

Next, the form ID extraction unit 102A references the cell of the coordinates calculated in the coarse classification dictionary table and confirms whether the form ID is registered in the cell (Step S207). In a case where the form ID is not registered (NO in Step S207), the form ID extraction unit 102A, as illustrated in FIG. 25C, determines whether the line segment having the number j+1 is present (Step S213).

On the other hand, in a case where the form ID is registered in the referenced cell (YES in Step S207), the form ID extraction unit 102A, as illustrated in FIG. 25B, selects and references one of the form IDs registered in the cell (Step S208). In a case where a single form ID is registered in the cell, the form ID extraction unit 102A selects the single form ID. In a case where a plurality of form IDs are registered in the cell, the form ID extraction unit 102A selects one of the form IDs, which is not subjected to processing in and after of Step S251, according to a predetermined selection rule.

Next, the form ID extraction unit 102A selects one of the line segment pairs registered under the selected form ID (Step S251). In a case where a single line segment pair is registered under the selected form ID, the form ID extraction unit 102A selects the single line segment pair. In a case where a plurality of line segment pairs are registered under the referenced form ID, the form ID extraction unit 102A selects one of the line segment pairs, which is not subjected to processing in and after Step S252, according to a predetermined selection rule.

Next, the form ID extraction unit 102A calculates an angle difference and a color difference between corresponding line segments based on the line segment pair selected from line segment pairs under the form ID and the line segment pair of the input image (Step S252). For example, in a case where the line segment pair selected from line segment pairs under the form ID is (LSa, LSb) and the line segment pair of the input image is (LS1, LS2), the form ID extraction unit 102A calculates the angle difference between the line segment LSa and the line segment LS1 and the angle difference between the line segment LSb and the line segment LS2. The form ID extraction unit 102A calculates the color difference between the line segment LSa and the line segment LS1 and the color difference between the line segment LSb and the line segment LS2.

Next, the form ID extraction unit 102A determines whether the calculated angle difference is less than a first threshold value TH1 and the calculated color difference is less than a second threshold value TH2 (Step S253). In Step S253, in a case where both values of the two calculated angle differences are less than the first threshold value TH1, the form ID extraction unit 102A determines that the angle difference is less than the first threshold value TH1. Similarly, in Step S253, in a case where both values of the two calculated color differences are less than the second threshold value TH2, the form ID extraction unit 102A determines that the color difference is less than the second threshold value TH2.

In a case where the angle difference is less than the first threshold value TH1 and the color difference is less than the second threshold value TH2 (YES in Step S253), the form ID extraction unit 102 performs the correlation of the line segment of the line segment pair of the form ID with the line segment of the line segment pair of the input image (Step S254). For example, in a case where the line segment pair selected from line segment pairs under the form ID is (LSa, LSb) and the line segment pair of the input image is (LS1, LS2), the form ID extraction unit 102A correlates the line segment LSa with the line segment LS1 and also correlates the line segment LSb with the line segment LS2.

Next, the form ID extraction unit 102A adds 1 to a counter value correlated with each line segment in the line segment pair under the form ID and a counter value correlated with the form ID (Step S210). The counter value correlated with each line segment in the line segment pair under the form ID is the value of the counter described in (2), that is, the value of the counter which counts the number of times in which the line segment of the input image is correlated with each line segment in the line segment pair registered under the form ID. The counter value correlated with each form ID is the value of the counter described in (1), that is, the value of the counter which counts a total number of correlations of the line segment pairs (inter-form line segment pair) of the line segments of the form ID with the line segments of the input image.

Next, the form ID extraction unit 102A determines whether a line segment pair for which the correlation with the line segment pair, which is represented by variables i and j of the input image, is not performed is present among the line segment pairs registered under the form ID referenced in Step S208 (Step S211). In a case where the angle difference is greater than or equal to the first threshold value TH1 and the color difference is greater than or equal to the second threshold value TH2 in Step S253 (NO in Step S253), the form ID extraction unit 102A omits processing of Steps S254 and S210 and performs the determination in Step S211.

In a case where the line segment pair which is not subjected to a correlation is present (YES in Step S211), the form ID extraction unit 102A repeats processing in and after Step S251. In a case where the correlations is performed for all line segment pairs (NO in Step S211), the form ID extraction unit 102A, as illustrated in FIG. 25C, determines whether the form ID which is not referenced in Step S208 is present in the cell (Step S212). In a case where the form ID which is not referenced is present in the cell (YES in Step S212), the form ID extraction unit 102A repeats processing in and after Step S208.

In a case where all form IDs within the cell are referenced and processing in and after Step S251 is performed (NO in Step S212), the form ID extraction unit 102A determines whether the line segment having the number j+1 is present in the line segments extracted from the input image (Step S213). In a case where the form ID is not registered in the cell of the coordinates calculated in Step S206 in the coarse classification dictionary table (NO in Step S207), the form ID extraction unit 102A omits processing of Steps S208 to S211 and performs the determination in Step S213.

In a case where the line segment having the number j+1 is present (YES in Step S213), the form ID extraction unit 102A updates the variable j with j+1 (Step S214), and repeats processing in and after Step S206. On the other hand, in a case where the line segment having the number j+1 is not present (NO in Step S213), the form ID extraction unit 102A determines whether the line segment having the number i+2 is present in the line segments extracted from the input image (Step S215). In a case where the line segment having the number i+2 is present (YES in Step S215), the form ID extraction unit 102A updates the variable i with i+1 (Step S216), and repeats processing in and after Step S205.

In a case where the line segment having the number i+2 is not present (NO in Step S215), the candidate extraction unit 102 including the form ID extraction unit 102A subsequently performs processing of Steps S217 to S238 illustrated in FIG. 10D to FIG. 10F. When processing of Step S238 is ended, the candidate extraction unit 102 ends the candidate extraction processing for a single input image (form which is a recognition target) (return).

After the candidate extraction processing, in the form recognition device 1, the form ID specifying unit 103 references information representing the corresponding line segment pair and line segment information of the detailed identification dictionary for each form ID and performs detailed recognition processing for specifying an ID of a form which is a recognition target. The detailed recognition processing according to the second embodiment may be, for example, the detailed identification processing (see FIG. 15A and FIG. 15B) described in the first embodiment. The form ID specifying unit 103 outputs the form ID specified by detailed identification processing to the recognition result output unit 104. The recognition result output unit 104 displays the input image, the specified form ID and the like on the display device 3.

As such, in the candidate extraction processing of the second embodiment, when a correlation of the line segment pair of the form ID with the line segment pair of the input image is performed, the correlation is performed using the angle difference and color difference between the line segments, in addition to the lengths of the line segments of the line segment pair and the positional relationship between the line segments. For that reason, extraction accuracy of a form ID is improved in a step of extracting a candidate for the form ID.

The form recognition processing according to the second embodiment may be performed by the form recognition device 1 illustrated in FIG. 1 and also be performed by the form recognition device 1 illustrated in FIG. 21. The form recognition processing according to the second embodiment may be performed by the form recognition device 1 in the form recognition system 6 illustrated in FIG. 22.

The flowcharts of FIG. 24A and FIG. 24B are just an example of the preparation processing of the coarse classification dictionary according to the second embodiment. Similarly, the flowcharts of FIG. 25A to FIG. 25C are just an example of the candidate extraction processing according to the second embodiment. The coarse classification dictionary (coarse classification dictionary table) used in form recognition processing according to the second embodiment may be one obtained by registering, for example, any one of the angle and the color together with the line segment ID of each line segment of the line segment pair under the form ID.

In a case where information of the angle or color of the line segment is extracted as information about the line segment included in the form as in the second embodiment, the information of the angle or color of the line segment may also be used in the detailed identification processing to be performed by the form ID specifying unit 103. That is, when the degree of overlapping between the line segment of the form to be recognized and the line segment of the form ID in the corresponding line segment pair is calculated, the degree of overlapping may be added or subtracted according to the angle difference or color difference between the line segments.

Third Embodiment

FIG. 26 is a diagram illustrating an example of registered information of a coarse classification dictionary table used in form recognition processing according to a third embodiment.

In the form recognition processing of the third embodiment, as illustrated in FIG. 26, when the form ID is registered in the cell of the coarse classification dictionary table 113, the line segment ID of each line segment of the line segment pair (intra-form line segment pair) is registered under the form ID, as described in the first embodiment. When the form ID is imparted to the cell of the coarse classification dictionary table 113 according to the third embodiment, the number of the line segments of the form to which the form ID is imparted is registered in correlation with the form ID. The number of the line segments of the form registered in the cell together with the form ID is the total number of the line segments extracted from the form image.

Figure 27A:
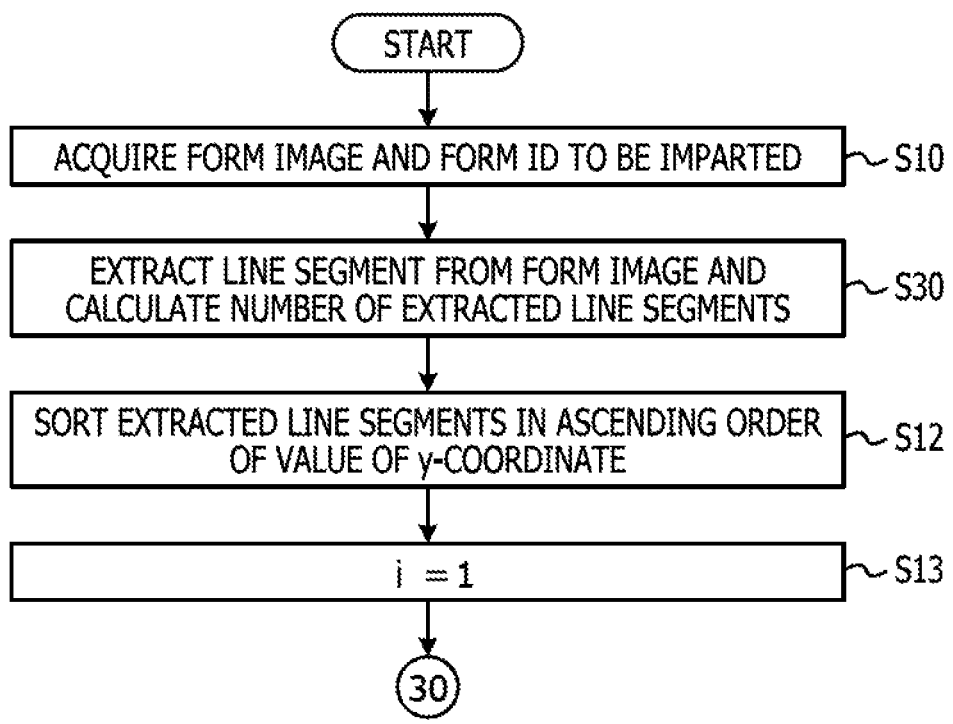
FIG. 27A is a (first) flowchart for explaining preparation processing of a coarse classification dictionary according to the third embodiment.
Figure 27B:
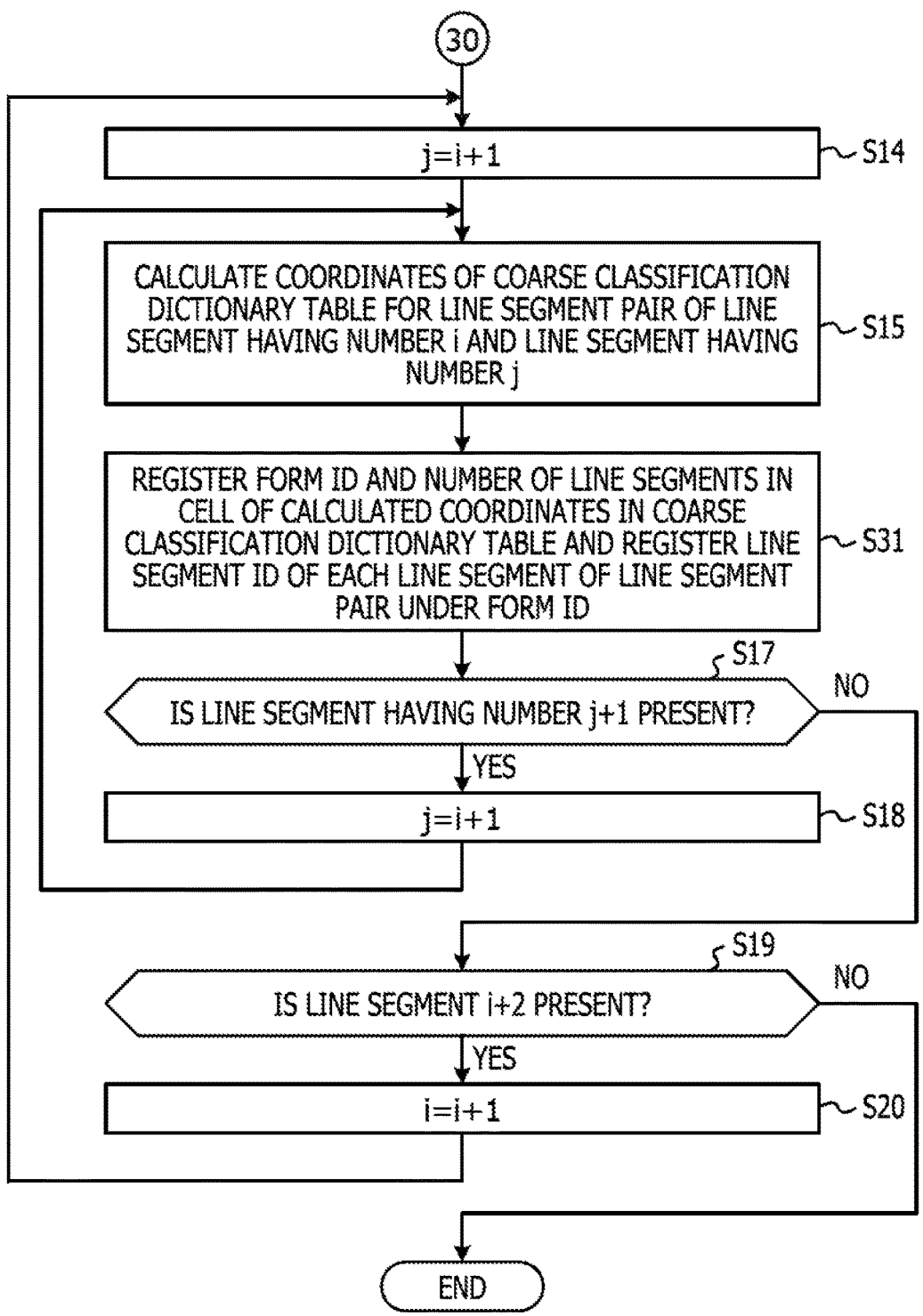
FIG. 27B is a (second) flowchart for explaining the preparation processing of the coarse classification dictionary according to the third embodiment.

FIG. 27A is a (first) flowchart for explaining preparation processing of the coarse classification dictionary according to the third embodiment. FIG. 27B is a (second) flowchart for explaining the preparation processing of the coarse classification dictionary according to the third embodiment. In FIG. 27A and FIG. 27B, the same step numbers (for example, Step S10) are assigned to the same processing steps as those in the coarse classification dictionary preparation processing (see FIG. 8A and FIG. 8B) according to the first embodiment.

The coarse classification dictionary table 113 according to the third embodiment is prepared using, for example, the information processing device 5 (see FIG. 7) other than the form recognition device 1. When processing for preparing the coarse classification dictionary table 113 is started, the information processing device 5, as illustrated in FIG. 27A, first, acquires a form image and a form ID to be imparted (Step S10). The form image is not limited to the image data of a form prepared by the image scanner, but may include electronic data of an original plate prepared using, for example, an application or software which runs on the information processing device 5.

Next, the information processing device 5 extracts the line segment representing the ruled line from the form image and calculates the total number of the extracted line segments (Step S30). In Step S30, the information processing device 5 extracts the line segment included in the form image according to any one of known ruled line extraction methods and calculates information representing the position and the length. The line segment ID which is unique to each line segment is imparted to the extracted line segment. After extracting the line segments, the information processing device 5 counts, for example, the number of imparted line segment IDs and sets the number of imparted line segment IDs as the total number of the line segments extracted from the form image.

Next, the information processing device 5 sorts the extracted line segments in ascending order of a value of the y-coordinate (Step S12). In Step S12, in a case where a plurality of line segments having the same value of the y-coordinate are present, the information processing device 5 sorts the line segments, for example, in ascending order of a line segment ID or ascending order of a value of the x-coordinate.

Next, the information processing device 5 sets a variable i, which represents a sorting rank of one of the line segments in the line segment pair, as i=1 (Step S13). The information processing device 5, as illustrated in FIG. 27B, sets a variable j, which represents a sorting rank of the other one of the line segments in the line segment pair, as i+1 (Step S14).

Next, the information processing device 5 calculates the coordinates in the coarse classification dictionary table for the line segment pair of the line segment having the sorting rank of number i and the line segment having the sorting rank of number j (Step S15). In step S15, the information processing device 5 calculates the coordinates (u, v) representing the relationship (feature amount) between the line segment having the number i and the line segment having the number j using, for example, the equation (1-1), the equation (1-2).

Next, the information processing device 5 registers the form ID and the number of the line segments in the cell of the calculated coordinates in the coarse classification dictionary table and registers the line segment ID of each line segment of line segment pair under the form ID (Step S31). In a case where, the same form ID is already registered in the corresponding cell, the information processing device 5 performs processing for additionally registering the line segment ID of each line segment of the line segment pair under the registered form ID in Step S31.

Next, the information processing device 5 determines whether the line segment having the sorting rank of number j+1 is present in the line segments of the input image (Step S17). In a case where the line segment having the number j+1 is present (YES in Step S17), the information processing device 5 updates the variable j with j+1 (Step S18), and repeats processing in and after Step S15.

On the other hand, in a case where the line segment having the number j+1 is not present (NO in Step S17), the information processing device 5 determines whether the line segment having the sorting rank of i+2 is present in the line segments of the input image (Step S19). In a case where the line segment having the number i+2 is present (YES in Step S19), the information processing device 5 updates the variable i with i+1 (Step S20), and repeats processing in and after Step S14. In a case where the line segment having the number i+2 is not present (NO in Step S19), the information processing device 5 ends the processing for preparing the coarse classification dictionary.

In a case where a plurality of types of forms are to be registered in the coarse classification dictionary table 113, an operator of the information processing device 5 causes the information processing device 5 to perform the processing for preparing the coarse classification dictionary illustrated in FIG. 27A and FIG. 27B for each type of form.

The processing for preparing the coarse classification dictionary illustrated in FIG. 27A and FIG. 27B may be performed together with the processing for preparing the detailed identification dictionary. That is, after Step S30, a piece of layout information including pieces of information representing the position of the line segment and the length of the line segment calculated in Step S30 may be prepared in the processing for preparing the coarse classification dictionary illustrated in FIG. 27A, and the piece of layout information may be registered in the detailed identification dictionary in correlation with the form ID.

A functional configuration of the form recognition device according to the third embodiment is similar to that of the form recognition device 1 illustrated in FIG. 1. The form recognition device of the third embodiment performs processing of Steps S1 to S4 illustrated in FIG. 9 as form recognition processing. In the candidate extraction processing (Step S2) in the form recognition processing of the third embodiment, processing illustrated in FIG. 28A to FIG. 28C is performed as processing (see FIG. 10A to FIG. 10C) corresponding to Steps S201 to S216 in the candidate extraction processing according to the first embodiment.

Figure 28A:
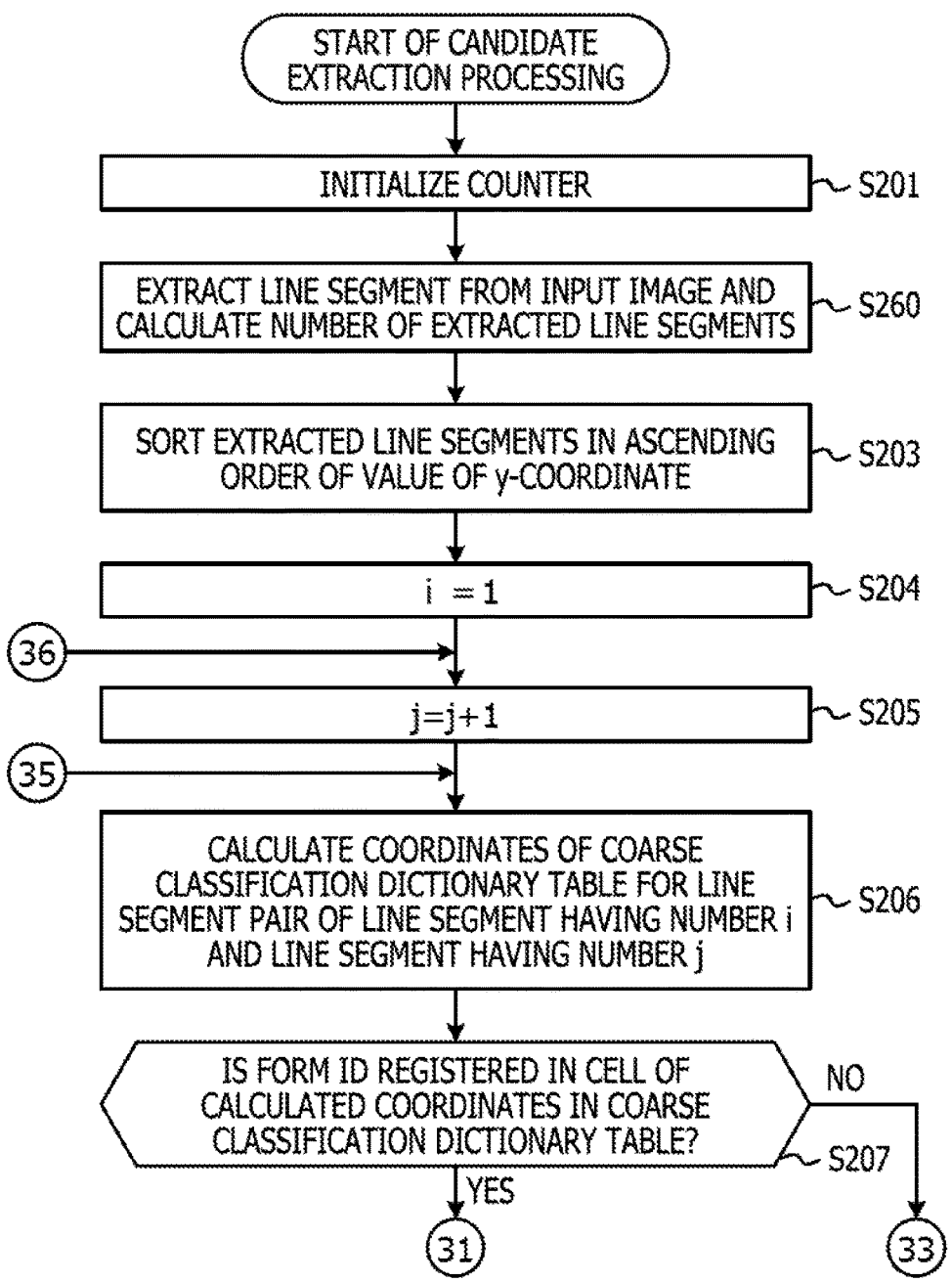
FIG. 28A is a (first) flowchart for explaining a portion of candidate extraction processing according to the third embodiment.
Figure 28B:
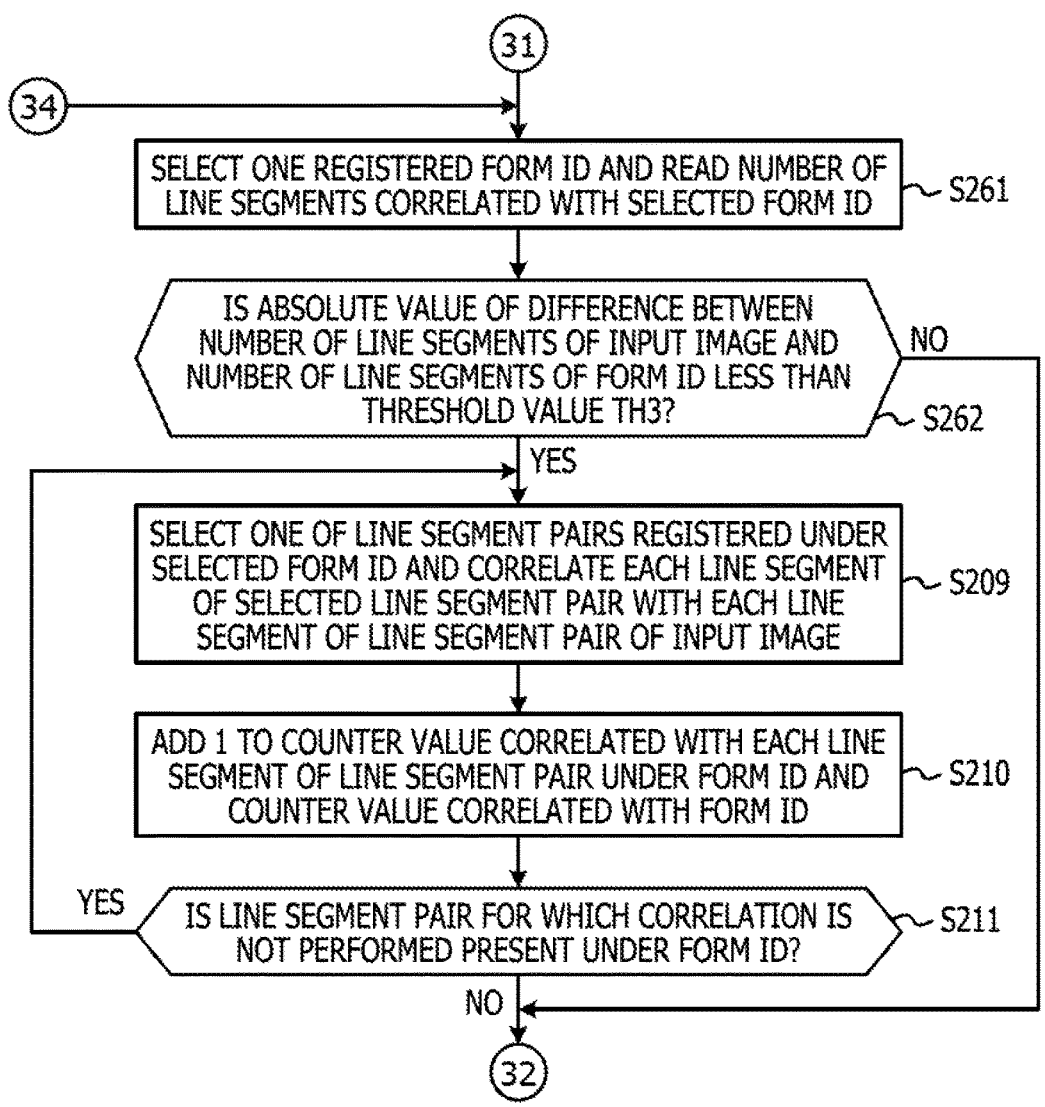
FIG. 28B is a (second) flowchart for explaining a portion of the candidate extraction processing according to the third embodiment.
Figure 28C:
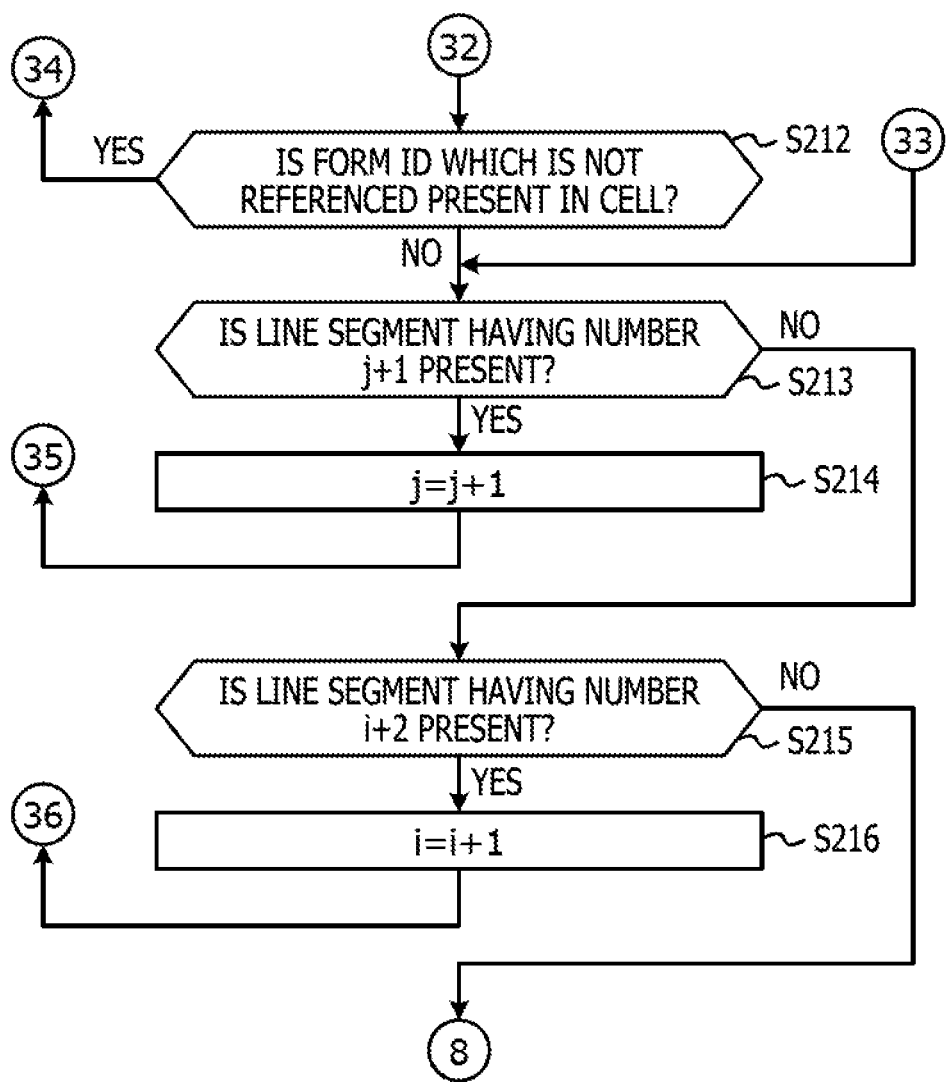
FIG. 28C is a (third) flowchart for explaining a portion of the candidate extraction processing according to the third embodiment.

FIG. 28A is a (first) flowchart for explaining a portion of candidate extraction processing according to the third embodiment. FIG. 28B is a (second) flowchart for explaining a portion of the candidate extraction processing according to the third embodiment. FIG. 28C is a (third) flowchart for explaining a portion of the candidate extraction processing according to the third embodiment. In FIG. 28A to FIG. 28C, the same step numbers (for example, S201) are assigned to the same processing steps as those in the candidate extraction processing (see FIG. 10A to FIG. 10C) according to the first embodiment.

The candidate extraction processing in the form recognition processing of the third embodiment is performed by the candidate extraction unit 102 of the form recognition device 1. When an image (input image) of the form to be recognized is received from the form image reception unit 101, the candidate extraction unit 102, first, performs processing illustrated in FIG. 28A.

The candidate extraction unit 102, first, initializes the value of the counter (Step S201). Step S201 is performed by the form ID extraction unit 102A. In Step S201, the form ID extraction unit 102A sets, for example, values of the counter described in the following to 0, respectively.

(1) A value of the counter which counts a total number of correlations of the line segment pairs (inter-form line segment pairs) of the line segments of the form ID and the line segments of the input image, regarding each of all form IDs registered in the coarse classification dictionary.

(2) A value of the counter which counts the number of times in which the line segment of the input image is correlated with each line segment in the line segment pair (intra-form line segment pair) registered under the form ID.

Next, the form ID extraction unit 102A extracts the line segments from the input image and calculates the number of extracted line segments (Step S260). In Step S260, the form ID extraction unit 102A extracts the line segments from the input image and imparts the line segment ID to each line segment according to, for example, any one of known ruled line extraction processing. In the line segment ID, for example, positive integers starting with 1 are used. After extracting the line segments from the form image, the form ID extraction unit 102A counts the total number of the extracted line segments based on, for example, the number of the line segment IDs imparted to the extracted line segment.

Next, the form ID extraction unit 102A sorts the line segments extracted from the input image in ascending order of a value of the y-coordinate (Step S203). In processing of Step S203, in a case where a plurality of line segments having the same value of the y-coordinate are present, an arrangement order of the line segments is determined according to a predetermined rule (for example, sorting of line segments in ascending order of a value of the x-coordinate).

Next, the form ID extraction unit 102A sets the variable i, which represents a sorting rank of one line segment in the line segment pair of the input image, as i=1 (Step S204). The form ID extraction unit 102A sets the variable j, which represents a other one line segment in the line segment pair, as i+1 (Step S205).

Next, the form ID extraction unit 102A calculates the coordinates the coarse classification dictionary table for the line segment pair of the line segment having the sorting rank of number i and the line segment having the sorting rank of number j in the input image (Step S206). In Step S206, the form ID extraction unit 102A calculates the coordinates (u, v) regarding the line segment pair using, for example, the equation (1-1) and equation (1-2).

Next, the form ID extraction unit 102A references the cell of the coordinates calculated in the coarse classification dictionary table and confirms whether the form ID is registered in the cell (Step S207). In a case where the form ID is not registered (NO in Step S207), the form ID extraction unit 102A, as illustrated in FIG. 28C, determines whether the line segment having the number j+1 is present (Step S213).

On the other hand, in a case where the form ID is registered in the referenced cell (YES in Step S207), the form ID extraction unit 102A, as illustrated in FIG. 28B, selects one of the registered form IDs and reads the number of the line segments correlated with the form ID (Step S261). In a case where a single form ID is registered in the cell, the form ID extraction unit 102A selects the single form ID. In a case where a plurality of form IDs are registered in the cell, the form ID extraction unit 102A selects one of the form IDs, which is not subjected to processing of Step S262, according to a predetermined selection rule.

Next, the form ID extraction unit 102A determines whether an absolute value of a difference between the number of the line segments of the input image and the number of the line segments correlated with the selected form ID is less than threshold value TH3 (Step S262). In a case where the absolute value of the difference between the numbers of the line segments is greater than or equal to the threshold value TH3 (NO in Step S262), the form ID extraction unit 102A performs the determination in Step S212.

In a case where the absolute value of the difference between the numbers of the line segments is less than the threshold value TH3 (YES in Step S262), the form ID extraction unit 102A selects one of the line segment pairs registered under the form ID and performs a correlation of the line segments of the selected line segment pair with the line segments of the line segment pair of the input image (Step S209). In a case where a single line segment pair is registered under the form ID, the form ID extraction unit 102A selects the single line segment pair. In a case where a plurality of line segments are registered under the form ID, the form ID extraction unit 102A selects one line segment pair, which is not subjected to processing in and after Step S209, according to a predetermined selection rule.

Next, the form ID extraction unit 102A adds 1 to a counter value correlated with each line segment in the line segment pair under the form ID and a counter value correlated with the form ID (Step S210). The counter value correlated with each line segment in the line segment pair under the form ID is the value of the counter described in (2), that is, the value of the counter which counts the number of times in which the line segment of the input image is correlated with each line segment in the line segment pair registered under the form ID. The counter value correlated with each form ID is the value of the counter described in (1), that is, the value of the counter which counts a total number of correlations of the line segment pairs (inter-form line segment pair) of the line segments of the form ID with the line segments of the input image.

Next, the form ID extraction unit 102A determines whether a line segment pair for which the correlation with the line segment pair, which is represented by variables i and j of the input image, is not performed is present among the line segment pairs registered under the form ID selected in Step S261 (Step S211). In a case where the absolute value of the difference between the number of the line segments of the input image and the number of the line segments of the form ID is less than the threshold value TH3 (NO in Step S262), the form ID extraction unit 102A omits processing of Steps S209 to S211 and performs the determination in Step S212.

In a case where the line segment pair for which the correlation is not performed (YES in Step S211), the form ID extraction unit 102A repeats processing in and after Step S209. In a case where the correlation is performed for all line segment pairs (NO in Step S211), the form ID extraction unit 102A, as illustrated in FIG. 28C, determines whether the form ID which is not referenced (selected) in Step S261 is present in the cell (Step S212). In a case where the form ID which is not referenced is present in the cell (YES in Step S212), the form ID extraction unit 102A repeats processing in and after Step S261.

In a case where all form IDs within the cell are referenced and processing in and after Step S251 is performed (NO in Step S212), the form ID extraction unit 102A determines whether the line segment having the number j+1 is present in the line segments extracted from the input image (Step S213). In a case where the form ID is not registered in the cell of the coordinates calculated in Step S206 in the coarse classification dictionary table (NO in Step S207), the form ID extraction unit 102A omits of processing of Steps S261 to S211 and performs the determination in Step S213.

In a case where the line segment having the number j+1 is present (YES in Step S213), the form ID extraction unit 102A updates the variable j with j+1 (Step S214), and repeats processing in and after Step S206. On the other hand, in a case where the line segment having the number j+1 is not present (NO in Step S213), the form ID extraction unit 102A determines whether the line segment having the number i+2 is present in the line segments extracted from the input image (Step S215). In a case where the line segment having the number i+2 is present (YES in Step S215), the form ID extraction unit 102A updates the variable i with i+1 (Step S216), and repeats processing in and after Step S205.

In a case where the line segment having the number i+2 is not present (NO in Step S215), the candidate extraction unit 102 including the form ID extraction unit 102A subsequently performs processing of Steps S217 to S238 illustrated in FIG. 10D to FIG. 10F. When processing of Step S238 is ended, the candidate extraction unit 102 ends the candidate extraction processing for a single input image (form which is a recognition target) (return).

After the candidate extraction processing, in the form recognition device 1, the form ID specifying unit 103 references information representing the corresponding line segment pair and line segment information of the detailed identification dictionary for each form ID and performs detailed recognition processing for specifying an ID of a form which is a recognition target. The detailed recognition processing according to the third embodiment may be, for example, detailed identification processing (see FIG. 15A and FIG. 15B) described in the first embodiment. The form ID specifying unit 103 outputs the form ID specified by detailed identification processing to the recognition result output unit 104. The recognition result output unit 104 displays the input image, the specified form ID and the like on the display device 3.

As such, in the candidate extraction processing of the third embodiment, the absolute value of the difference between the number of the line segments of the form ID and the number of the line segments of the input image is calculated prior to performing the correlation of the line segment pair of the form ID with the line segment pair of the input image in the candidate extraction processing. In a case where the form which is a recognition target is a form to which the selected form ID is imparted, the numbers of the line segments of both the forms are the same value. That is, in a case where the absolute value of the difference between the numbers of the line segments is less than the threshold value TH3, there is a high possibility that the form which is a recognition target is the form to which the selected form ID is imparted. For that reason, in a case where the absolute value of the difference between the numbers of the line segments is less than the threshold value TH3, the correlation of the line segment pair of the form ID with the line segment pair of the input image is performed. In contrast, in a case where the difference between the number of the line segments of the input image and the number of the line segments of the selected form ID is large, there is a low possibility that the form which is a recognition target is the form to which the selected form ID is imparted. For that reason, in a case where the absolute value of the difference between the numbers of the line segments is greater than or equal to the threshold value TH3, the correlation of the line segment pair of the form ID with the line segment pair of the input image is omitted. With this, in a case where there is a low possibility that the form which is a recognition target is the form to which the selected form ID is imparted, the number of times in which the correlation is performed between the line segment pairs based on the inter-form line segment pairs is not counted. Accordingly, according to the third embodiment, for example, it becomes possible to reduce an increase of the number of times, in which the correlation is performed, due to an incorrect correlation and extract a more appropriate form ID and corresponding line segment pair.

Furthermore, in a case where there is a low possibility that the form which is a recognition target is the form to which the selected form ID is imparted, processing of Steps S209 to S211 is omitted and thus, it becomes possible to reduce a processing load of the candidate extraction processing.

The form recognition processing according to the third embodiment may be performed by the form recognition device 1 illustrated in FIG. 1 and also be performed by the form recognition device 1 illustrated in FIG. 21. The form recognition processing according to the third embodiment may be performed by the form recognition device 1 in the form recognition system 6 illustrated in FIG. 22.

The flowcharts of FIG. 27A and FIG. 27B are just an example of the preparation processing of the coarse classification dictionary according to the third embodiment. Similarly, the flowcharts of FIG. 28A to FIG. 28C are just an example of the candidate extraction processing according to the third embodiment. The coarse classification dictionary (coarse classification dictionary table) used in form recognition processing according to the third embodiment may be one obtained by registering, for example, the angle and the color together with the line segment ID of each line segment of the line segment pair under the form ID, as described in the second embodiment.

The form recognition device 1 according to the first to third embodiments described above may be realized using, for example, a computer and a program executed by the computer. In the following, description will be made on the form recognition device 1 realized using the computer and the program with reference to FIG. 29.

FIG. 29 is a diagram illustrating a hardware configuration of a computer.

As illustrated in FIG. 29, a computer 15 includes a processor circuit 1501, a main storage device 1502, an auxiliary storage device 1503, an input device 1504, an output device 1505, a medium driving device 1506, and a communication control device 1507. In the computer 15, constitutional elements 1501 to 1507 are coupled to each other by a bus 1510 and data may be transferred between the elements.

The processor 1501 is, for example, a central processing unit (CPU) and a micro processing unit (MPU). The processor 1501 executes various programs including an operating system to thereby control the entire operation of the computer 15. The processor 1501 performs various operation processing including operation processing in the form recognition processing illustrated in, for example, FIG. 9, FIG. 10A to FIG. 10F, and FIG. 15A and FIG. 15B.

The main storage device 1502 includes a read only memory (ROM) and a random access memory (RAM) which are not illustrated. In the ROM of the main storage device 1502, for example, a predetermined basic control program or the like, which is to be read by the processor 1501 when the computer 15 is started, is stored in advance. The RAM of the main storage device 1502 is used as a working storage area by the processor 1501 as occasion calls when the processor 1501 executes various programs. The RAM of the main storage device 1502 may be used for temporarily storing, for example, an image (input image) of a form to be recognized, a candidate for the form ID, and a corresponding line segment pair, the number of times in which a correlation is performed, or the like.

The auxiliary storage device 1503 is, for example, a non-volatile memory (including solid state drive (SSD)), such as a flash memory, or a hard disk drive (HDD). In the auxiliary storage device 1503, various programs executed by the processor 1501 and various pieces of data may be stored. The auxiliary storage device 1503 may be used for storing, for example, a form recognition program including contents of processing illustrated in FIG. 9, FIG. 10A to FIG. 10F, and FIG. 15A and FIG. 15B, or the like. The auxiliary storage device 1503 may be used for storing, for example, an input image, a coarse classification dictionary table, a detailed identification dictionary, a candidate for the form ID and a corresponding line segment pair.

The input device 1504 includes, for example, a keyboard device 1504A, a mouse device 1504B, and the image scanner 2. When an operator (user) of the computer 15 performs a predetermined operation on the keyboard device 1504A or the mouse device 1504B, the device 1504A or 1504B transmits input information correlated with contents of the operation to the processor 1501. The image scanner 2 may be used for inputting a form image.

The output device 1505 includes, for example, a display device such as a liquid crystal display device, or a printer. The output device 1505 may be used for displaying, for example, an operation state of the computer 15 and a result of form recognition processing.

The medium driving device 1506 reads a program or piece of data recorded in a portable recording medium 16 and writes a piece of data or the like stored in the auxiliary storage device 1503 into the portable storage medium 16. In a case where the computer 15 is provided with an optical disc drive capable of being used as the medium driving device 1506, various optical discs capable of being recognized by the optical disc drive may be used as the portable recording medium 16. The optical disc capable of being used as the portable recording medium 16 may include, for example, a compact disc (CD), a digital versatile disc (DVD), and a Blu-ray disc (Blu-ray is registered trademark). As the portable recording medium 16, for example, a memory card (flash memory) of the secure digital (SD) standard or a flash memory device provided with a connector of the universal serial bus (USB) may be used. The portable recording medium 16 may be used for storing the form recognition program, the input image, the coarse classification dictionary, the detailed identification dictionary described above and the like.

The communication control device 1507 is a device for connecting the computer 15 to a network and controlling various communications between the computer 15 and other electronic equipment through the network. The communication control device 1507 may be used for acquiring the coarse classification dictionary and the detailed identification dictionary in, for example, the form recognition system 6 illustrated in FIG. 22.

When the operator inputs a start instruction of a program including the form recognition processing using the input device 1504, the processor 1501 reads the program from the auxiliary storage device 1503 or the like and executes the program in the computer 15. In this case, the processor 1501 functions (operates) as the form image reception unit 101, the candidate extraction unit 102, the form ID specifying unit 103, the recognition result output unit 104 and the like of the form recognition device 1. When the computer 15 executes the program including the form recognition processing, the RAM of the main storage device 1502, the auxiliary storage device 1503, and the portable recording medium 16 function as the coarse classification dictionary storing unit 110 and the detailed identification dictionary storing unit 120.

The computer 15 functioning as the form recognition device 1 does not have to include all elements 1501 to 1507 illustrated in FIG. 15 and may not include some of the elements according to uses and conditions. For example, the medium driving device 1506 or the communication control device 1507 may not be included in the computer 15.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A form recognition method comprising:
executing, by a processor, a first line segment pair extraction processing that includes extracting a first line segment pair including a combination of line segments selected from a plurality of line segments included in an image of a form to be recognized;
executing, by the processor, a first feature amount calculation processing that includes calculating a first feature amount which represents a relationship between the line segments in the extracted first line segment pair;
executing, by the processor, a candidate extraction processing that includes extracting a candidate for a form identifier of the form to be recognized based at least on the calculated first feature amount of the first line segment pair and a second feature amount in line segments in a second line segment pair correlated with a form identifier which is registered in advance;
executing, by the processor, a corresponding line segment pair extraction processing that includes extracting corresponding line segment pairs which include a line segment correlated with the candidate for the form identifier and a line segment of the form to be recognized based at least on correspondence between respective line segments in the first line segment pair and respective line segments in the second line segment pair correlated with the candidate for the form identifier; and executing, by the processor, a specification processing that includes specifying the form identifier of the form to be recognized based at least on the degree of overlapping between the line segment extracted from the form to be recognized in the corresponding line segment pair and the line segment correlated with the candidate for the form identifier, wherein the corresponding line segment pair extraction processing includes calculating, for each line segment of the second line segment pair correlated with the candidate for the form identifier, a count of a first line segment among line segments of the first line segment pair, the first line segment being a line segment correlated with the each line segment of the second line segment pair, and extracting, as the corresponding line segment pairs, a line segment pair which includes the first line segment and a corresponding line segment in the second line segment pair, in descending order of the count of the first line segment correlated with the corresponding line segment in the second line segment pair.

2. The form recognition method according to claim 1, wherein the corresponding line segment pair extraction processing includes extracting the corresponding line segment pairs, a count of the corresponding line segment pairs being less than a count of the line segments correlated with the candidate for the form identifier.

3. The form recognition method according to claim 1, wherein the first feature amount calculation processing includes calculating a value represented based on a length of each line segment in the line segment pair and a positional relationship between the line segments as the first feature amount.

4. The form recognition method according to claim 1, wherein the form identifier is correlated with at least one of a color and an angle of each line segment in the second line segment pair, the first line segment pair extraction processing includes calculating at least one of a color and an angle of the extracted line segment, and the candidate extraction processing includes extracting the candidate for the form identifier of which a difference in the at least one of the color and the angle between the line segment in the first line segment pair and the line segment in the second line segment pair is within a predetermined threshold value range, among the candidates for the form identifier extracted based on the first feature amount.

5. The form recognition method according to claim 1, wherein the form identifier is correlated with a piece of information of at least one of a color and an angle of each line segment in the second line segment pair, the first line segment pair extraction processing includes calculating at least one of a color and an angle of the extracted line segment, and the candidate extraction processing includes extracting the candidate for the form identifier of which a difference in the at least one of the color and the angle between the line segment in the first line segment pair and the line segment in the second line segment pair is within a predetermined threshold value range, among the candidates for the form identifier extracted based on the first feature amount and the second feature amount.

6. The form recognition method according to claim 1, wherein the form identifier is correlated with a count of line segments in a form identified by the form identifier, the first line segment pair extraction processing includes calculating a count of line segments included in the image of the form to be recognized, and the candidate extraction processing includes extracting only the candidate for the form identifier of which a difference between the count of the line segments included in the image of the form to be recognized and the count of the line segments correlated with the form identifier is within a predetermined threshold value range, among the candidates for the form identifier extracted based on the first feature amount and the second feature amount.

7. The form recognition method according to claim 1, wherein the corresponding line segment pairs extracted in the corresponding line segment pair extraction processing include a line segment pair which includes the first line segment, of which the count is greater than a predetermined count of times.

8. A form recognition device, comprising:
a memory; and
a processor coupled to the memory and configured to
execute a form identifier extraction processing that includes calculating a first feature amount which represents a relationship between line segments in a first line segment pair including a combination of line segments extracted from a plurality of line segments included in an image of a form to be recognized and extracting a candidate for a form identifier of the form to be recognized based at least on the first feature amount of the first line segment pair and a second feature amount of line segments in a plurality of second line segment pairs correlated with a form identifier which is registered in advance, execute a corresponding line segment pair extraction processing that includes extracting corresponding line segment pairs which include line segments correlated with the candidate for the form identifier and line segments of the form to be recognized based at least on correspondence between respective line segments in the first line segment pair and respective line segments in the second line segment pair correlated with the candidate for the form identifier, and execute a specification processing that includes specifying a form identifier of the form to be recognized based at least on the degree of overlapping between the line segment extracted from the form to be recognized in the corresponding line segment pair and the line segment correlated with the candidate for the form identifier, wherein the corresponding line segment pair extraction processing includes calculating, for each line segment of the second line segment pair correlated with the candidate for the form identifier, a count of a first line segment among line segments of the first line segment pair, the first line segment being a line segment correlated with the each line segment of the second line segment pair, and extracting, as the corresponding line segment pairs, a line segment pair which includes the first line segment and a corresponding line segment in the second line segment pair, in descending order of the count of the first line segment correlated with the corresponding line segment in the second line segment pair.

9. The form recognition device according to claim 8, wherein the corresponding line segment pair extraction processing includes extracting the corresponding line segment pairs, a count of the corresponding line segment pairs being less than a count of the line segments correlated with the candidate for the form identifier.

10. The form recognition device according to claim 8, wherein the form identifier is correlated with at least one of a color or an angle of each line segment in the second line segment pair, the first line segment pair extraction processing includes calculating at least one of a color and an angle of the extracted line segment, and the candidate extraction processing includes extracting the candidate for the form identifier of which a difference in the at least one of the color and the angle between the line segment in the first line segment pair and the line segment in the second line segment pair is within a predetermined threshold value range, among the candidates for the form identifier extracted based on the first feature amount.

11. The form recognition device according to claim 8, wherein the form identifier is correlated with a piece of information of at least one of a color and an angle of each line segment in the second line segment pair, the first line segment pair extraction processing includes calculating at least one of a color and an angle of the extracted line segment, and the candidate extraction processing includes extracting the candidate for the form identifier of which a difference in the at least one of the color and the angle between the line segment in the first line segment pair and the line segment in the second line segment pair is within a predetermined threshold value range, among the candidates for the form identifier extracted based on the first feature amount and the second feature amount.

12. A non-transitory computer-readable medium for storing computer-executable program that causes a processor to execute a process for recognizing a form, the process comprising:

executing a form identifier extraction processing that includes calculating a first feature amount which represents a relationship between line segments in a first line segment pair including a combination of line segments extracted from a plurality of line segments included in an image of a form to be recognized and extracting a candidate for a form identifier of the form to be recognized based at least on the first feature amount of the first line segment pair and a second feature amount of line segments in a plurality of second line segment pairs correlated with a form identifier which is registered in advance, executing a corresponding line segment pair extraction processing that includes extracting corresponding line segment pairs which include line segments correlated with the candidate for the form identifier and line segments of the form to be recognized based at least on correspondence between respective line segments in the first line segment pair and respective line segments in the second line segment pair correlated with the candidate for the form identifier, and executing a specification processing that includes specifying a form identifier of the form to be recognized based at least on the degree of overlapping between the line segment extracted from the form to be recognized in the corresponding line segment pair and the line segment correlated with the candidate for the form identifier, wherein the corresponding line segment pair extraction processing includes calculating, for each line segment of the second line segment pair correlated with the candidate for the form identifier, a count of a first line segment among line segments of the first line segment pair, the first line segment being a line segment correlated with the each line segment of the second line segment pair, and extracting, as the corresponding line segment pairs, a line segment pair which includes the first line segment and a corresponding line segment in the second line segment pair, in descending order of the count of the first line segment correlated with the corresponding line segment in the second line segment pair.

13. The non-transitory computer-readable medium according to claim 12, wherein the corresponding line segment pair extraction processing includes extracting the corresponding line segment pairs, a count of the corresponding line segment pairs being less than a count of the line segments correlated with the candidate for the form identifier.

14. The non-transitory computer-readable medium according to claim 12, wherein the form identifier is correlated with at least one of a color and an angle of each line segment in the second line segment pair, the first line segment pair extraction processing includes calculating at least one of a color and an angle of the extracted line segment, and the candidate extraction processing includes extracting the candidate for the form identifier of which a difference in the at least one of the color or the angle between the line segment in the first line segment pair and the line segment in the second line segment pair is within a predetermined threshold value range, among the candidates for the form identifier extracted based on the first feature amount.

15. The non-transitory computer-readable medium according to claim 12, wherein the form identifier is correlated with at least one of a color and an angle of each line segment in the second line segment pair, the first line segment pair extraction processing includes calculating at least one of a color and an angle of the extracted line segment, and the candidate extraction processing includes extracting the candidate for the form identifier of which a difference in the at least one of the color and the angle between the line segment in the first line segment pair and the line segment in the second line segment pair is within a predetermined threshold value range, among the candidates for the form identifier extracted based on the first feature amount and the second feature amount.

16. A non-transitory computer-readable medium for storing data accessed by processor circuitry, the data comprising:

a data structure including a plurality of cells, the plurality of cells accessed by the processor circuitry and are two-dimensionally arranged, wherein each of the plurality of cells is configured to store a form identifier and line segment identifiers, the each of the plurality of cells being specified, by the processor circuitry, in accordance with coordinates corresponding to a feature amount representing a relationship between line segments included in a line segment pair, each of the line segment identifiers being corresponding to the line segments respectively, the line segment pair being extracted, by the processor circuitry, from an image of a form identified by the form identifier, the line segment pair being extracted by calculating, for each line segment of a second line segment pair correlated with a candidate for the form identifier, a count of a first line segment among line segments of the line segment pair, the first line segment being a line segment correlated with the each line segment of another line segment pair, and extracting, as the line segment pair, a line segment pair which includes the first line segment and a corresponding line segment in the another line segment pair, in descending order of the count of the first line segment correlated with the corresponding line segment in the another line segment pair.

17. The non-transitory computer-readable medium according to claim 16, wherein the cell associated with the line segment identifier stores at least any one of a color or an angle of the line segment identified by the line segment identifier.

18. The non-transitory computer-readable medium according to claim 16, wherein the form identifier is correlated with a count of line segments included in the form identified by the form identifier.

* * * * *